US007143421B2

(12) United States Patent
Forin et al.

(10) Patent No.: US 7,143,421 B2
(45) Date of Patent: Nov. 28, 2006

(54) HIGHLY COMPONENTIZED SYSTEM ARCHITECTURE WITH A DEMAND-LOADING NAMESPACE AND PROGRAMMING MODEL

(75) Inventors: Alessandro Forin, Redmond, WA (US); Johannes V. Helander, Bellevue, WA (US); Andrew R. Raffman, Redmond, WA (US); Gilad Odinak, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 153 days.

(21) Appl. No.: 09/282,238

(22) Filed: Mar. 31, 1999

(65) Prior Publication Data

US 2003/0033441 A1    Feb. 13, 2003

Related U.S. Application Data

(60) Provisional application No. 60/099,562, filed on Sep. 9, 1998.

(51) Int. Cl.
G06F 9/00 (2006.01)
(52) U.S. Cl. .................. 719/331; 719/310; 719/332; 718/100
(58) Field of Classification Search ............... 709/315, 709/316, 318, 104, 332; 719/332, 331, 310, 719/311, 312; 718/100
See application file for complete search history.

(56) References Cited

U.S. PATENT DOCUMENTS

| 5,675,796 A | 10/1997 | Hodges et al. |
| 5,771,383 A | 6/1998 | Magee et al. |
| 5,815,661 A * | 9/1998 | Gosling ..................... 709/216 |
| 5,978,857 A | 11/1999 | Graham |
| 6,134,581 A * | 10/2000 | Ismael et al. ................ 709/202 |
| 6,141,698 A * | 10/2000 | Krishnan et al. ........... 719/331 |
| 6,182,108 B1 | 1/2001 | Williams et al. |
| 6,202,208 B1 * | 3/2001 | Holiday, Jr. ................. 717/166 |
| 6,223,346 B1 * | 4/2001 | Tock ........................... 717/166 |
| 6,253,225 B1 * | 6/2001 | Nakahara et al. ........... 709/100 |
| 6,260,078 B1 * | 7/2001 | Fowlow ...................... 719/332 |
| 6,263,379 B1 * | 7/2001 | Atkinson et al. ........... 709/332 |
| 6,282,561 B1 * | 8/2001 | Jones et al. ................. 709/104 |
| 6,339,841 B1 * | 1/2002 | Merrick et al. ............. 717/166 |
| 6,356,931 B1 * | 3/2002 | Ismael et al. ............... 709/202 |
| 6,401,099 B1 * | 6/2002 | Koppolu et al. ............ 707/103 |
| 6,505,229 B1 | 1/2003 | Turner et al. |
| 6,571,388 B1 * | 5/2003 | Venkatraman et al. ...... 717/166 |
| 6,681,263 B1 * | 1/2004 | King ........................... 719/315 |
| 6,766,519 B1 * | 7/2004 | Burriss et al. .............. 719/321 |

(Continued)

OTHER PUBLICATIONS

B. Bershad, et al., "Extensibility, Safety and Performance in the Spin Operating System," *15th ACM Symposium on Operating System Principles*, Copper Mountain Resort, Colorado, Dec. 1995, pp. 267-284.

(Continued)

*Primary Examiner*—William Thomson
*Assistant Examiner*—Andy Ho
(74) *Attorney, Agent, or Firm*—Microsoft Corporation

(57) ABSTRACT

The invention is embodied in software executable on a computer having a working memory with demand-loadable components initially stored outside of the working memory, each component having an entry point including a constructor for an object. Preferably, the demand-loadable components are initially provided in a memory within the computer or a location external of the computer. A Namespace in the working memory provides access in the working memory to the components as they become needed by applications running in the computer. The Namespace provides the access by managing demand-loading and unloading of the components in the working memory.

33 Claims, 40 Drawing Sheets

U.S. PATENT DOCUMENTS 6,769,126 B1 * 7/2004 Pekowski .................. 719/331

OTHER PUBLICATIONS

D. Black, et al., "Microkernel Operating System Architecture and Mach," *1st USENIX Workshop on Micro-Kernels and Other Kernel Architectures*, Seattle, Arp. 1992, pp. 11-30.

D. Cheriton et al., "A Caching Model of Operating System Kernel Functionality," *Proceedings of the First Symposium on Operating Systems Design and Implementation*, Seattle, 1994, 15 pages.

D. Cheriton, "The V Distributed System", *Communications of the ACM*, Mar. 1998, vol. 31, No. 3, pp. 314-333.

R. Draves, et al., "Unifying the User and Kernel Environments," *Microsoft Research Technical Report MSR-TR-97-10*, Mar. 1997, 16 pages.

D. Engler, et al., "Exokernel: An Operating System Architecture for Application-Level Resource Management," *15th ACM Symposium on Operating System Principles ACM SIGOPS*, Copper Mountain Resort, Colorado, Dec. 1995, pp. 251-266.

B. Ford, et al., "The Flux OSKit: A Substrate for Kernel and Language Research," *Proceedings of the 16th ACM Symposium on Operating Systems Principles, ACM SIGOPS*, Saint-Malo, France, Oct. 1997, pp. 38-51.

D. Golub, et al., "UNIX as an application program," *USENIX 1990 Summer Conference*, Anaheim, CA , Jun. 1990, pp. 87-95.

J. Helander, "Unix Under Mach: The Lites Server," *Master's Thesis, Helsinki University of Technology*, 1994, 71 pages.

D. Hildebrand, "An Architectural Overview of QNX," *1st USENIX Workshop on Micro-kernels and Other Kernel Architectures*, Seattle, Apr. 1992, pp. 113-126.

M. Jones, et al., "An Overview of the Rialto Real-Time Architecture," *Proceedings of the Seventh ACM SIGOPS European Workshop, SIGOPS*, Sep. 1996, pp. 249-256.

M. Jones, et al., "CPU Reservations and Time Constraints: Efficient, Predictable Scheduling of Independent Activities," *Proceedings of the 16th ACM Symposium on Operating System Principles, ACM SIGOPS, Saint-Malo, France*, Oct. 1997, pp. 198-211.

M. Jones, The Microsoft Interactive TV System: An Experience Report, Microsoft Research Technical Report MSR-TR-97-18 [online], Jul. 1997, 24 pages, Retrieved Jan. 26, 2000 from the Internet at http://www.research.microsoft.com/research/os/mbj/papers/mitv/tr-97-18.html.

D. Julin, et al., "Generalized Emulation Services for Mach 3.0 Overview, Experiences and Current Status," *Proceedings of the Usenix Mach Symposium USENIX Association*, 1991, pp. 13-26.

D. Lee, et al., "Execution Characteristics of Desktop Applications on Windows NT," *Proceedings of the 25th International Symposium on Computer Architecture., IEEE*, Barcelona, Spain, Jun. 1998, pp. 27-38.

J. Liedtke, "On µ-Kernel Construction," *15th ACM Symposium on Operating System Principles, ACM*, Copper Mountain Resort, Colorado, Dec. 1995, pp. 237-250.

J. Mogul, et al., "The Packet Filter: An Efficient Mechanism for User-level Network Code," *11th ACM Symposium on Operating System Principles, ACM*, Nov. 1987, 34 pages.

R. Rashid, "From RIG to Accent to Mach: The Evolution of a Network Operating System," *Carnegie-Mellon University Technical Report*, Aug. 1987, pp. 1128-1137.

M. Rozier, et al., "CHORUS Distributed Operating System," *Computing Systems*, Fall 1998, vol. 1, No. 4, pp. 305-370.

Torborg, Jay, et al., "Talisman: Commodity Realtime 3D Graphics for the PC," *Proceeding of SIGGRAPH96, ACM*, Aug. 1996, pp. 353-363.

M. Young, "Exporting a User Interface to Memory Management from a Communication-Oriented Operating System," *Ph.D. Thesis CMU-CS-89-202, Carnegie-Mellon University*, Nov. 1989, 206 pages.

U.S. Appl. No. 09/282,227, filed Mar. 31, 1999, Forin et al.

U.S. Appl. No. 09/283,818, filed Mar. 31, 1999, Forin et al.

U.S. Appl. No. 09/392,405, filed Sep. 9, 1999, Forin et al.

U.S. Appl. No. 09/282,229, filed Mar. 31, 1999, Forin et al.

U.S. Appl. No. 09/282,656, filed Mar. 31, 1999, Forin et al.

Office communication, Paper No. 7, dated Jun. 27, 2003 re application of Alessandro Forin, U.S. Appl. No. 09/283,818 filed Mar. 31, 1999.

Advanced Windows NT, The Developer's Guide to the Win32 Application Programming Interface, Jeffrey Richter, 1994, Chapter 7, pp. 355-364.

* cited by examiner

HIGHLY COMPONENTIZED SYSTEM ARCHITECTURE WITH A DEMAND-LOADING NAMESPACE AND PROGRAMMING MODEL

CROSS-REFERENCE TO RELATED APPLICATION

This application is a utility application filing of provisional patent Ser. No. 60/099,562, filed on Sep. 9, 1998 and entitled "A Highly Componentized System Architecture With Dynamically Loadable Operating Features" (now abandoned).

BACKGROUND OF THE INVENTION

1. Technical Field

The invention is related to computer operating systems and in particular to a computer operating system which is highly componentized and has dynamically loadable operating features which may be loaded and unloaded during system run time.

2. Background Art

The progressive computerization of society involves a number of diverse computing platforms beside the general-purpose computer:

Embedded control systems, including consumer devices, intelligent sensors and smart home controls.

Communication-oriented devices such as digital cell phones and networking infrastructure.

Programmable peripherals and microcontrollers.

In all these cases, the general-purpose platform approach is either not applicable, or it is prohibitively expensive. The microprocessor might be a DSP, a VLIW, or a microcontroller; the memory budget is severely restricted; there might be no MMU; the network connection might be sporadic; and Real-Time support is essential.

Current operating systems are either inflexible, big, lack Real-Time support, have complex hardware requirements, or are so special purpose that good development tools are unavailable and code reusability is low.

Microkernels [Black92, Engler95] attempt to modularize the operating system. But they confuse modularity with security by mandating that system services be in separate address spaces. Many of the services moved into separate server processes are still necessary for these systems to function and often the services have to trust each other.

C++ and Java provide objects at a very fine granularity level, and they are extremely successful with application programmers. Unfortunately, both languages confine their objects to a single address space. Object Linking and Embedding (OLE) [Brockschmidt95] and other similar systems extend objects across address spaces and across machine boundaries. OLE seamlessly integrates independently developed components. When editing an Excel spreadsheet inside a Word document it is in fact the Excel process that operates on objects inside of Word's address space. Unfortunately, it only works for user mode applications.

Modularity has always been an important paradigm in software design. By breaking a complex system into pieces, the complexity becomes more manageable. Address spaces provide security by installing virtual-memory based firewalls between applications. These two issues are orthogonal, but the distinction has been lost in systems research that has been concentrating on so-called microkernels. These issues have been discussed in the following publications:

[Bershad95] Brian Bershad, S. Savage, P. Pardyak, E. G. Sirer, M. Fiuczynski, D. Becker, S. Eggers, C. Chambers. Extensibility, safety and performance in the Spin operating system. In $15^{th}$ ACM Symposium on Operating System Principles, pages 267–284, Copper Mountain Resort, Colo., December 1995.

[Black92] David Black, David Golub, Daniel Julin, Richard Rashid, Richard Draves, Randall Dean, Alessandro Forin, Joseph Barrera, Hideyuki Tokuda, Gerald Malan, David Bohman. Microkernel Operating System Architecture and Mach. In $1^{st}$ USENIX Workshop on Micro-kernels and Other Kernel Architectures, pages 11–30, Seattle, April 1992.

[Brockschmidt95] K. Brockshmidt. Inside OLE, Second ed. Microsoft Press, Redmond Wash., 1995.

[Cheriton94] David Cheriton, Kenneth Duda. A Caching Model of Operating System Kernel Functionality. In $1^{st}$ Symposium on Operating Systems Design and Implementation, Seattle, 1994.

[Cheriton88] David Cheriton. The V distributed system. In Communications of the ACM, pages 314–333, March 1988.

[Draves97] Richard Draves, Scott Cutshall. Unifying the User and Kernel Environments. Microsoft Research Technical Report MSR-TR-97-10, 16 pages, March 1997

[Engler95] D. R. Engler, M. F. Kaashoek, J. O'Toole Jr. Exokernel: an operating system architecture for application-specific resource management. In $15^{th}$ ACM Symposium on Operating System Principles, pages 251–266, Copper Mountain Resort, Colo., December 1995.

[Ford97] Bryan Ford, Godmar Back, Greg Benson, Jay Lepreau, Albert Lin, Olin Shivers. The Flux OSKit: A Substrate for Kernel and Language Research. In Proceedings of the 16th ACM Symposium on Operating Systems Principles, pages 38–51. ACM SIGOPS, Saint-Malo, France, October 1997.

[Golub90] David Golub, Randall Dean, Alessandro Forin, Richard Rashid. UNIX as an application program. In USENIX 1990 Summer Conference, pages 87–95, June 1990.

[Helander94] Johannes Helander. Unix under Mach: The Lites Server. Master's thesis, 71 pages, Helsinki University of Technology, 1994. Available from http://www.c-s.hut.fi/~jvh/lites.MASTERS.ps

[Hildebrand92] D. Hildebrand. An architectural overview of QNX. In $1^{st}$ USENIX Workshop on Micro-kernels and Other Kernel Architectures, pages 113–126, Seattle, April 1992.

[ISI95] Integrated Systems Inc. pSOSystem System Concepts. Part No. COL0011, May 1995, ISI, Sunnyvale Calif.

[Jones96] Michael B. Jones, Joseph S. Barrera, III, Richard P. Draves, Alessandro Forin, Paul J. Leach, Gilad Odinak. An Overview of the Rialto Real Time Architecture. In Proceedings of the $7^{th}$ ACM SIGOPS European Workshop, pagg. 249–256, September 1996.

[Jones97] Michael B. Jones et al. CPU Reservations and Time Constraints: Efficient, Predictable Scheduling of Independent Activities. In Proceedings of the 16th ACM Symposium on Operating Systems Principles, pages 198–211. ACM SIGOPS, Saint-Malo, France, October 1997.

[Jones 97b] Michael B. Jones. The Microsoft Interactive TV System: An Experience Report. Microsoft Research Technical Report MSR-TR-97-18, July, 1997.

[Julin91] Daniel Julin, Jonathan Chew, Mark Stevenson, Paulo Guedes, Paul Neves, Paul Roy. Generalized Emulation Services for Mach 3.0: Overview, Experiences and Current Status. In Proceedings of the Usenix Mach Symposium, 1991.

[Lee98] Dennis Lee, Patrick Crowley, Jean-Loup Baer, Tom Anderson, Brian Bershad. Execution characteristics of desktop applications on Windows NT. In Proceedings of the 25$^{th}$ International Symposium on Computer Architecture, Barcelona, Spain, June 1998.

[Liedtke95] Jochen Liedtke. On □-kernel construction. In 15$^{th}$ ACM Symposium on Operating System Principles, pages 237–250, Copper Mountain Resort, Colo., December 1995.

[Mogul87] Jeffrey Mogul, Richard Rashid, Michael Accetta. The Packet Filter: an Efficient Mechanism for User-level Network Code. In 11$^{th}$ ACM Symposium on Operating System Principles, November 1987.

[Rashid87] Richard Rashid. From RIG to Accent to Mach: The evolution of a network operating system. Carnegie Mellon University Technical Report, August 1987.

[Rozier88] M. Rozier, A. Abrassimov, F. Armand, I. Boule, M. Gien, M. Guillemont, F. Hermann, C. Kaiser, S. Langlois, P. Leonard, W. Neuhauser. CHORUS distributed operating system. In Computing Systems, pages 305–370, Vol. 1–4, 1988.

[Young89] Michael Wayne Young. Exporting a User Interface to Memory Management from a Communication-Oriented Operating System. Ph.D. Thesis CMU-CS-89-202, Carnegie Mellon University, November 1989.

Mach [Black92] defined an interface for external memory managers [Young89] and was able to split virtual memory into functionally distinct parts, allowing part of the functionality to reside outside the privilege-level component (the "kernel"). Mach also separated part of the Unix operating system services out of the kernel [Golub90, Helander94], achieving modularity but limited additional functionality. The multiserver project [Julin91] went further in the modularization by splitting the Unix services into multiple independent servers. The componentization added structure and generality to the services. However, keeping the services in multiple address spaces did not add any security or robustness since components had to be available and trusted in any case. The most interesting new functionality was in the ability to emulate multiple OS interfaces, at the same time.

Contemporary research systems take the minimization of the "kernel" concept even further by defining even lower level abstractions and demonstrating the ability to split states across address space boundaries. None of these systems defines a new application programming interface (API) different from the Unix they emulate. The API that their predecessors [Rashid87, Cheriton88, Rozier88] did define, based on RPC and message exchanges, were not very successful with programmers.

The Cache Kernel [Cheriton94] uses Mach's external memory manager metaphor uniformly for the management of all kernel objects. Threads, Address Spaces and User Kernels are all handled through this pagein-pageout logical interface. An actual application is statically linked with a number of libraries, which provide default implementations of the required User Kernel components (VM, scheduling, IPC). This offers some flexibility by letting untrusted applications have their custom application kernel. Overall complexity is not decreased; it seems an application kernel would have to be as complicated as any other operating system. The ability to write your own application kernel would seem useful for a limited number of users, in teaching operating systems for instance.

Exokernel [Engler95] goes along the same lines demonstrating further ability to run operating system code in user mode. While it is highly successful in this and offers some added flexibility, it is questionable whether the premises differ from that of microkernels. The main contribution is in the mechanisms for application-specific resource management.

[Liedtke95] argues that microkernels have failed exclusively on performance grounds, and that poor performance is their only cause for inflexibility. Our argument is the opposite: inflexibility is inherent in the design, and leads to unavoidable inefficiencies that can only be mitigated by good implementations, never eliminated.

Spin [Bershad95] addresses the issue of expensive address space crossings by letting user code compiled by a trusted compiler run inside the kernel. This can be viewed as smart proxies that can do a lot of the work locally that otherwise would require communication. It is similar to loading packet filters into network drivers [Mogul87], to running database application query language inside database engines [reference], or to sandboxing Java applets. Applying these techniques to operating systems is beneficial when a trust boundary must be crossed and the cost would otherwise be high. It does not address the issue of whether or not a trust boundary is necessary. Spin uses an object-based language (Modula3) to provide extensibility. The pointer-safety property of the language is what permits execution of untrusted code in privileged mode. Trust relationships, as in the user-versus-kernel separation, should not dominate system decomposition. It is important to return to a global system view. The present invention addresses the issue of how to minimize the set of base services, and how to dynamically extend them on demand.

[Ford97] shows how a base set of system components can be composed in different ways to build an operating system kernel. The granularity is fairly coarse, and the techniques are limited to static linking. Components that should be of interest to OS researchers (VM, IPC, scheduling, etc.) cannot be replaced or removed, neither statically nor dynamically. The decomposition is otherwise limited to the "OS" component; it is not meant as a whole-system approach. This does not go far enough in the componentization. It provides a few convenient components, such as bootstrap loader and filesystems, but is mostly concerned with reusing existing device drivers and Unix code. It fails to componentize the core kernel services or extend the paradigm to applications.

Componentization and location independence has also been studied in the context of filesystems and network protocols [Maeda93] and in a number of existing embedded systems, such as pSOS [ISI95]. In a typical embedded system there is no loader, and components can only be chosen at static link time when the load image is built. Services are extremely limited, sometimes exclusively to the scheduling component. The number and priority of threads might have to be specified statically as well.

Chorus [Rozier88] can be configured to use either a page-based or a segment-based VM system.

SUMMARY OF THE INVENTION

A preferred embodiment of the invention is directed to a flexible system architecture that is suitable for a wide range of applications. The system is built out of minimal but flexible components, which can be deployed as needed. Instead of mandating a fixed set of operating system services and hardware requirements, the system preferably provides a menu of well-defined components that can be chosen to compose a complete system depending on hardware capabilities, security needs, and application requirements.

Dynamic loading and unloading of components provides the flexibility that lets the system adapt to changing requirements.

The componentization makes it possible to change the implementation of a component without affecting the rest of the system. Minimalism makes it possible to use the system with severely restricted hardware budgets. It also forces the system to be understandable and flexible. Software components, when possible, are not tied to a particular layer of the system, but can be reused. For example, the same code that implements the system physical memory heap is used to provide application heaps over virtual memory. The key system building blocks are componentized. This includes the virtual memory system, IPC, and the scheduler in addition to filesystems, networking, drivers, and protection policies. Preferred embodiments of the present invention extend object-orientation both across address spaces and across protection levels.

In a preferred embodiment, components are located in separate address spaces only when there is a real reason for it, such as security or specific address space requirements. Thus, the price of multiple address spaces (and transitions thereof) is paid only where needed.

The invention is embodied in software executable on a computer having a working memory with demand-loadable components initially stored outside of the working memory, each component having an entry point including a constructor for an object. Preferably, the demand-loadable components are initially provided in a memory within the computer or a location external of the computer. A Namespace in the working memory provides access in the working memory to the components as they become needed by applications running in the computer. The Namespace provides the access by managing demand-loading and unloading of the components in the working memory. Applications in the working memory rely on the Namespace to furnish access to ones of the components in the working memory as they become needed by ones of the applications. Each component includes an object, and each demand-loadable component is obtained through an IUnknown interface in the object. The IUnknown interface preferably has the following methods: (a) add reference for incrementing a count of the number of applications requiring the object; (b) release reference for decrementing a count of the number of applications requiring the object. The Namespace is responsive to the count in the managing of the demand-loading and unloading.

Preferably, the computer includes a loader, and the Namespace determines whether the name of the object is currently registered in the Namespace, and, if so, carries out the step of returning the pointer. If the name is not currently registered, the loader loads the object into the working memory and registers the name in the Namespace. The object has a constructor and an entry point, and the object is loaded by the loader invoking the constructor; the constructor finding the entry point of the object and calling an executable at the entry point; the executable causing space in the working memory to be allocated for a VTable, an Interface and an Implementation of the object and producing a pointer to the memory space, the pointer including the IUnknown pointer.

In accordance with another aspect of the invention, a computer having a working memory and access to a storage memory includes an application capable of being loaded in to the working memory and running in the computer, at least one object initially stored in the non-working memory, a Namespace in the working memory, the application being programmed to cause the one object to be identified to the Namespace whenever the application finds a need for the object during the running of the application. The Namespace is programmed to (a) respond to the application identifying the one object by determining whether the one object is currently registered in Namespace, and if it is not registered, then, (b) causing the one object to be loaded from the storage memory to the working memory and, (c) registering the one object in the Namespace, (d) upon the object being registered in the Namespace, returning to the application a pointer to the object.

DETAILED DESCRIPTION OF THE PREFERRED EMBODIMENTS

Figure 1A:
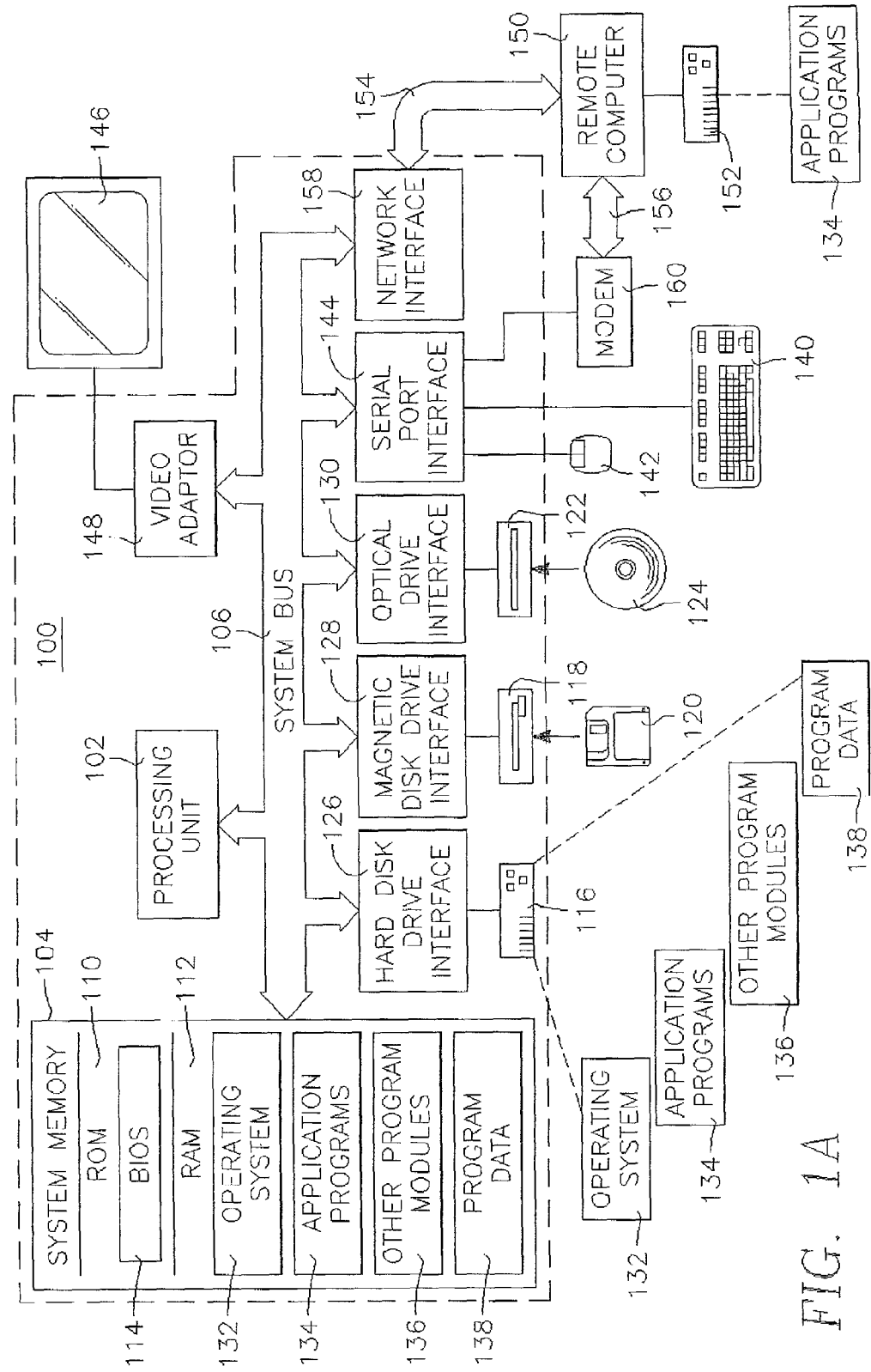
FIG. 1A is a block diagram of an exemplary operating environment of the invention.

Exemplary Operating Environment:

FIG. 1A and the following discussion are intended to provide a brief, general description of a suitable computing environment in which the invention may be implemented. Although not required, the invention will be described in the general context of computer-executable instructions, such as program modules, being executed by a personal computer. Generally, program modules include processes, programs, objects, components, data structures, etc. that perform particular tasks or implement particular abstract data types. Moreover, those skilled in the art will appreciate that the invention may be practiced with other computer system configurations, including inside various programmable peripheral interface cards such as 126, 128, 130, 144, 158, 148 in FIG. 1A, inside programmable peripherals such as disks, game controllers and accessories, speakers, modems, printers and the like, in hand-held devices, multiprocessor systems, microprocessor-based or programmable consumer electronics, network PCs, minicomputers, mainframe computers, and the like. Thus, for example, the present invention can be an operating system of an optimally minimized configuration, as described below, running inside a network interface card of the network interface 158 of FIG. 1A or in an embedded control system or in a communication-oriented device. The invention may also be practiced in distributed computing environments where tasks are performed by remote processing devices that are linked through a communications network. In a distributed computing environment, program modules may be located both in local and in remote memory storage devices.

With reference to FIG. 1A, an exemplary system for implementing the invention includes a general purpose computing device in the form of a conventional personal computer 120, including a processing unit 121, a system memory 122, and a system bus 123 that couples various system components including the system memory to the processing unit 121. The system bus 123 may be any of several types of bus structures including a memory bus or memory controller, a peripheral bus, and a local bus using any of a variety of bus architectures. The system memory includes read only memory (ROM) 124 and random access memory (RAM) 125. A basic input/output system 126 (BIOS), containing the basic process that helps to transfer information between elements within the personal computer 120, such as during start-up, is stored in ROM 124. The personal computer 120 further includes a hard disk drive 127 for reading from and writing to a hard disk, not shown, a magnetic disk drive 128 for reading from or writing to a removable magnetic disk 129, and an optical disk drive 130 for reading from or writing to a removable optical disk 131 such as a CD ROM or other optical media. The hard disk drive 127, magnetic disk drive 128, and optical disk drive 130 are connected to the system bus 123 by a hard disk drive interface 132, a magnetic disk drive interface 133, and an optical drive interface 134, respectively. The drives and their associated computer-readable media provide nonvolatile storage of computer readable instructions, data structures, program modules and other data for the personal computer 120. Although the exemplary environment described herein employs a hard disk, a removable magnetic disk 129 and a removable optical disk 131, it should be appreciated by those skilled in the art that other types of computer readable media which can store data that is accessible by a computer, such as magnetic cassettes, flash memory cards, digital video disks, Bernoulli cartridges, random access memories (RAMs), read only memories (ROM), and the like, may also be used in the exemplary operating environment.

A number of program modules may be stored on the hard disk, magnetic disk 129, optical disk 131, ROM 124 or RAM 125, including an operating system 135, one or more application programs 136, other program modules 137, and program data 138. A user may enter commands and information into the personal computer 120 through input devices such as a keyboard 140 and pointing device 142. Other input devices (not shown) may include a microphone, joystick, game pad, satellite dish, scanner, or the like. These and other input devices are often connected to the processing unit 121 through a serial port interface 146 that is coupled to the system bus, but may be connected by other interfaces, such as a parallel port, game port or a universal serial bus (USB). A monitor 147 or other type of display device is also connected to the system bus 123 via an interface, such as a video adapter 148. In addition to the monitor, personal computers typically include other peripheral output devices (not shown), such as speakers and printers.

The personal computer 120 may operate in a networked environment using logical connections to one or more remote computers, such as a remote computer 149. The remote computer 149 may be another personal computer, a server, a router, a network PC, a peer device or other common network node, and typically includes many or all of the elements described above relative to the personal computer 120, although only a memory storage device 150 has been illustrated in FIG. 1A. The logical connections depicted in FIG. 1A include a local area network (LAN) 151 and a wide area network (WAN) 152. Such networking environments are commonplace in offices, enterprise-wide computer networks, intranets and Internet.

When used in a LAN networking environment, the personal computer 120 is connected to the local network 151 through a network interface or adapter 153. When used in a WAN networking environment, the personal computer 120 typically includes a modem 154 or other means for establishing communications over the wide area network 152, such as the Internet. The modem 154, which may be internal or external, is connected to the system bus 123 via the serial port interface 146. In a networked environment, program modules depicted relative to the personal computer 120, or portions thereof, may be stored in the remote memory storage device. It will be appreciated that the network connections shown are exemplary and other means of establishing a communications link between the computers may be used.

Introduction to the Architecture

In a preferred embodiment of the invention, the operating system components contain code and other metadata for classes of objects. When a component is loaded into an address space it is instantiated. The instantiated component creates object instances that communicate with other objects, potentially in other components. The objects expose their methods through Component Object Model (COM) [Brockschmidt95] interfaces. Threads execute code and synchronize through Mutexes and Condition variables. System components are typically written in C or C++ but there is no fundamental bias towards any particular language.

COM enables late binding, version compatibility and checking, transparency through proxies, cross language support, and is reasonably lightweight and efficient. Each object needs a method table pointer and a reference count. Each call adds one indirection for fetching the actual method pointer.

Component implementations in the preferred embodiment of the invention are rarely aware of their intended system layer. The same code can be used in different address spaces or contexts and can be nested. A filesystem can be applied to a file provided by another filesystem as well as to one provided by a disk driver. A heap can be applied to any memory: physical memory, memory allocated from another heap, or memory provided by a virtual memory manager. The loader loads modules into any address space.

Selection of System Components

What components should be part of a deployed system depends upon the application itself and its interface requirements, application memory requirements, security requirements, and the target hardware capabilities. Flexible loading of modules was an important design goal for the operating system described herein. The loading of components can be deferred until they are actually used by an application. Device drivers and runtime services typically fall into this category. Others can be loaded just prior to running an application, such as virtual memory for untrusted applications. Most services will terminate themselves when they are no longer needed.

Drivers and virtual memory can not be used when the hardware to support them is not present. An application that tries to use them will look them up in the demand-loading namespace. The lookup operation fails, either because the driver is absent or it returns a NULL pointer.

Execution Model

Components have code, static data, a stack and a number of dynamic objects. A heap object allows dynamic memory allocations. The stack is pointed to by the stack pointer register; it is allocated from the heap. In a physical memory system the initial size of the stack is also the maximum size of the stack; every byte has to be paid for by real memory. Thus in an embedded application the stack size must be chosen carefully. Most compilers can generate stack checks at function entry, to guard against stack overflows. In a virtual memory system, the stack does not have to be backed by real memory, which can be allocated on demand. The stack only consumes virtual address range and can thus be allocated liberally. A Real-Time application might still want to pre-allocate all memory in order to avoid run time fluctuations. In this case the existence of virtual memory does not affect the stack.

Memory for code and static data is also allocated from the heap. Code can be placed anywhere in memory if it is either position-independent (pc-relative) or relocatable. The Microsoft Visual C++ compiler, for instance, creates a compressed relocation table that the runtime loader uses to fix any references if the executable was placed in a different place in memory than it was linked for. All compilers for embedded use provide similar functionality, although the specific image formats and relocation schemes differ.

On the other hand, it is often found that most compilers do not support reentrancy. If the code in an image is not reentrant, it is still possible to execute multiple instances of the same image in the same address space. The code and data are simply loaded multiple times, each time relocated differently.

If the relocation information is not present, and a component virtually overlaps with another component it cannot be executed in the same address space. In this case a new address space is required, which in turn requires virtual memory.

System Components

An exemplary base set of system components in a preferred embodiment of the invention is now described.

Figure 1B:
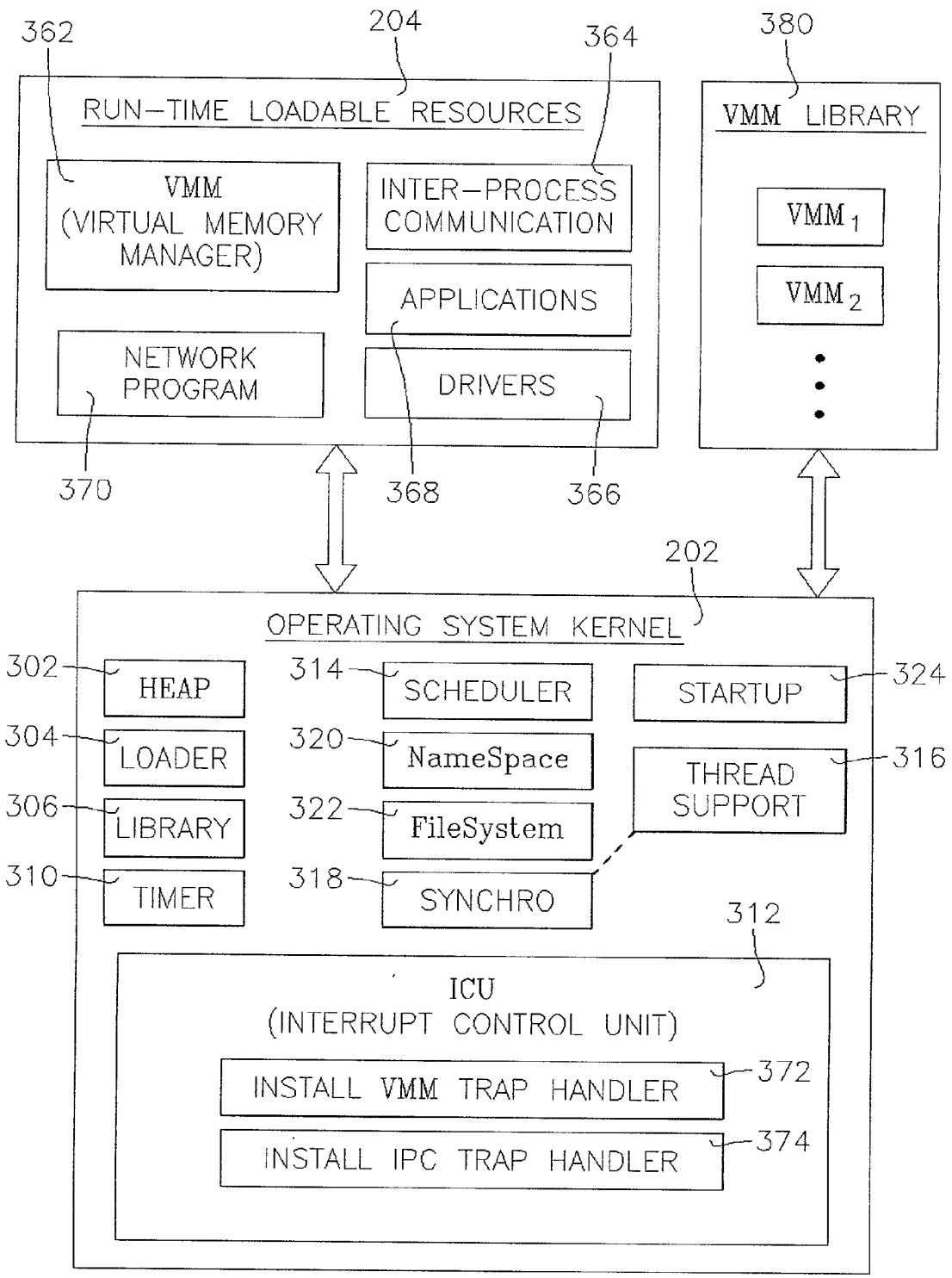
FIG. 1B is a block diagram of an operating system embodying the present invention in the computer illustrated in FIG. 1A.

Referring to FIG. 1B, an exemplary operating system in accordance with an embodiment of the invention has a kernel or link-time component 202 and a set of run-time loadable resources 204. The kernel 202 includes a set of software resources including, preferably, a HEAP (physical memory manager) 302, a loader 304, a support library 306, a timer 310, an interrupt control unit 312, a scheduler 314, thread support 316 including synchronization primitives 318, NameSpace 320, filesystem 322 and a startup program 324. The set of run-time loadable resources 204 are available to the system through the loader 304. The resources 204 include, preferably, a virtual memory manager (VMM) 362, inter-process communication 364, drivers 366, applications 368 and a network program 370. A minimal multi-threaded kernel may be provided in accordance with the present invention having only the thread support 316, the scheduler 314, the library 306, the timer 310 and the startup 324. If multi-threading is not desired, the kernel may be further minimized to include only the library 306, the timer 310 and the startup 324.

As illustrated in FIG. 1B, the ICU (interrupt control unit) 312 preferably includes the following software methods at link time: install VMM (virtual memory manager) trap handler 372, install IPC (inter-process communication) trap handler 374. These resources are preferably included in the interrupt control unit 312 because it is possible for such a system to take a VMM trap or an IPC trap or a page fault whether or not a VMM or IPC has been loaded.

Any one of the components contained in the set of loadable resources 202 may be fetched by the loader 304 and loaded into the operating system on a demand or as-needed basis during run time. The loader 304 registers the name of any such component that has been so loaded in NameSpace 320 so that all users in the system can find the component by querying NameSpace 320.

In particular, the VMM 372 is loadable upon demand into the operating system and may be unloaded when all demand for it disappears.

Different implementations of a virtual memory manager may be selected for different purposes during run time from a VMM library 380 storing a set of VMMs, as shown in FIG. 1B.

Heap

The Heap 302 implements (physical) memory management, allowing dynamic memory allocations with specifiable alignments. The constructor allows creating nested heaps or heaps over virtual memory.

Loader

The Loader 304 is used to load additional components into a running system. Most embedded systems do not provide a loader, and if not needed it can be eliminated at link time from this system as well. Multiple image formats are supported. The loader loads images into the same address space, or given a flag and a virtual memory system, it creates a new address space and loads the image in there.

No particular distinction is made herein between executables and DLLs (shared libraries). An executable is simply a DLL that exports no entry points besides main( ).

Support Library, Machine Initialization

The library 306 is a shared support library and includes common base utilities like memcpy and other compiler support routines, AtomicAdd, CurrentThread, etc. It is used by many system components and is available to applications.

Basic machine initialization code is used at startup and system reset. Most of the machine dependent code of the componentized operating system of the invention resides here.

Timer and Interrupt Drivers

A driver for the timer 310 is used by the scheduler 314 to keep track of time and for thread pre-emption. A driver for the Interrupt Control Unit (ICU) 312 dispatches interrupts and keeps a registry of interrupt routines, which can be installed and removed by other components. The system has no particular notion of a "device driver" per se.

It does enforce strict limits as to what an interrupt routine can do: wakeup a thread.

Scheduler

The scheduler 314 is a policy module that determines which thread should run at any given time. Low-level management of blocking and switching between threads is handled by the thread and synchronization components 316, 318.

The timer interrupt and thread and synchronization modules call into the scheduler 314, possibly passing callback functions as arguments.

Three example schedulers have been implemented: the null scheduler, a round robin scheduler, and a constraint based Real-Time scheduler. The null scheduler is for systems that use only one thread. The round robin scheduler provides time-sharing, it can easily be extended to handle dynamically changing priorities. Constraint scheduling is for consumer Real-Time applications and is described in [Jones97]. The existence of these schedulers proves that the scheduling interface is necessary and sufficient to implement all of the prior art scheduling policies.

Threads and Synchronization

The thread support and synchronization components 316, 318 provide basic thread support and synchronization primitives. Each thread is run in one address space. A thread is usually created in the address space of the component in which it is started. If there is no virtual memory, the address space is always the physical address space. Threads can be created in remote components as well as in local components that are part of the same address space. Threads can block on mutexes and conditions. They can inform the scheduler of their time constraints, but these calls will fail if the scheduler is not a constraint scheduler. The constraint scheduler performs priority inheritance when threads block on mutexes. Preferably, the thread support 316 and scheduler 314 are separated so that the scheduler 314 and be changed while maintaining thread support. So, a third party could change the scheduler 314 without affecting applications, so that the applications and the scheduler are isolated.

NamespacesA simple boot namespace where applications register objects may be provided. The Namespace 320 is a namespace that cooperates with the loader 304 in demand-loading and caching of components. A namespace may be used for displaying the status (e.g. running threads) and performance parameters (e.g. execution times) of a system during development. Filesystems are also namespaces.

Filesystem

Filesystem 322 is used to load additional components during runtime, and as permanent data repository. RomFS is a filesystem for read-only in-memory images (arbitrary files and the system can be merged into one image) and FatFS is for reading/writing disks. NetFile is a network filesystem client built on top of sockets.

Startup Program

Startup 324 is a program that is started once the system has been initialized. It can be a simple command interpreter that configures the system and launches applications, or the (only) application itself.

Network

The Network Program 370 provides the entire BSD4.4Lite network protocol code, with minor adaptations. The interface is a COM interface that provides sockets. The protocols operate the network drivers through another interface.

Other Components

A small Win32 compatibility library may be provided to make it easier to use WindowsNT code in some of the drivers and applications.

How NameSpace is Used to Manage the Loading of Objects

Namespaces are used to let applications gain access to objects provided by other components. A namespace is like a filesystem directory tree, except it can hold any kind of objects, not just files. Namespaces can themselves be implemented by different components, including a filesystem that exports its directories as sub-namespaces, and files as registered objects. Namespaces can be registered into other namespaces, extending the directory tree. Location transparency of all objects automatically makes namespaces distributed. Therefore it is easily possible to view some other machine's NameSpace as a sub-Namespace of one's own machine. Namespaces can be filtered for access control or for providing different views for different applications. There is no limit as to the number of namespaces. A component can gain access to its namespace through a call to CurrentNamespace( ). In a minimal system, all applications share the same boot namespace.

When an application looks up a name in the namespace, it obtains a local direct reference to the object: a local direct reference in case the object is local, or an automatically created proxy if the object is remote. (For remote objects, the interprocess communication (IPC) system described below in this specification is responsible for creating proxies, handling the delegation to remote objects, and reference counting.) A namespace is free to only give access to previously registered objects or to create objects on demand, as it sees fit. The namespace only handles the IUnknown interface. It is up to the application to obtain the proper interface from the object, using the QueryInterface method.

The interface of Namespace includes a method called Bind. The Bind method is used to request an object. The Bind method finds whether the requested object has already been loaded and, if not, Bind obtains the IUnknown interface of the requested object and returns it as an argument. Bind returns a pointer to the IUnknown's pointer to the requested object. Bind is the method that looks up the requested object in Namespace while Register is the method for registering the object in Namespace. After the object has been loaded, the Query Interface method may be used to query the object.

Objects can be made available to other components by registering them in a namespace. Every COM object has a virtual method table and at least the three methods derived from the base interface (the IUnknown) used with Namespace: QueryInterface for agreeing on the interface protocols, and AddRef and Release for reference counting. Specific interfaces have additional methods to do the actual work. In addition, a constructor is usually provided.

Garbage collection is done through reference counting. When Release has called for the last reference, the implementation can finalize and deallocate the object. Even if reference counting has limitations, it is convenient in a system environment due to its simplicity.

Interaction with objects using other garbage collection models can be achieved through proxies that intercept the IUnknown methods to update their root sets.

Loadable Virtual Memory Manager

Virtual memory provides virtual address spaces. Threads run in either a virtual address space or in the physical memory space. Components can be loaded into any address space. Component code may be shared between various address spaces like shared libraries. For instance, any code loaded into the physical memory space is made visible to applications regardless of their address space. There is nothing secret in the system's code, so there is no security problem. Virtual memory can be used to protect sensitive application code, for instance to defend it against disassembly and theft of intellectual property. Unlike most existing operating systems, in the preferred embodiment of the invention the support for virtual memory is not an integral part of the system. The system can function with or without it, and it executes the same executable binary images. The virtual memory manager is a component like any other, and is loaded dynamically on demand.

Loading or unloading of the virtual memory system does not interfere with applications already running, or started later on in the physical memory space. Once the virtual memory system has been started, new components can be loaded into any address space. Component code may be shared between different address spaces, as is the case with shared libraries.

Virtual memory can be used for:

Security reasons, when a program is not trusted. The virtual memory system implements firewalls between applications.

Covering for common programming errors such as NULL pointer references and memory leaks.

Creating a sparse address space. This often leads to better memory utilization with fragmented heaps.

Paging. This provides more memory than available, working set adaptation, and mapped files.

Safe and flexible memory sharing: Copy-on-write for libraries, shared memory windows.

Running non-relocatable executables as described above.

Implementing garbage collection and other protection mechanisms.

In accordance with preferred embodiments of the invention, the virtual memory manager is a loadable component that provides multiple virtual address spaces. It can be viewed as a driver for MMU hardware. It creates virtual memory mappings using physical memory and MMU hardware. Loading and starting the virtual memory manager executable does not interfere with applications already running. Unloading can be done once all references to objects provided by the manager are released. A new one can be started if needed.

A virtual memory space looks like the physical memory space, except it can be larger, doesn't have to be contiguous, can be paged, protected, replicated, and can be (recursively) mapped to other objects.

The virtual memory manager exports a number of control interfaces that are used to create new address spaces (VMSpace), to map address spaces or files to address spaces (VMMap), to link threads to address spaces (VMView), to control state and protections (VMSpace), and to create instances of virtual memory objects (VMFactory).

Figure 1C:
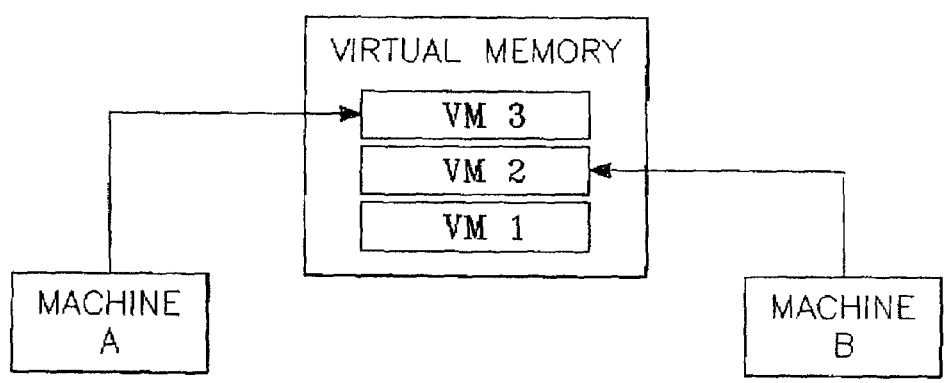
FIG. 1C illustrates one application of the invention to form stacked virtual memories with a local virtual memory.

Realistically, any MMU driver will need exclusive control of the MMU hardware. However, other objects implementing the virtual memory interfaces can be interposed between an application and the MMU driver. In this way, logical virtual memory systems can be arbitrarily composed or, for instance, stacked as in the Exokernel. A stacked virtual memory system relies on another one for its base functionality, but add some specific functionality of its own. For example, the bottom virtual memory manager in the stack could control the local or host machine, while virtual memory managers stacked in higher layers would control other machines thereby providing an application running on top of multiple machines the illusion of running on a single shared memory multiprocessor system. What the present invention facilitates is multiple levels of virtual memories which are recursively stackable. Furthermore, the invention provides transparency. The Exokernel approach was to have a library that implements a virtual memory, so that there is in effect only a single level, since one library cannot be stacked over another library. In the present invention, the different virtual memories exist in different address spaces, so that there is no corresponding limitation on stacking multiple levels, and the stack is remotable. For example, referring to FIG. 1C, the invention can be used to make a collection of different machines (machine-A and machine-B) appear as a single address space by employing a local virtual memory (VM-1) while other virtual memories (VM-2 and VM-3) relating to the address spaces of the other machines but having the same interface as the local virtual memory are stacked over it.

Design

The virtual memory interfaces were designed for flexibility and simplicity:

VMSpace. Methods: Reserve, Delete, Map, Protect, CacheControl, QueryVM, CreateShadow.

Reserve( ) reserves regions in the VMSpace, Delete( ) deletes them. Map( ) maps VMMap objects to the space. Protect( ) sets permanent attributes (e.g. read-only), CacheControl( ) controls transient attributes (e.g. dirty) and paging state (e.g. present). QueryVM( ) returns information about ranges, CreateShadow( ) creates a new mapping, atomically moves ranges from the current mapping to the new one and maps the new one into the current one. It facilitates symmetric copy-on-write. A VMSpace also implements the VMMap interface, returned by QueryInterface( ).

VMMap. Methods: Read, Write, Share, QueryAccess, GetSize, Clone.

Read( ) and Write( ) are used for copy-paging. Share( ) is used to establish shared pages between two VMSpaces and to return pages to VMView::Fault( ). QueryAccess( ) and GetSize( ) return information about the mapping. Clone( ) creates a restricted mapping from the given VMMap. The constructors are used to turn files into mappings and to create memory with no backing store.

VMView. Methods: SwitchTo, Fault, SetMapping, GetMapping.

SwitchTo( ) is called by the context switch path.

Fault( ) is called at page fault time.

SetMapping( ) changes the associated VMMap (and indirectly VMSpace).

GetMapping returns the current associated mapping.

VMFactory. Methods: CreateVmView, CreateVmSpace, CreateVmMappingFromFile, CreateVmMappingFromZero. VMFactory is an object that contains the constructors of other VMM objects.

Process creation works as follows. A new VMSpace and a new VMView are created. The VMView is bound to the VMSpace. A temporary file is created as backing store for zero-fill memory allocations. A VMMap is constructed with CreateFromFile( ), and it is mapped into the VMSpace. A Heap is created from the resulting memory. The file for the executable is looked up from a namespace. A VMMap object is constructed from that file. The VMMap is mapped into the VMSpace copy-on-write, with backing store for any copies coming again from the temporary file. The loader relocates the code if necessary. An IPC channel to the newly loaded component is created. A thread is created with the VMView associated to it. The thread is started by handing it to the scheduler.

Page fault handling works as follows. VMView::Fault( ) is invoked. This in turn calls Share( ) on the associated VMSpace (which also exports VMMap interface). Assuming the page is not present, Share first calls VMSpace::CacheControl( ), which calls VMMap::Read( ) on the file's VMMap, which in turn calls File::Read( ) on the file object. The VMSpace then adds the returned data to its page list and returns a reference to it to the VMView, which adds it to the VTLB (virtual translation look-aside buffer), which makes it available to the hardware.

Memory wiring works as follows. The application invokes VMSpace::Protect( ) with the wire flag set. Protect first calls VMSpace::CacheControl( ) to page in all the pages. VMSpace::CacheControl( ) may fail if the physical memory is exhausted. In this case Protect fails without wiring any pages. Otherwise it marks the pages wired and returns successfully. Any operation affecting permanent attributes is atomic. Those affecting transient attributes are not.

Figure 2:
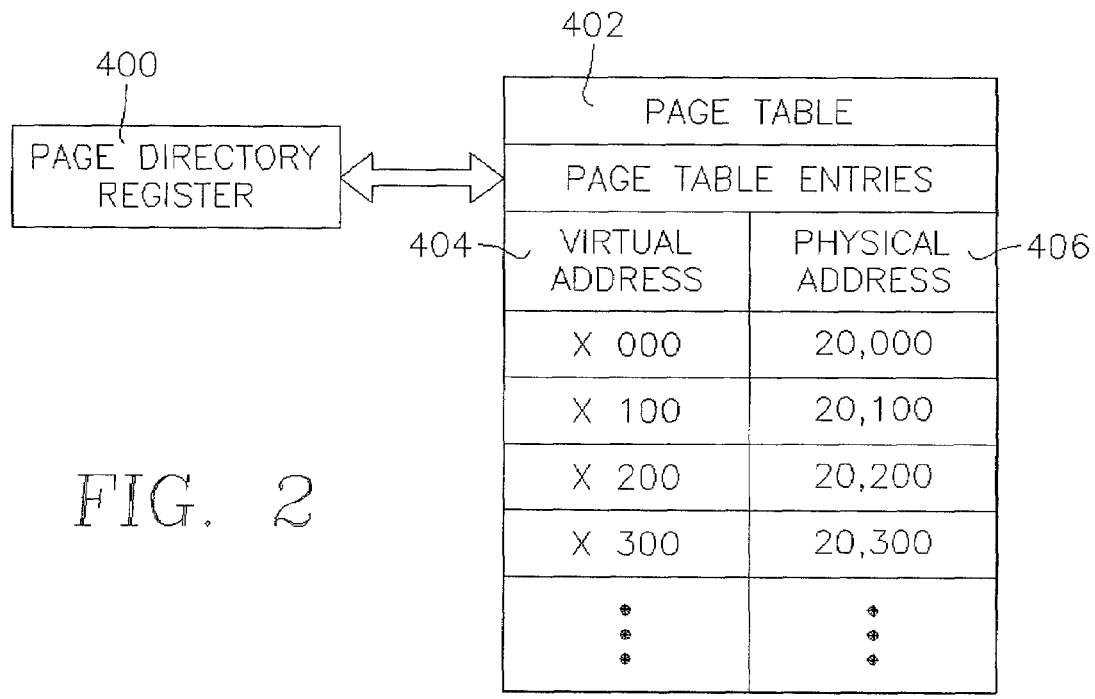
FIG. 2 illustrates a page table registry structure of a virtual memory manager of the operating system of FIG. 1B.

FIG. 2 illustrates how page table entries are used in providing translation between virtual memory addresses and physical memory addresses by the run-time loadable VMM 362 of FIG. 1B. Each VMSpace object stores a pointer value which is loadable into a page directory register 400 provided in the host computer's microprocessor. The pointer value, once loaded into the page directory register 400, points to a particular page table 402 which is one of many page tables available to the system. Each page table provides a particular set of address translations between virtual memory addresses and physical memory addresses. Different objects may be stored in different memory locations and therefore may require different address translations. The individual page table 402 has a set of virtual addresses 404 and physical addresses 406 correlated to corresponding ones of the virtual addresses, the addresses constituting the page table entries of the page table 402.

Certain advantages of virtual memory are realized by controlling the allocation of physical memory. For example, in order to protect certain areas of memory from being written, the page table entry for a particular physical address may include an indication that the address is available for read-only. In order to hold a certain area in reserve or to delay the allocation of physical memory until an actual need arises, the page table entry for a particular physical address may include an indication that the physical address is "invalid". A pointer to the corresponding virtual memory address will cause the system to take a virtual memory trap, as will be described below.

Figure 3:
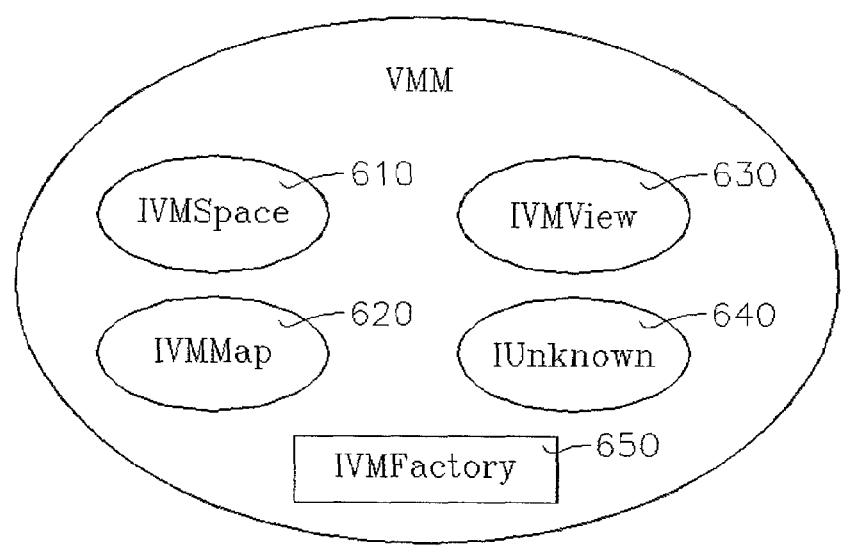
FIG. 3 illustrates the objects in the virtual memory manager.
Figure 4:
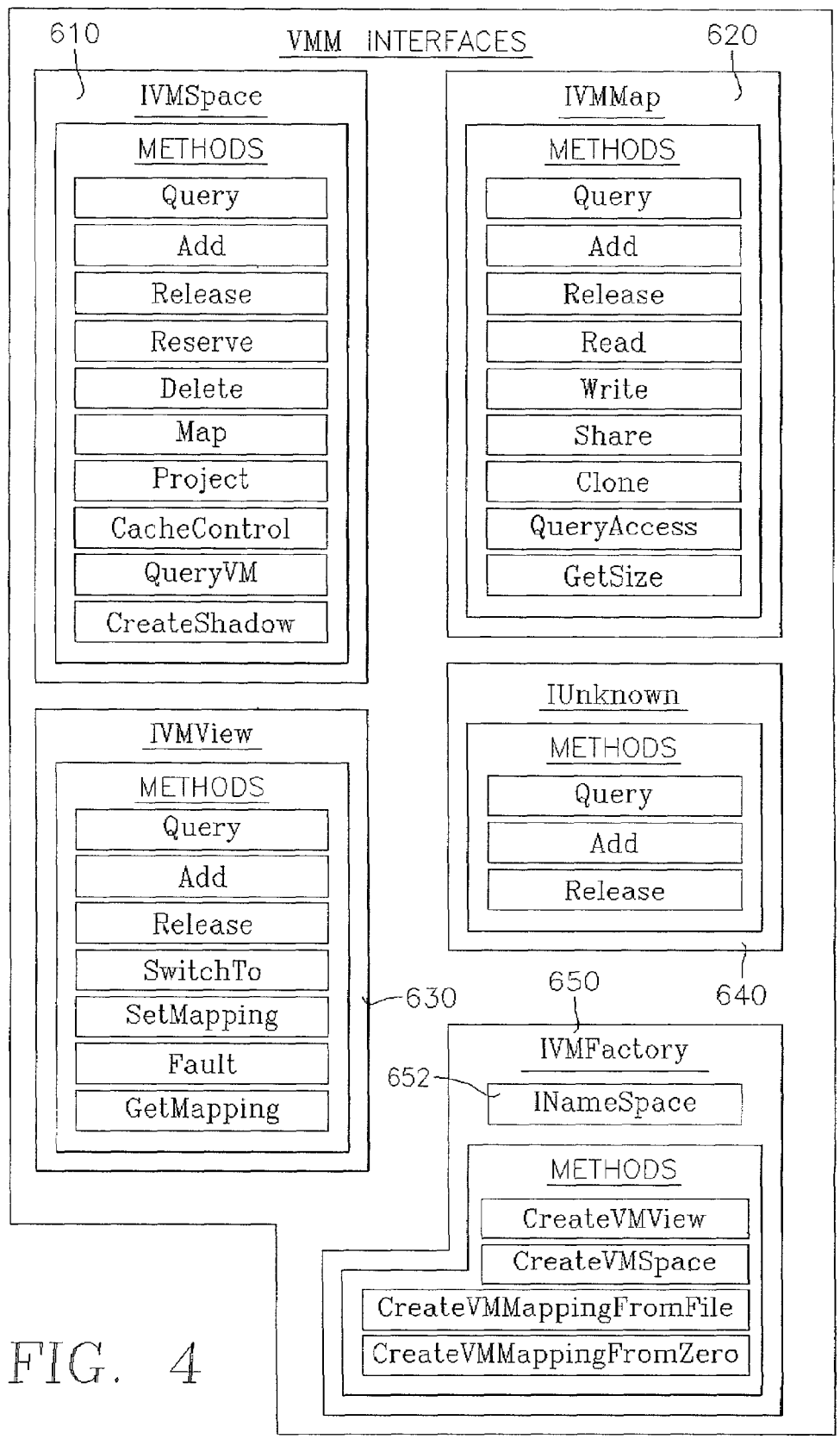
FIG. 4 illustrates the virtual memory manager of FIG. 3 with a set of interfaces.

Referring to FIGS. 3 and 4, the virtual memory manager (VMM) includes the following interfaces: IVMSpace 610, IVMMap 620, IVMView 630, IUnknown 640 and IVMFactory 650. The IUnknown interface preferably is included in every object. The purpose of this is to give every application the ability to query the object to determine if it supports a given interface. IUnknown refers to processes for querying for a given interface ("query"), for adding a reference to the object ("add") and for releasing a reference to the object ("release"). Thus, each of the three primary interfaces of VMM includes the three processes of IUnknown, as illustrated in FIG. 4.

VMFactory 650 has an interface INamespace 652 which it exports. Inamespace is used to enumerate all the objects that one virtual memory manager handles, regardless of whether they have also been registered in the common Namespace.

FIG. 4 illustrates the VMM interfaces as containing particular methods. IVMSpace contains the methods Query, Add, Release, Reserve, Delete, Map, Protect, CacheControl, QueryVM, CreateShadow. IVMMap contains the methods Query, Add, Release, Read, Write, Share, Clone, QueryAccess, GetSize. IVMView contains the methods Query, Add, Release, SwitchTo, SetMapping, Fault, GetMapping. IVMFactory contains the methods or constructors CreateVMView, CreateVMSpace, CreateVMappingFromFile, CreateVMMappingFromZero. IUnknown contains the methods Query, Add, Release.

Figure 5:
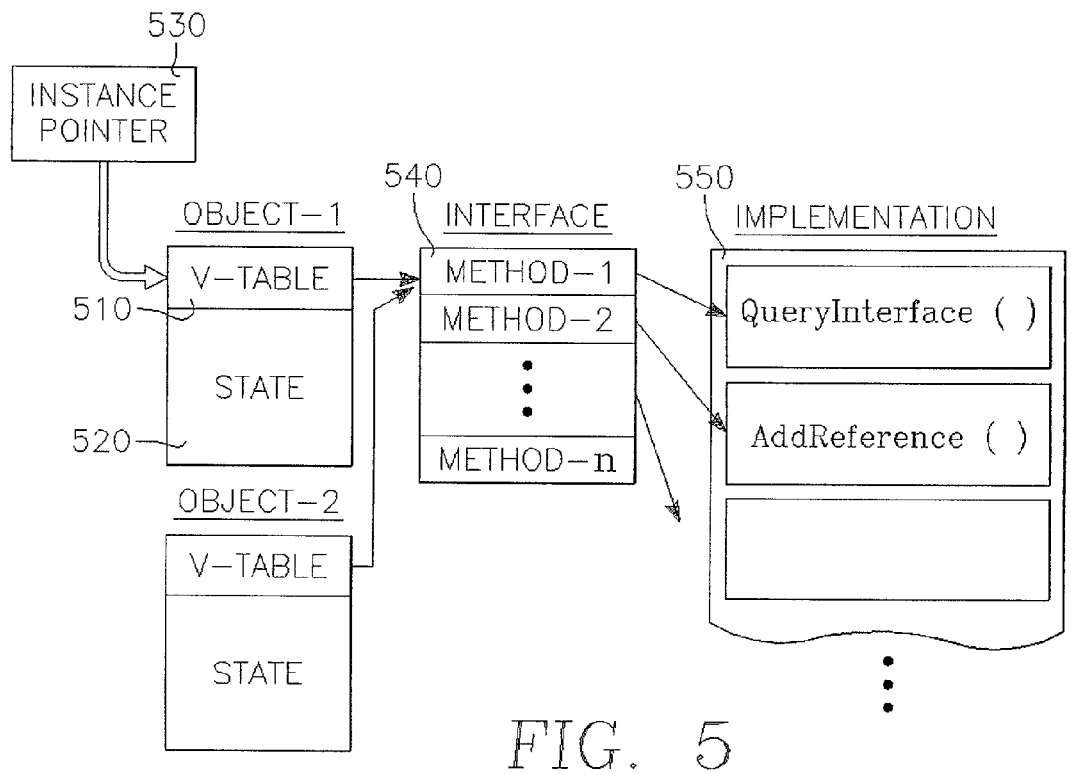
FIG. 5 illustrates the structure of an object in the operating system of FIG. 1B.

FIG. 5 illustrates the internal object architecture employed in a preferred embodiment of the invention. The object has a virtual table (V-table) 510 and a state 520. An instance pointer 530 points to the object. The state 520 can include, for example, the page table register contents, the IUnknown reference count and pointer values. The pointers of an object will be discussed below with reference to FIG. 7.

The V-table 510 points to a particular interface 540, which may be one of many interfaces available to the system. The interface 540 lists a number of processes or methods associated with the particular object. Each method entry listed in the interface 540 points to an implementation 550 of that method. The implementation 550 contains the code for carrying out the algorithm implementing the particular process or method listed in the interface 540. As illustrated in FIG. 5, more than one object may point to the same interface. Of course, it is to be expected that different objects have their own unique interfaces in many instances. For any application calling the object, the object's interface provides a complete list of the processes or methods supported by the object.

Figure 6:
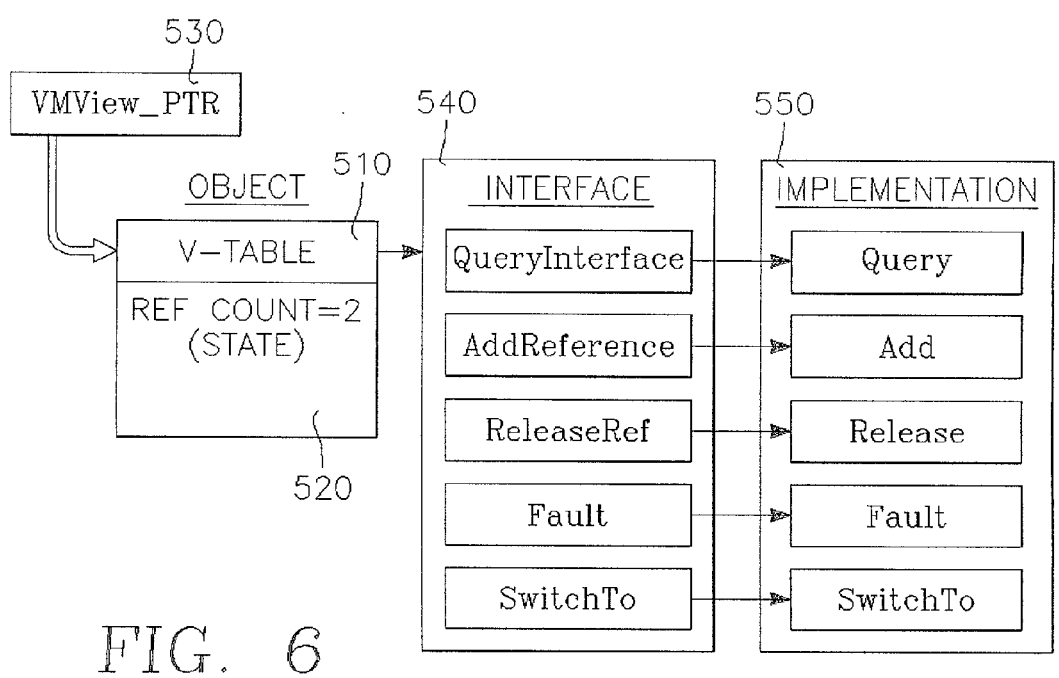
FIG. 6 illustrates the structure of the virtual memory view object of the operating system of FIG. 1B.

FIG. 6 corresponds to FIG. 5 and illustrates the object architecture of the VMView object of the VMM (virtual memory manager). In addition to the three universal IUnknown processes of query, add and release, VMview further includes the processes of fault and switch to. The "fault" process will be discussed below with reference to FIG. 10 while the "switch to" process of VMView will be discussed below with reference to FIG. 12.

Figure 7:
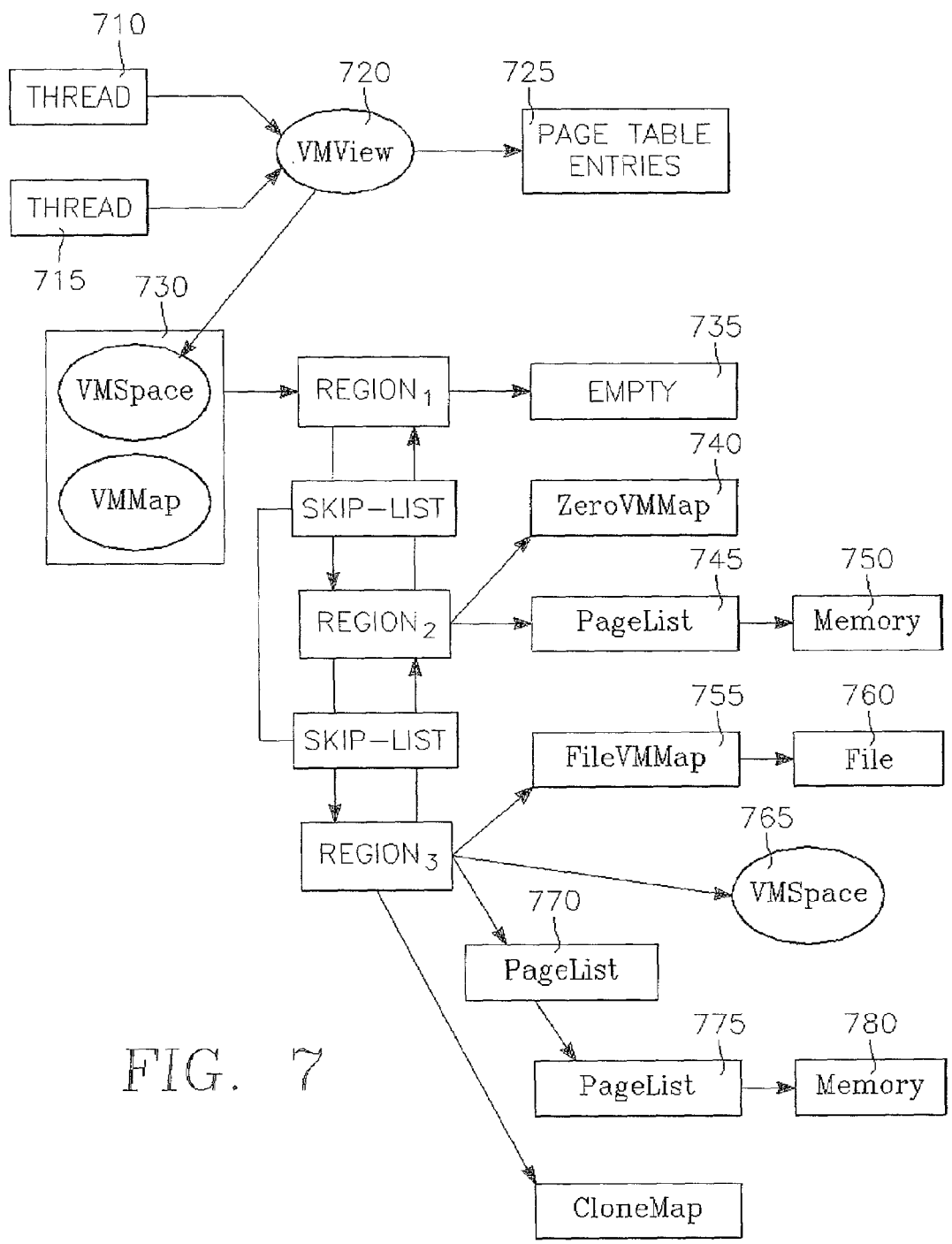
FIG. 7 illustrates the objects in a preferred implementation of the virtual memory manager.

FIG. 7 illustrates a preferred embodiment of the Virtual Memory Manager (VMM). The VMSpace is implemented as a sequence of regions connected by a skip-list of the type well-known in the art. Each region contains a mapping, a copy mapping (for copy-on-write), a number of page lists for physical memory pages, and a set of attributes. Permanent attributes are kept in the region; any transient state is part of the page list. The VMSpace also exports a VMMap interface so that it can be directly mapped into other address spaces. FIG. 7 illustrates mappings by VMMap of various regions of VMSpace to other objects, as will be discussed in more detail below. A VMSpace is 64 bits wide in the preferred embodiment.

The VMView provides a view into a VMSpace for one or more threads. It is limited by the hardware address size (e.g. 32 bits). If the VMSpace it points to is indeed larger (64 bits) then the view is a window into part of that space. A virtual translation look-aside buffer (VTLB) is attached to the VMView. The VTLB contains machine dependent mapping information for the MMU hardware and a translation cache. The VTLB interface is common across all architectures. The rest of the system is unaware of the virtual memory component, with a few exceptions. A thread must hold a pointer to its VMView so that page faults can be resolved within the correct context, and the context switch path must check for a VMView change. If the context switch path detects an address space change, it calls a VMView method to synchronize the MMU hardware with the change. The virtual memory manager registers its interrupt handler with the ICU driver. The Heap may choose to modify its behavior when running over virtual memory. The loader can only create new address spaces when a virtual memory system is present. The IPC system may utilize virtual memory mappings for data transfer.

Referring to FIG. 7, different threads 710, 715 can contain pointers pointing to the same VMView object 720. The VMView object contains pointers pointing to a page of PTEs (page table entries) 725 and to a VMSpace object 730. The VMSpace object 730 points to (defines) Region1, Region2 and Region3, corresponding to different non-contiguous memory regions linked by the skip-list. These regions are mapped to other objects in the manner illustrated in the example of FIG. 7 by pointers provided by the VMMap interface of VMSpace. Region1 is reserved (no writing permitted) and points to an empty space 735 (labelled Empty). Region2 has one pointer to a VMMap object 740 corresponding to a region in memory containing all zeroes, which is labelled ZeroVMMap. Region2 has another pointer to a page list 745. The page list 745 points to a memory 750 having allocated memory spaces in which writing is permitted. Region3 has one pointer to a VMMap object 755 which is an implementation of VMMap for mapping files and is labelled FileVMMap. The FileVMMap has a pointer pointing to a file 760. Region3 has another pointer pointing to a VMSpace object 765 (which is different from the VMSpace object 730 discussed above). The connection through Region3 between the two VMSpace objects 730, 765 supports a copy process. Region3 has yet another pointer pointing to a PageList 770. The PageList 770 has a pointer pointing to a second PageList 775. The second PageList 775 points to a Memory object 780. The linking of the two successive PageLists supports a copy-on-write function.

In summary, the VMMap object can map a region to another VMMap object, examples of which are illustrated in FIG. 7 such as the pointer from Region3 to File VMMap 755 and the pointer from Region2 to Zero VMMap 740. The mapping can be to a different portion of the VMMap object itself rather than another VMMap object. The VMMap object can map to the ZeroMap object providing zero-filled physical pages, as illustrated in FIG. 7 by the pointer to the ZeroMap object 740. The VMMap object can map a region to a VMSpace object, as illustrated by the pointer from Region3 to VMSpace 765. The VMMap object can map a region to a file, as illustrated by the pointers from Region3 to the File VMMap 755 and from thence to File 760. This may include the case of the "system pager" which handles the traditional paging file. Finally, the VMMap object can map a region to a mapping filter ("CloneMap") which, for example, restricts the protections allowed of a mapping, as illustrated by the pointer from Region3 to CloneMap.

A PageList lists what pages have been called by the object. This is useful in case this information is forgotten by the PTE, for example.

The state of an object, such as the virtual memory object of FIG. 7, consists of the pointer values of the various pointers in the object (such as the pointers illustrated in FIG. 7).

Figure 8:
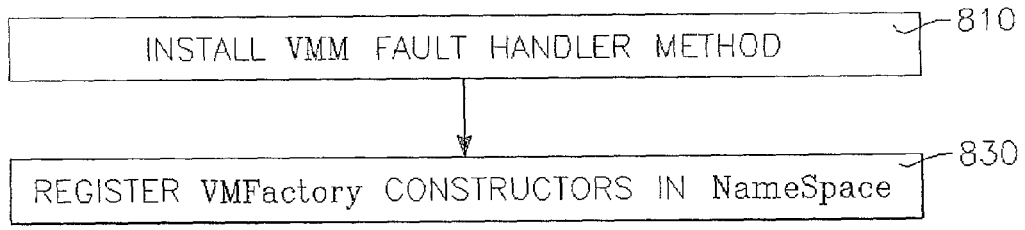
FIG. 8 illustrates the Load VMM process in the operating system of FIG. 1B.

FIG. 8 illustrates the Load VMM (load virtual memory manager) process. The first step (block 810 of FIG. 8) is to install the VMM Fault Handler method. The last step (block 830) is to register the VMM constructors, which are part of the VMFactory interface. This step is carried out by creating an object of the IVMFactory type and registering it into the NameSpace.

A local constructor is a method in an object. In order to export it to another address space, the constructor must be wrapped in a factory object of the type well-known in the art. These objects are designated as "XYFactory". For example, VMFactory can create VM objects. There is a correspondence between C++ classes and factory objects. A C++ compiler could automatically create the factory of an object.

Figure 9:
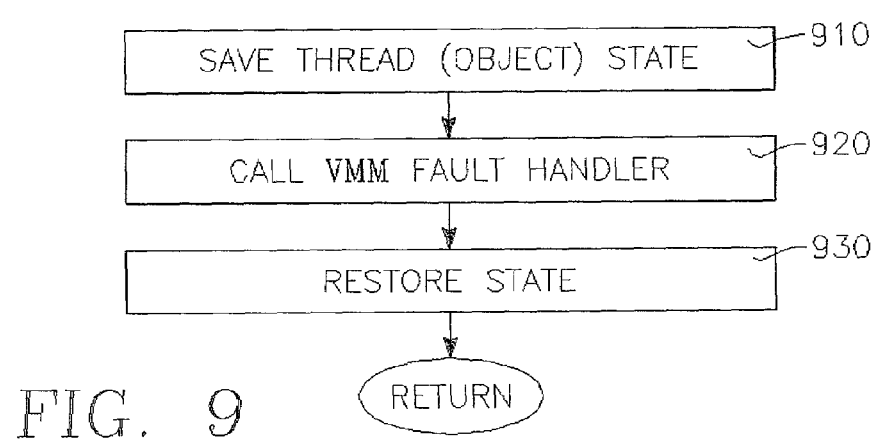
FIG. 9 illustrates the method of handling a virtual memory (VMM) fault in the operating system of FIG. 1B.

FIG. 9 illustrates how a virtual memory fault is handled. The first step is to save the state of the object or thread that was running at the time the fault or trap was taken (block 910 of FIG. 9). Next, the VMM Fault Handler is called (block 920). Then, the state of the object is restored (block 930).

Figure 10:
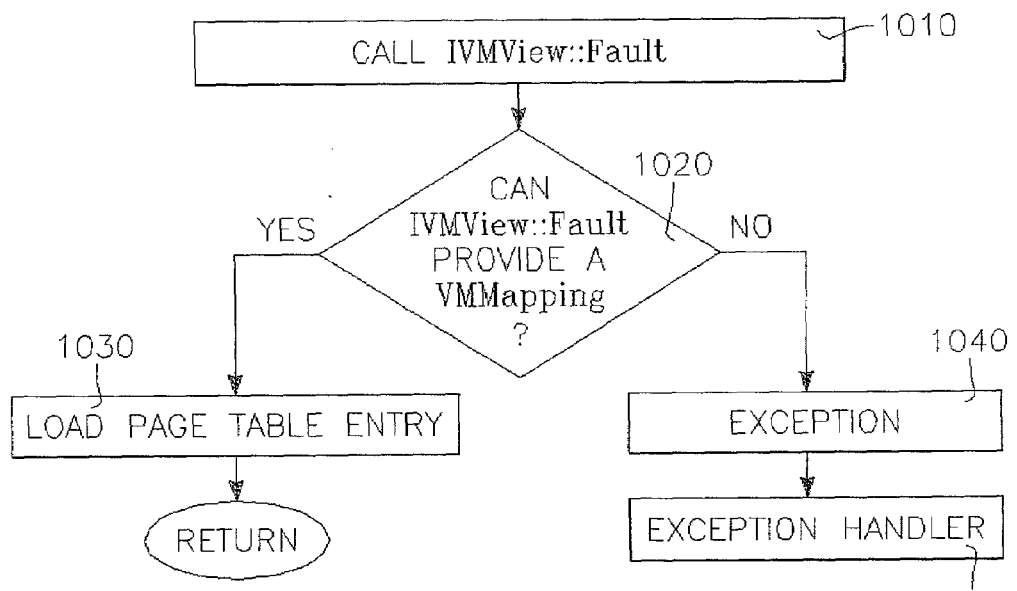
FIG. 10 illustrates the operation of the VMM fault handler in the operating system of FIG. 1B.

FIG. 10 illustrates the operation of the VMM Fault Handler. The first step (block 1010 of FIG. 10) is to call IVMView::Fault. The next step is to determine whether IVMView::Fault can provide a VM mapping (block 1020). If so ("YES" branch of block 1020), the page table entry is loaded (block 1030). Otherwise ("NO" branch of block 1020), an exception is taken (block 1040) and an exception handler is called (block 1050).

Figure 11:
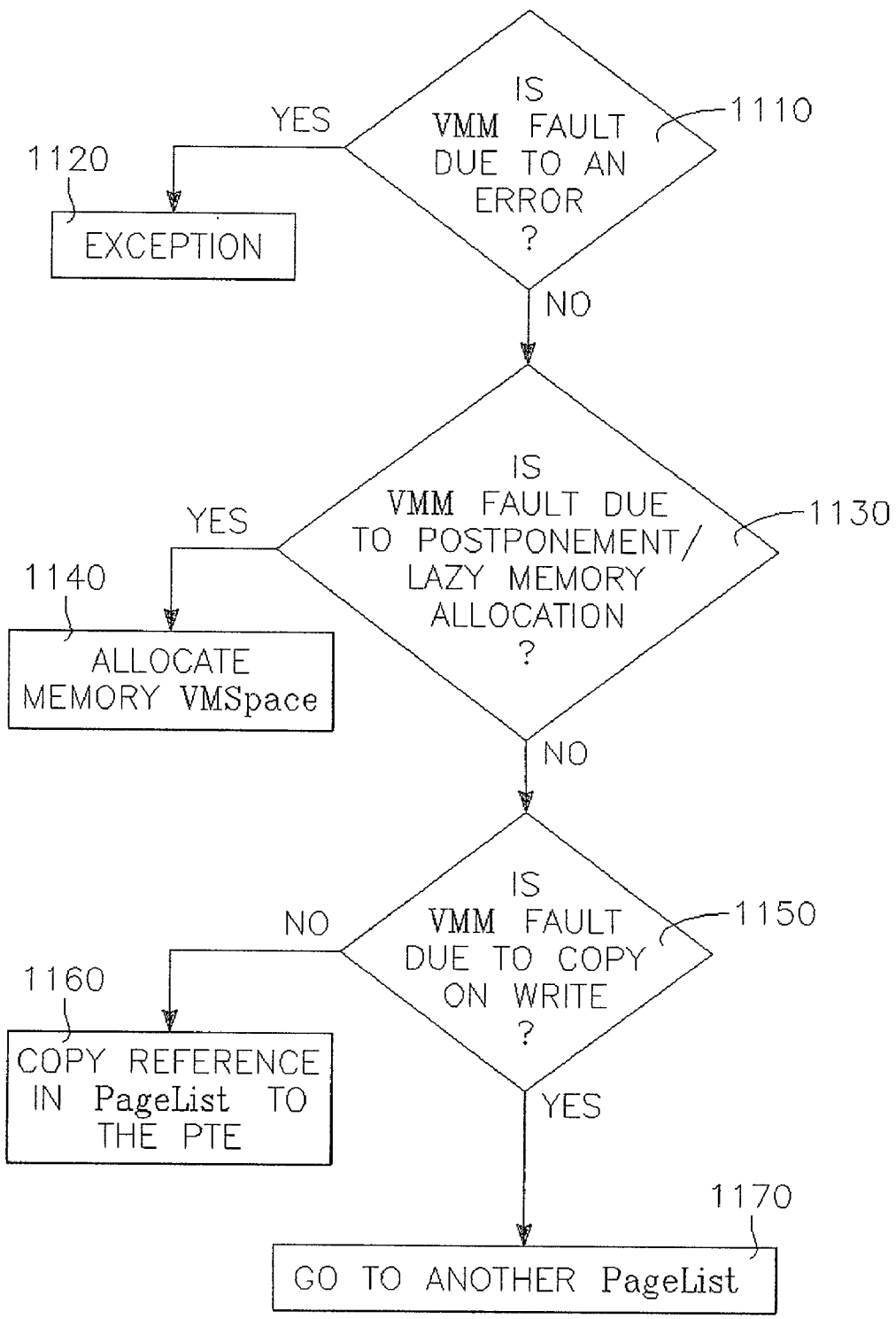
FIG. 11 illustrates the method for taking a VMM fault in the operating system of FIG. 1B.

FIG. 11 illustrates how a VM fault is taken. The first step (block 1110 of FIG. 11) is to determine whether the VM fault is due to an error. If so ("YES" branch of block 1110), then an exception is taken (block 1120). Otherwise ("NO" branch of block 1110), a determination is made whether the VM fault is due to a memory allocation postponement, sometimes referred to as "lazy memory allocation" (block 1130 of FIG. 11). Lazy memory allocation is a feature that can be implemented to guard against premature allocation of memory otherwise caused by early requests by an application. The determination of whether the VM fault-is due to lazy memory allocation is made by determining whether there is any reference to the object in the PageList. If the fault was due to lazy memory allocation ("YES" branch of block 1130), then VMSpace is called to perform the memory allocation (block 1140 of FIG. 11). Otherwise ("NO" branch of block 1130), a determination is made whether the VM fault was due to a copy-on-write process (block 1150). This determination is made by asking whether the current PageList points to another PageList (as discussed above with reference to FIG. 7). If not ("NO" branch of block 1150, the reference in PageList is copied to the page table or PTE (block 1160). Otherwise ("YES" branch of block 1150), the pointer to the other PageList is taken (block 1170 of FIG. 11). This entails allocating a new page, copying the content of the old page to the new page, and then entering the mapping for the new page in the PTEs.

Figures 12, 13:
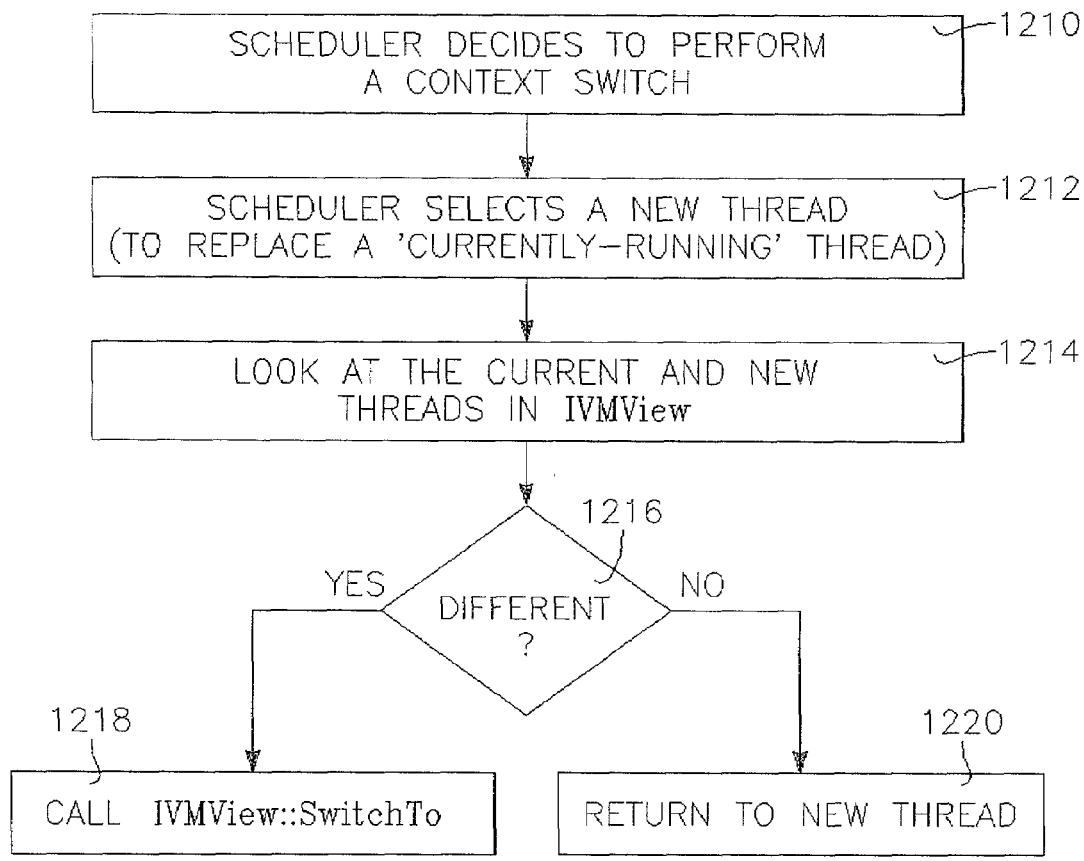
FIG. 12 illustrates the operation of the context switch process in the operating system of FIG. 1B.
FIG. 13 illustrates the SwitchTo process in the operating system of FIG. 1B.

FIG. 12 illustrates the operation of the context switch process. First, the Scheduler (shown in FIG. 1) decides to perform a context switch (block 1210 of FIG. 12). This decision may be occasioned, for example, by a thread running up to a predetermined time limit. As a result, the Scheduler selects a new thread to replace the currently-running thread (block 1212 of FIG. 12). In a preferred embodiment, the next step is to inspect the views of memory provided by IVMView of the current and new threads (block 1214) and determine whether they are different (block 1216). If so ("YES" branch of block 1216), IVMView:: SwitchTo is called (block 1218). Otherwise ("NO" branch of block 1216), the system returns to the new thread (block 1220) without altering the contents of the page directory register 400 of FIG. 2.

FIG. 13 illustrates the SwitchTo process, consisting of the step of loading the page directory register 400 of FIG. 2 with the new page directory value.

Figure 14:
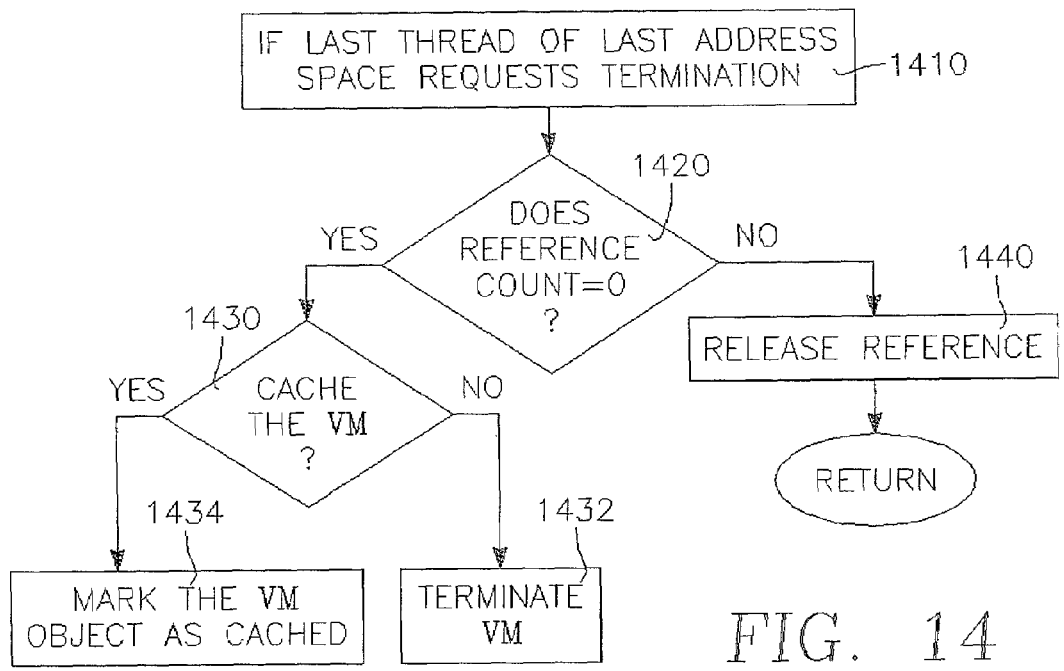
FIG. 14 illustrates the operation for unloading the virtual memory manager in the system of FIG. 1B.

FIG. 14 illustrates the process for unloading the virtual memory manager (VMMUnload). The first step begins whenever the last thread of the last address space using virtual memory requests termination (block 1410 of FIG. 14). The next step is to determine whether the reference count is zero (block 1420). If so ("YES" branch of block 1420), a choice (block 1430) may be made whether to terminate the virtual memory (block 1432) or to mark the VM object as "cached" (block 1434). In the preferred embodiment, the virtual memory manager is terminated (block 1432). Otherwise ("NO" branch of block 1420), the reference is released, which decrements the reference count by one (block 1440).

Figure 15:
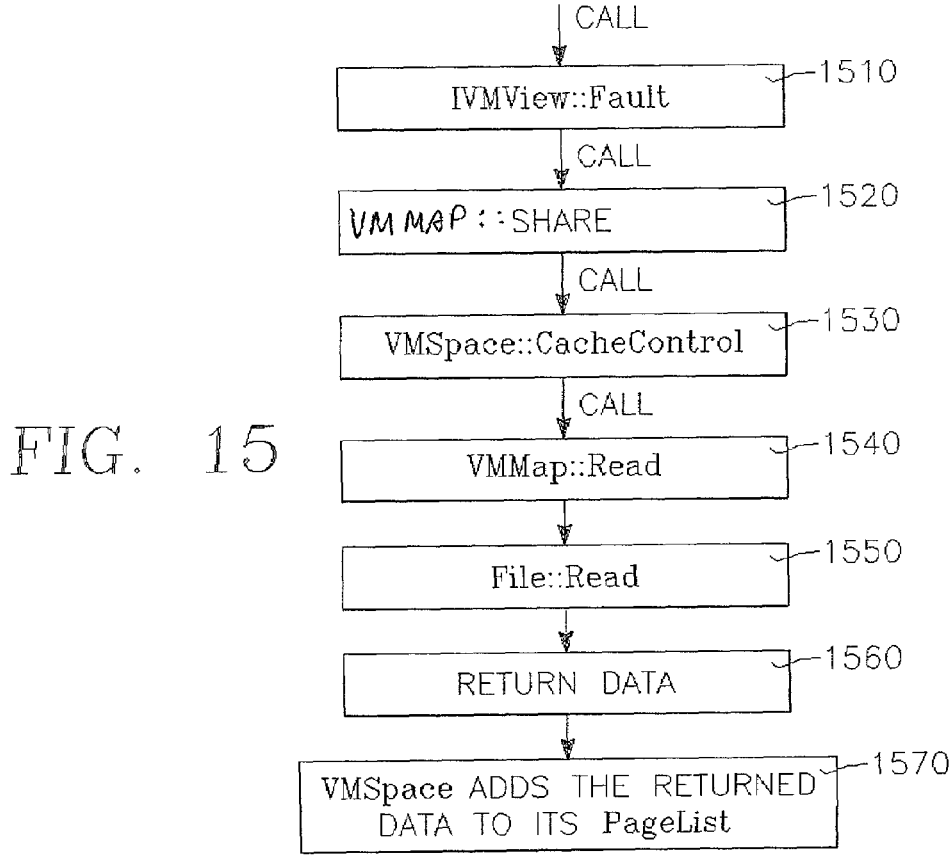
FIG. 15 illustrates the process for handling a page fault in the system of FIG. 1B.

FIG. 15 illustrates the page fault handling process. The first step is to call IVMView::Fault upon the occurrence of a page fault (block 1510). IVMView::Fault calls VMMap:: Share (block 1520) which in turn calls VMSpace::Cache-Control (block 1530), which in turn calls VMMap::Read (block 1540). VMMap::Read calls File::Read (block 1550), which returns data—such as the content of a file, for example—(block 1560 of FIG. 15). Finally, VMSpace adds the returned data to PageList (block 1570).

Figure 16:
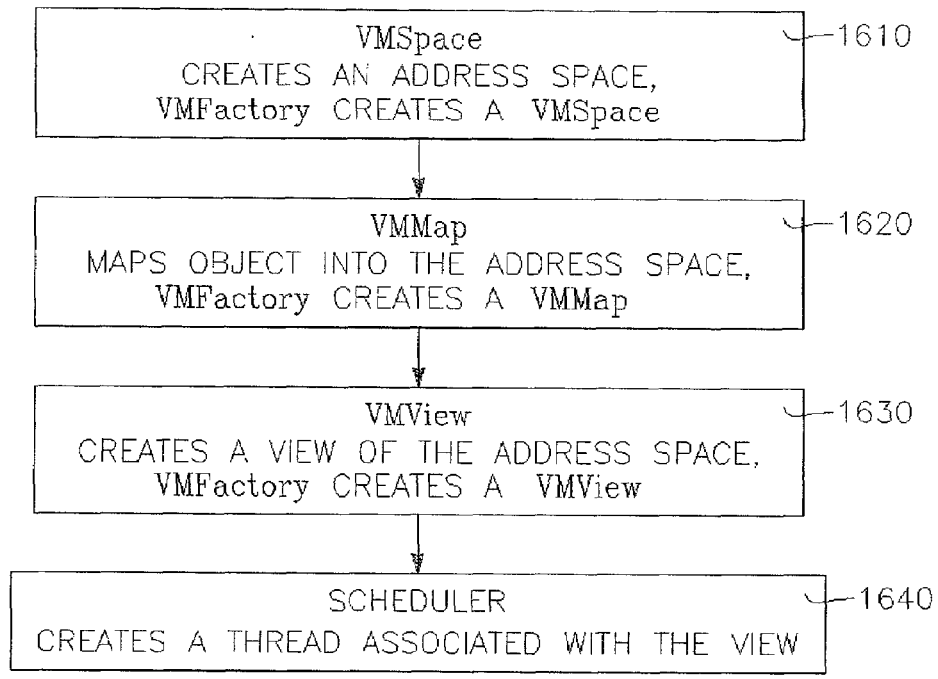
FIG. 16 illustrates a process by which a constructor creates a thread in the operating system of FIG. 1B.

FIG. 16 illustrates how a constructor creates a thread. First, VMFactory creates a VMSpace, and VMSpace creates an address space (block 1610). Next, VMFactory creates a VMMap and VMMap maps an object into the address space (block 1620). Then, VMFactory creates a VMView and VMView creates a view of the address space created in the previous step (block 1630). Finally, the scheduler creates a thread associated with the view created in the previous step (block 1640).

Figure 17:
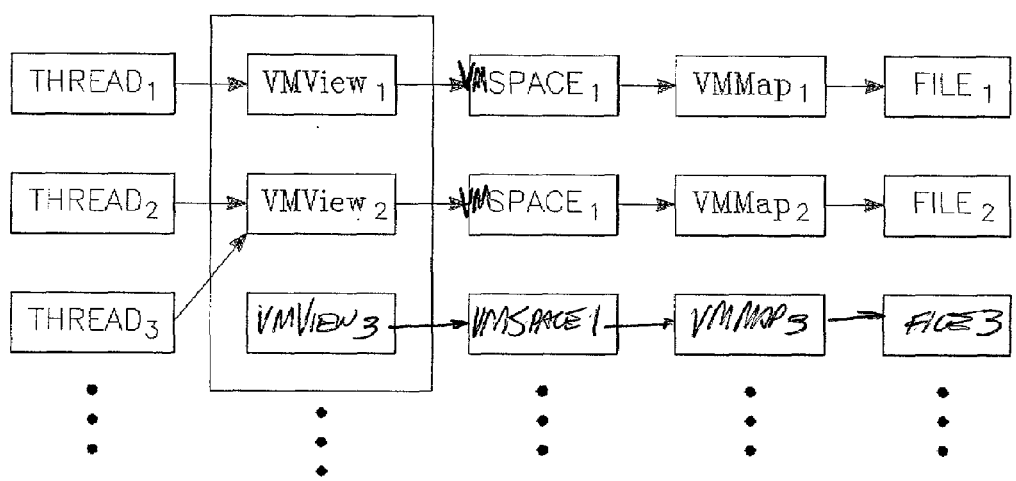
FIG. 17 illustrates multiple views of memory provided by the VMView object of the operating system of FIG. 1B.

FIG. 17 illustrates how multiple views of the same memory space are provided for multiple threads. In the example of FIG. 17, two different threads, THREAD1 and THREAD 2 are directed by the PTE to two different views, VMView1 and VMView2, respectively, of the same memory space, VMSPACE1 through the PTE. For THREAD1, VMSPACE1 has a pointer to VMMap1 which points to File1. For THREAD2, VMSPACE1 has a pointer to VMMap2 which points to File2.

Figure 18:
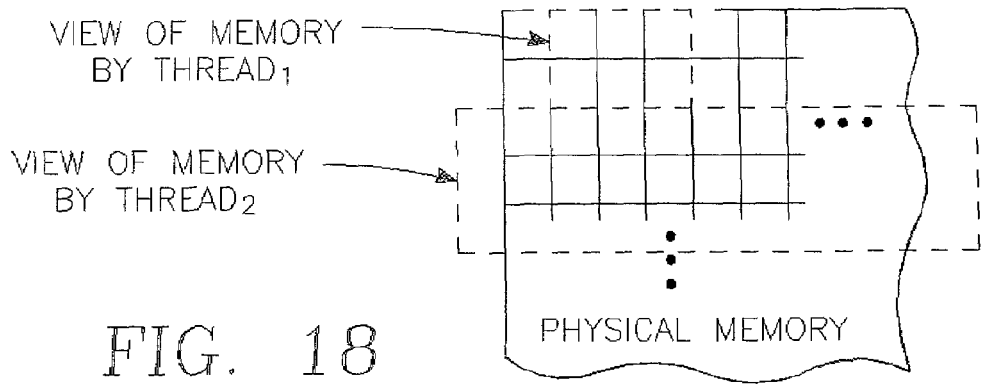
FIG. 18 illustrates multiple views of memory that can be obtained in accordance with FIG. 17.

FIG. 18 illustrates possible results of the implementation of FIG. 17. In FIG. 17, the view of memory by THREAD1 may make the memory appear smaller than its actual physical size, which the view of THREAD2 may make the memory appear to have a wider address field than that of the actual physical memory. For example, the actual physical memory may have an address space that is 32 bits wide while it appears to be 64 bits wide in the view of memory provided to THREAD2. On the other hand, the physical memory address space may be 64 bits wide while it appears to be only 32 bits wide in the view provided to THREAD1. In a more complex case, the address space widths of the objects VMView ("THREAD1") and VMSpace ("THREAD2") and of the physical memory may all differ from one another, being in one example 32 bits, 64 bits and 36 bits, respectively. The address space width in VMSpace may be chosen without regard to the address space widths of the virtual memory and the physical memory.

The virtual memory interfaces described here loosely correspond to the Mach external memory manager scheme [Young89]. VMView and VMSpace replace Mach's task. Memory objects are replaced by VMSpaces. VMMap and VMSpace jointly implement the XMM interface, although with synchronous interfaces only. The VTLB interface is a refinement of the Pmap interface.

In other implementations of the invention, one could emulate Unix or Windows virtual memory APIs, and the design would easily permit it (including fork).

Loadable Interprocess Communication (IPC) Manager

An IPC system is needed if applications are to be run in separate address spaces. Otherwise the applications can not talk to each other or to system services. An IPC system allows:

Communication between address spaces within a machine.

Communication between applications in different machines in a distributed environment.

Graceful termination and cleanup of applications even within one address space.

Cleanup involves releasing the memory held by an application. It also involves closing all references into and out of the application's objects. A level of indirection is needed for bookkeeping and for providing a cutoff point. This level of indirection is what an IPC system provides.

A preferred embodiment of the IPC system implements the COM model. It is possible, however, to replace it with another communication model for applications that expect a different model. Components implementing various communication paradigms can be loaded into the system as needed.

The preferred interprocess communication (IPC) manager is a run-time loadable resource residing outside of the operating system kernel, as illustrated in FIG. 1B. The loader can load the Loadable IPC Manager at any time based upon need. The Loadable IPC Manager can also be unloaded whenever it is no longer required by any applications currently running.

Figure 19:
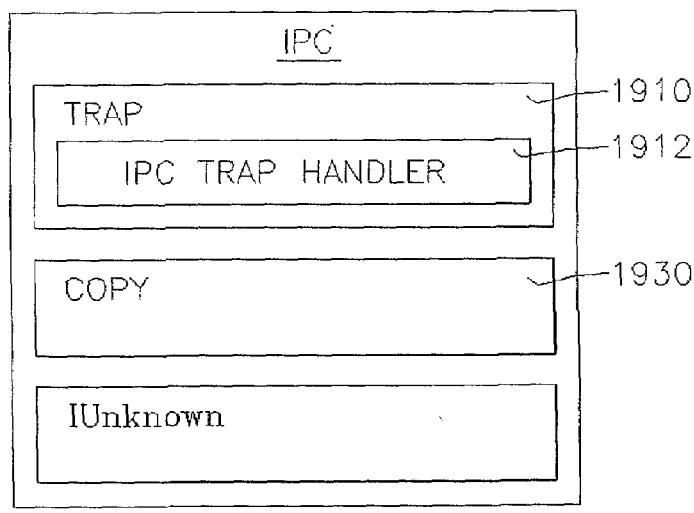
FIG. 19 illustrates the basic features of a loadable inter-process communication (IPC) manager in the operating system of FIG. 1B.

FIG. 19 illustrates the basic components of the Loadable IPC Manager. A trap component 1910 consists of a program to install the method IPC Trap Handler 1912, which is called whenever the system recognizes a need within the currently-running thread to communicate with another thread or a need to communicate with a thread in another machine. A copy component 1930 can be implemented with either a simple "copy" function or virtual memory or shared memory.

Figure 20:
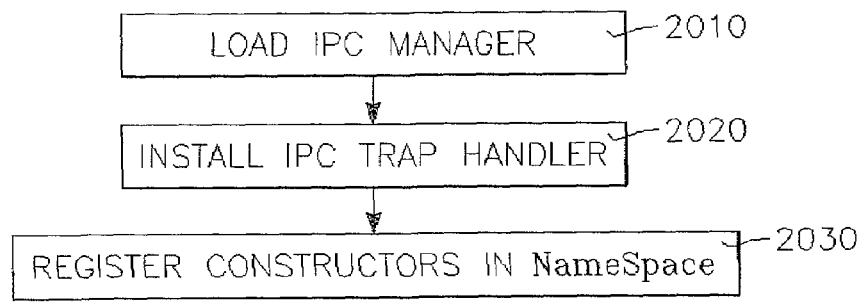
FIG. 20 illustrates the process of loading of the IPC manager of FIG. 19.

FIG. 20 illustrates the operation of the Loadable IPC Manager, which may have the file name IPC.EXE in a preferred implementation. The first step is to load the Loadable IPC Manager (block 2010). The next step is to install the IPC Trap Handler (block 2020). Finally, the IPC constructors are registered in NameSpace (block 2030).

Figure 21:
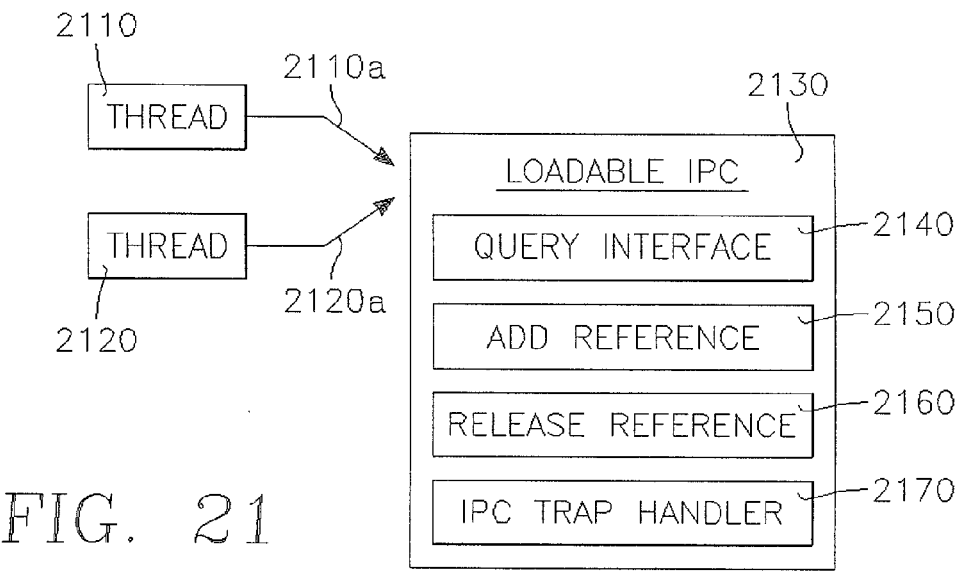
FIG. 21 illustrates an interface between the IPC manager and other threads.

FIG. 21 illustrates the structure of the interface between the loadable IPC and threads that use it. In the exemplary case of two threads 2110, 2120 which use a particular Loadable IPC Manager 2130, each thread has its own FIGURE pointer 2110a, 2120a pointing to the Loadable IPC Manager 2130. The Loadable IPC Manager 2130 has interfaces for the following methods: Query Interface 2140, Add Reference 2150, Release Reference 2160 and IPC Trap Handler 2170. As will be discussed later in this specification, each one of these methods and interfaces is replaceable.

Figure 22:
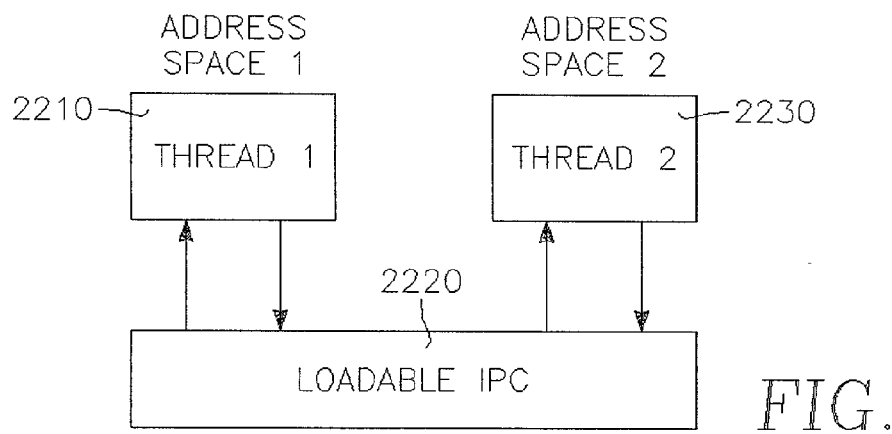
FIG. 22 illustrates intercommunication provided by the IPC manager between different address spaces.

FIG. 22 illustrates the intercommunication provided by the Loadable IPC Manager between threads in different address spaces. One thread (THREAD1) resides in a first address space 2210, and has a pointer to a loadable IPC Manager 2220. At some point in the running of THREAD1, it causes the Loadable IPC Manager to provide communication with another thread (THREAD2) in another address space 2230. Both THREAD1 and THREAD2 have a pointer to the Loadable IPC Manager 2220. The Loadable IPC Manager provides the requisite communication between THREAD1 and THREAD2. For example, THREAD1 may need to increment a counter controlled by THREAD2 in the other address space. The magnitude of the increment may need to be communicated to THREAD2 and the value of the count after incrementation may need to be returned to THREAD1, in some cases. The Loadable IPC Manager handles both of these communications, thus providing two-way communication between THREAD1 and THREAD2 as illustrated in FIG. 22.

The IPC process begins when THREAD1 signifies a need to go to another address space to access some resource in that other address space. In one implementation, THREAD1 makes a remote procedure call directed to a resource controlled by THREAD2 in the other address space 2230. Such a remote procedure call is transparent to the application running. Since THREAD1 is currently running in the current address space 2210, the thread takes an IPC trap.

Figure 23:
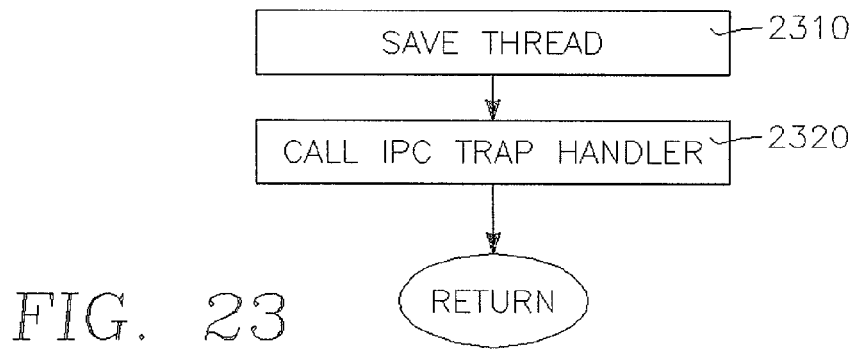
FIG. 23 illustrates how an IPC trap is handled in the operating system of FIG. 1B.

FIG. 23 illustrates how an IPC trap is handled. First, the state of the currently running thread (THREAD1) is saved (block 2310). Then, a call is made (block 2320) to the IPC Trap Handler which (unlike the Loadable IPC Manager stored outside of the operating system kernel of FIG. 1) resides within the operating system kernel.

Figure 24A:
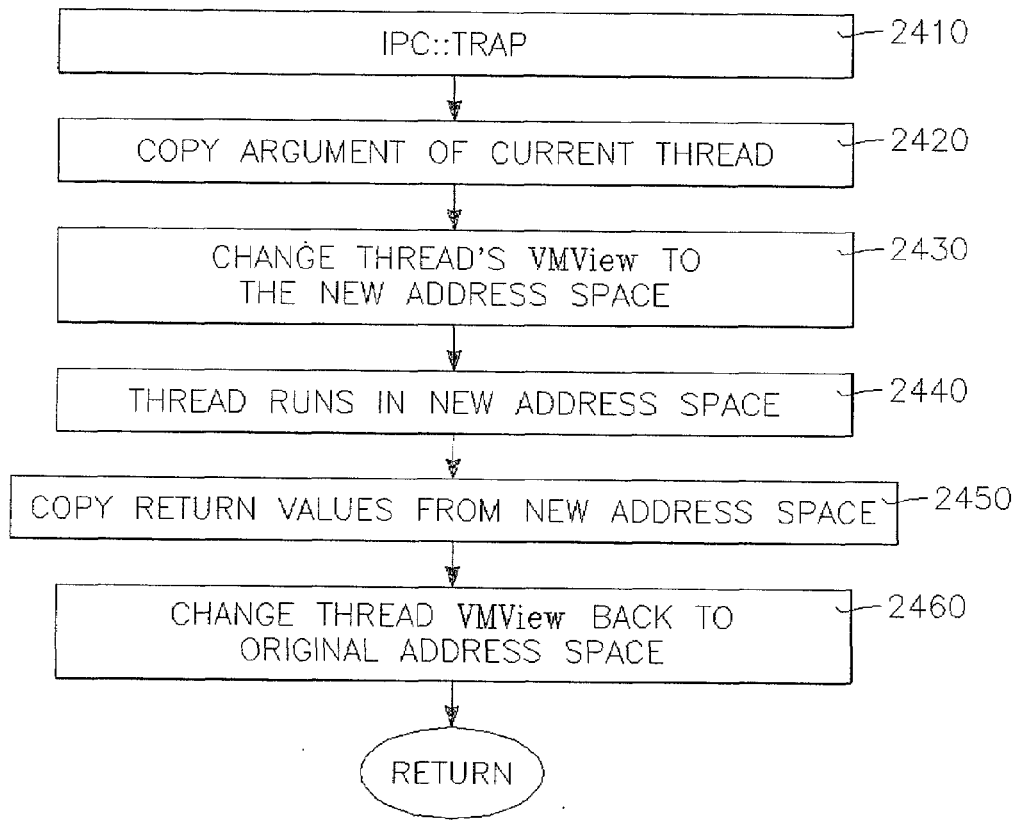
FIG. 24A illustrates the operation of the IPC trap handler in the operating system of FIG. 1B.

FIG. 24A illustrates the operation of the IPC Trap Handler. First is the occurrence of an IPC trap (block 2410). The next step is to copy the arguments of the currently running thread (block 2420). These arguments may be, for example, the identity of a counter in another address space. The thread traps into the loadable IPC system so that its VMView is changed to the VMView that points to the new address space (block 2430). The thread continues running in the new address space where it invokes an object or method that can produce desired information or data such as a new incremented counter stored in a register (block 2440). The next step is to return the values of the new data from the thread (block 2450). Then, the thread switches back to the original VMView (block 2460). In contrast, conventional IPC systems (which were not loadable as the IPC of the present invention) typically did not move the thread from one address space to the other. Instead, the desired information in the second address space was obtained by selecting and running a different thread in that second address space. In contrast, the preferred embodiment of the loadable IPC of the invention uses a single thread and moves between among address spaces by changing its VMView. However, an alternative embodiment of the loadable IPC of the present invention could be implemented using the conventional technique employing different threads.

Structure of a Loadable IPC System

The loadable IPC system of the invention (hereinafter referred to as the "LIS") differs in structure from a non-loadable one in the handling of the dependencies upon other subsystems (such as the scheduler and the virtual memory). The LIS can only have dynamic dependencies, and therefore cannot use any "backdoor" or make assumptions about the internals of other components. The LIS finds these components in the NameSpace, most likely at initialization time. If a specific component is not found or cannot be loaded, the LIS fails to initialize and unloads itself.

It is possible for the LIS to require specific interfaces from these other components, which it asks for via the Query Interface method. This could mean that not all virtual memory managers would be suitable for a given LIS, only those that implement the interface(s) the LIS requires. The converse is also true: all virtual memory managers that implement the required interfaces should be suitable for LIS use. In the preferred embodiment of the LIS of the invention, it is an interface definition error for a component to violate this rule.

Different LISs can depend on different sets of other components. Specifically, it is possible for a simple LIS not to require a virtual memory manager and still be fully functional. For instance, such a LIS would be useful for connecting two simple computers that do not possess a memory management unit(MMU).

The LIS provides two classes of services: administration services and communication services. Administrative services support the creation, linking and destruction of communication endpoints and any other ancillary service. Communication services involve the transmission of the input and output arguments of an RPC and the creation and management of proxies and method signatures. An application requests these services from the LIS in an architectural and LIS-dependent way. More specifically, a processor usually provides special instructions to request system services ("system calls"); execution of such an instruction causes a processor trap. The LIS can be viewed as the system handler for such a trap. The LIS is handed the state of the thread at trap time. It is then LIS-dependent what elements of the thread state are intended to convey information to the LIS. For example, a certain processor register might contain the index of the service the application requires. Different embodiments of the LIS could offer different services, and use different register use conventions for argument passing.

A thread is associated with a specific LIS. Different threads can be associated with different LIS's. If two LIS's do not communicate, then their client threads also cannot communicate. It is not preferable to split a single computer into two or more non-communicating subsystems, except for the extreme case of highly secure systems. Therefore, the most practical case is the one where multiple LIS's are able to communicate among each other. In the present invention, this can be accomplished quite naturally by loading all LIS's in the same address space, making them visible in a common NameSpace, and using normal object invocation for their interaction.

Interfaces and Methods

A preferred embodiment of LIS.EXE has five internal (not exported) interfaces: ILISFactory, IPCSpace, IEndPoint, ISignature, and IEndPointTable.

ILISFactory::CreateIPCSpace ( ) creates an IPCSpace with one empty ExportTable and one empty ImportTable. Both tables are IEndPointTables.

ILISFactory::CreateEndPoint(IPCSpace,ObjectPointer) creates an EndPoint in the given IPCSpace, to represent the object at virtual address ObjectPointer. The EndPoint has the IUnknown default signature associated with it. The EndPoint receives a new IPID, which is a 128 bit universal identifier uniquely associated with the EndPoint.

ILISFactory::CreateSignature(IID,ParsingString[ ]) creates a type signature given an array of properly formed parsing strings. Each string describes the type signature of one method. There are as many strings as there are methods in the interface. IID is the 128 bit universal identifier for the interface.

IPCSpace::GetImportTable ( ) returns the ImportTable associated with the given IPCSpace.

IPCSpace::GetExportTable ( ) returns the ExportTable associated with the given IPCSpace.

IEndPoint::SetSignature(ISignature) changes the signature of the given EndPoint.

IEndPoint::GetSignature ( ) returns the signature of the given EndPoint.

IEndPoint::GetIPID ( ) returns the IPID of the EndPoint.

ISignature::GetParsingString(MethodNumber) returns the parsing string for the given method number.

IEndPointTable::Add(EndPoint)adds an endpoint.

IEndPointTable::Remove(EndPoint) removes an endpoint.

IEndPointTable::Lookup(IPID) looks up the ID number of the endpoint.

In addition to the interfaces described above, LIS.EXE makes use of Proxies inside the application address space. A Proxy is an object like any other, but it merely acts as the representative of some other remote object. The application invokes methods on the proxy, and the proxy's implementation for all methods simply traps to LIS.EXE. Two notable exceptions are the AddRef and Release methods, which maintain a local reference count. Only the Release method traps, and only when the local reference count goes to zero. Other embodiments of LIS might not require the use of proxies.

Operational Overview of the Loadable IPC System

Figure 24B:
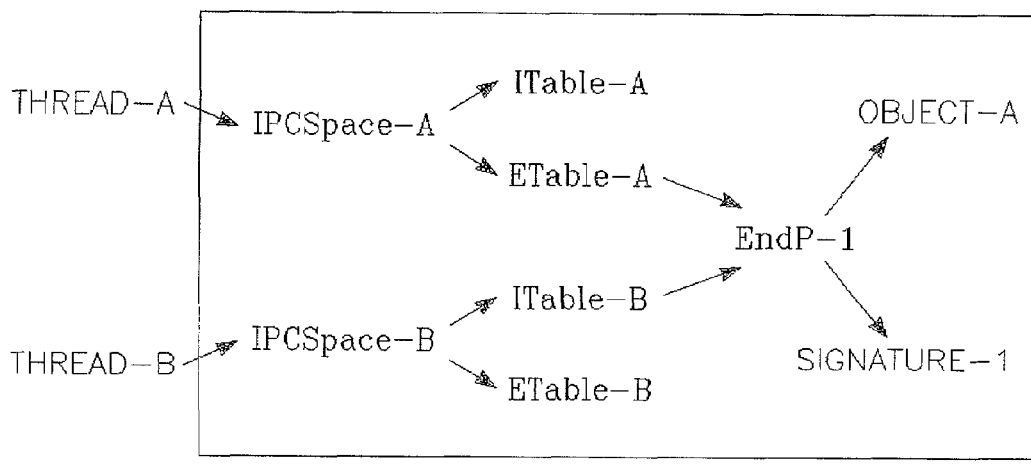
FIG. 24B illustrates objects inside the loadable IPC system of a preferred embodiment of the present invention.

FIG. 24B illustrates how instances of these interfaces are related. In the drawing, two threads belong to two different applications. Thread-B was given access to the endpoint EndP-1.

LIS.EXE handles the NameSpace specially, for three reasons. LIS.EXE is responsible for exporting primitive ('kernel') objects to its clients. These are the objects that are found in the boot NameSpace, but for which LIS.EXE does not have an EndPoint. Other components that are loaded in the physical address space along with LIS.EXE can create and register objects in the boot NameSpace before and/or while LIS.EXE is loaded and active. When an application looks up one such object in the NameSpace, LIS.EXE automatically creates an EndPoint in the primitive IPCSpace. Secondly, when an application calls INameSpace::Bind( ) to obtain access to a remote object, LIS.EXE must be able to intervene and create a Proxy for the remote object in the application's address space. Similarly, when an application wants to INameSpace::Register( ) an object, LIS.EXE must be able to intervene and remember which VMSpace was associated with the object.

Finally, when an application terminates abnormally LIS.EXE cleans up after it. Among other things, LIS.EXE is responsible for removing from the NameSpace all objects that belonged to the dead application.

An application thread is associated with a given LIS at thread creation time. More specifically, the LIS associates an IPCSpace instance to the VMSpace of the thread. This IPCSpace instance is the object passed to LIS.EXE at trap time. Other per-thread information that is used at trap time is the service requested, object IPID, method number, and the stack pointer register to access the arguments of the method call.

An application thread can find LIS.EXE in the NameSpace. An IPCSpace contains an ImportTable and an ExportTable, each table containing pointers to EndPoints. The ExportTable points to EndPoints that the IPCSpace exports to other IPCSpaces. As a result, the application associated with that IPCSpace fully implements the object the EndPoint represents. The ImportTable acts as a security filter; it only allows a thread access to those remote objects that it was granted access. The ImportTable can also be used as a renaming table: the application uses local names for remote objects that are only meaningful when used with the application's ImportTable.

An EndPoint has a unique ISignature. This provides an advantage in the effect of the QueryInterface method: when an application invokes QueryInterface on a remote object, it truly receives a new proxy for a new EndPoint.

In the example illustrated in FIG. 24B, Thread-A creates an EndPoint EndP-1, passing in a Signature Signature-1 and a virtual address Object-A. The EndPoint is entered in the ExportTable ETable-A of the thread's IPCSpace-A. A reference is taken on the thread's VMSpace-A (not shown). Thread-A now registers the EndPoint in the NameSpace. One reference is taken on the object and one on the EndPoint, to signify that the object is exported and visible in the NameSpace.

Generally, threads do not explicitly create EndPoints; they register objects in the NameSpace. It is LIS.EXE that automatically creates an EndPoint for the objects as part of its overriding of the INameSpace::Register( ) method. Alternatively, a method invocation might require the passing of an object as argument or as return value. Again, LIS.EXE automatically creates an EndPoint if necessary, inserts it in the ExportTable if not already in there, and inserts it in the remote party's ImportTable if not there already.

With reference to FIG. 24B, Thread-B can either look up Object-A in the NameSpace, or invoke a method on some other object in VMSpace-A that returns Object-A as result. In either case, LIS.EXE finds that EndP-1 is the associated EndPoint, and enters it in ITable-B, the ImportTable for Thread-B's IPCSpace-B. A Proxy for Object-A is created in Thread-B's VMSpace-B (not shown). In order to create the proxy, Signature-1 is used to find the size of the necessary VTable, and for the loading (or memory mapping) of the proxy's marshalling methods. The proxy holds a copy of the EndPoint's IPID.

Thread-B can now invoke a method on the proxy. In this case, a pointer to the proxy's state is loaded in a register and a trap is taken. The proxy's IPID is used to find EndP-1 in ITable-B. The remaining arguments are on the stack-A, in VMSpace-A. A new stack-B is created in VMSpace-B and is remapped in VMSpace-A. Arguments are copied from stack-A to stack-B, according to the EndPoint's signature. Thread-B's VMSpace is now changed to VMSpace-B, and the stack pointer changed to point to stack-B. The return address is set to special code that traps back to LIS.EXE. Thread-B now jumps to executing the proper method on the real Object-A.

The return path is symmetrical, and it includes copying the return arguments back to stack-A, and switching back to VMSpace-A.

If Thread-B deletes the last reference on its proxy, then a trap is taken to LIS.EXE, which removes EndP-1 from ITable-B. A reference is Release( )d from EndP-1, and the trap returns. The proxy is deleted.

Thread-A removes Object-A from the NameSpace. LIS.EXE deletes one reference from the object itself, and one from EndP-1. If this was the last reference on EndP-1, this indicates that the object is no longer in the ImportTable of any other IPCSpace. Moreover, it indicates that the object is not in the NameSpace. Therefore, the EndPoint can be safely destroyed.

At application cleanup time, LIS.EXE walks the ImportTable and Release( )s all the EndPoints. It then walks the ExportTable and removes all EndPoints from the NameSpace. Each EndPoint is then Release( )d. If the reference count of one such object does not go to zero it means that some application is actively using the EndPoint. There are two equally valid alternatives for handling this case. LIS.EXE could prevent the application from terminating until all references are gone. Alternatively, it could mark the EndPoint as dead and let the application terminate. If some other application tries to use a dead EndPoint, it receives an exception.

Figure 24C:
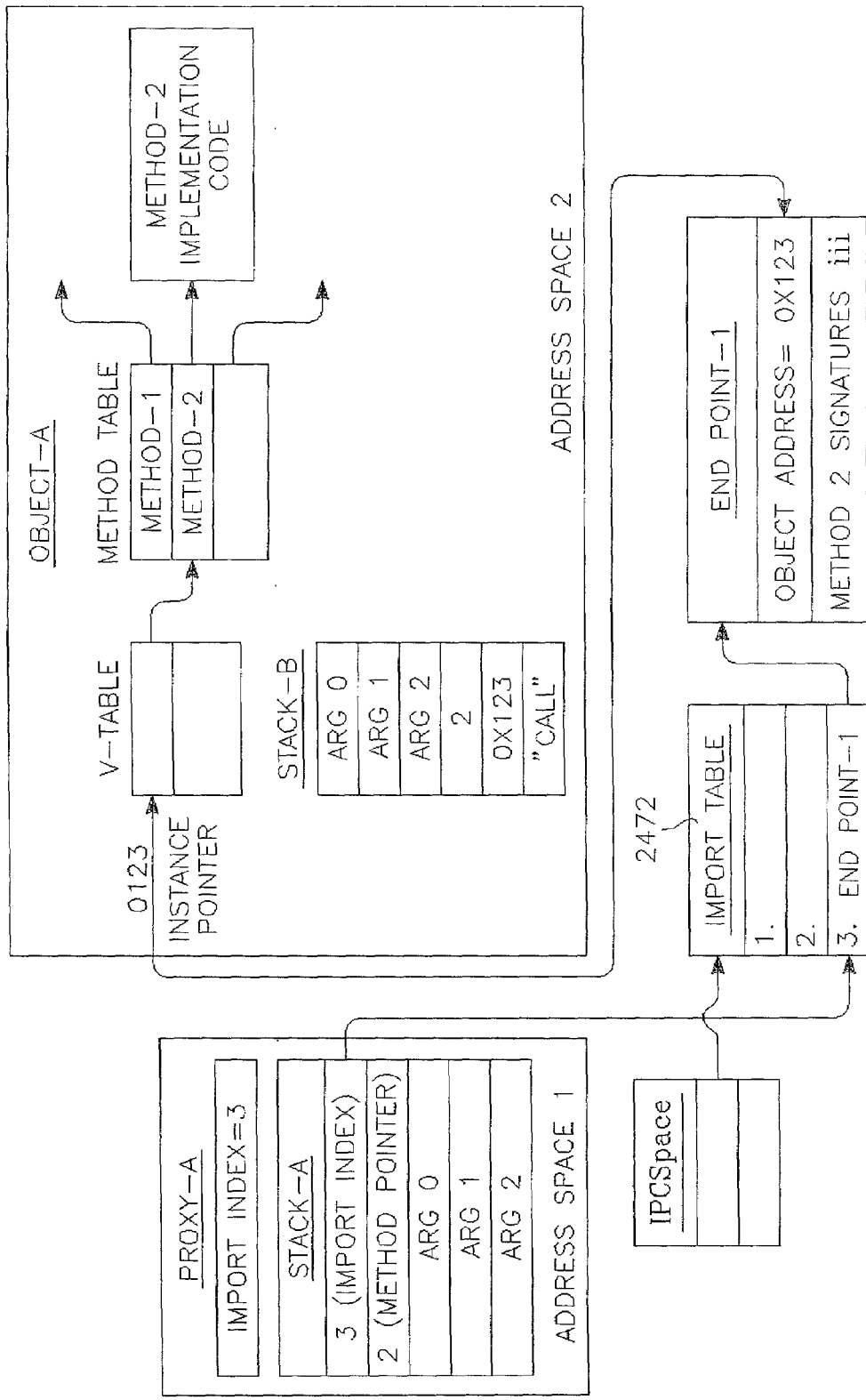
FIG. 24C illustrates objects in different address spaces connected by the loadable IPC system of FIG. 24B.

FIG. 24C illustrates the structure involved in the foregoing operations of the LIS. In the example of FIG. 24C, a first object, Object-A, resides in a first address space, Address Space 2, and a proxy object, Proxy-A, has been inserted by the LIS into a second address space, Address Space 1. LIS.EXE (corresponding to the LIS.EXE illustrated in FIG. 24B) provides communication between the the two address spaces. Proxy-A has an import index of "3" to the third entry in the import table 2472 in LIS.EXE. The import table 2472 has a pointer to an endpoint (EndPoint-1) which is exported by Address Space 2. Endpoint-1 includes the type signature and address of (i.e., a pointer to) Object-A in Address Space A. The export table for Address Space 2 in LIS.EXE (not illustrated) would have its own pointer to the same endpoint.

Endpoint-1 has a list of signatures ("iii") which define the bits to be taken from the top of Proxy-A's stack, Stack-A, in order to obtain all the necessary arguments to be passed in the method call. Information is put onto Stack-A as part of the call to (the proxy of) Object-A. FIG. 24C illustrates Object-A as including a V-Table pointer and a method table, in which the second method points to the implementation code of Method 2. Endpoint-1 contains an "object address" field containing the address ("0X123") of Object-A (i.e., the pointer to Object-A) and a signature ("iii") for Method 2 in Object-A's method table.

Proxy-A has an index value of "3" into the import table 2472. Upon the occurrence of an IPC trap, IPCSpace points to the import table 2472 as a collection of objects that the IPC imports or exports. Stack-B in address space 2 is a free stack, ready to accept incoming method calls. Upon occurrence of the IPC trap, the IPC looks at Stack-A and finds the import index (i.e., "3") and therefore goes to the third entry in its import table. This entry points to EndPoint-1, and EndPoint-1 has the signature ("iii") for Method 2 of Object-A. The following values are therefore copied to Stack-B as part of the call: arg 0, arg 1, arg 2, method 2, the object address 0X123, and the program counter for the code "call". As a result, Method-2 of Object-A is called with arg 0, arg 1 and arg 2 as specified in Stack-B of Proxy-A, and therefore the resulting communication has the appearance of a local call.

The Loadable IPC Manager is not only run-time loadable from the run-time resources into the kernel by the loader, but is also unloadable. Moreover, there may be more than one Loadable IPC Manager stored among the run-time loadable resources of the operating system. For example, a very simple Loadable IPC Manager—which takes up less space in memory—may be used in cases where the communication needed is within the same machine. A more powerful Loadable IPC Manager may be called whenever it is necessary to communicate with a thread running in another machine.

Object Mutation by Applications External to the Object

An object consists of an interface, an instance pointer, an implementation, and some state. The interface is a list of methods. The instance pointers and interfaces are exposed to other objects; the state and the implementation are not. Worker threads execute implementation code that accesses and modifies the state. Once an object instance has been created, the instance pointer, interface, and implementation are traditionally immutable, only the state can be changed by method calls.

The preferred embodiment of the invention allows run-time changes to the ordinarily immutable part of an object, even while the object is being usedThe term mutation as used in this specification refers to the act of atomically changing an ordinarily constant part of an object, such as a method implementation. The thread performing the mutation is called a mutator.

A mutator must translate the state of the object from the representation expected by the old implementation to the one expected by the new implementation. It must also coordinate with worker threads and other mutators through suitable synchronization mechanisms. Transition functions capture the translations that are applied to the object state and to the worker thread's execution state. In order to limit the amount of metadata, execution transitions only happen between corresponding clean points in the old and new implementations.

A number of mechanisms can be implemented using mutation. Interposition is done via replacement of the object with a filter object that points to a clone of the original object. A dynamic software upgrade would replace the incorrect implementation of a method with the corrected one. Run-time code generation might use a stub implementation as a trigger. Mutation can be used to replace generic code with a specialized version that exploits partial evaluation by treating ordinarily non-constant state as immutable. Once the optimistic conditions are no longer true, mutation allows reverting back to the generic code. Execution profiling might indicate that a different implementation would perform better, and trigger a mutation. Object mobility is realized by turning objects into proxies and vice versa.

One example where mutation in accordance with the present invention was found to be useful was in device drivers. In one configuration on the x86 the invention was implemented with minimal floppy and disk drivers that called BIOS (ROM) functions to do the work. A loadable driver would later take over and mutate the BIOS driver with a real driver, transparently to the filesystem.

While only methods within an object can change the object's state in conventional operating systems, the present invention provides a mutation object which, during run time, can dynamically change the state of other objects as desired. The state of an object includes the object's pointers. For example, to change an implementation of a method listed in the object's interface, the pointer from the interface for that method would be changed to point to a different implementation of that method, the change in the pointer value being a change in the object's state relating to the fundamental structure of the object.

Figure 25:
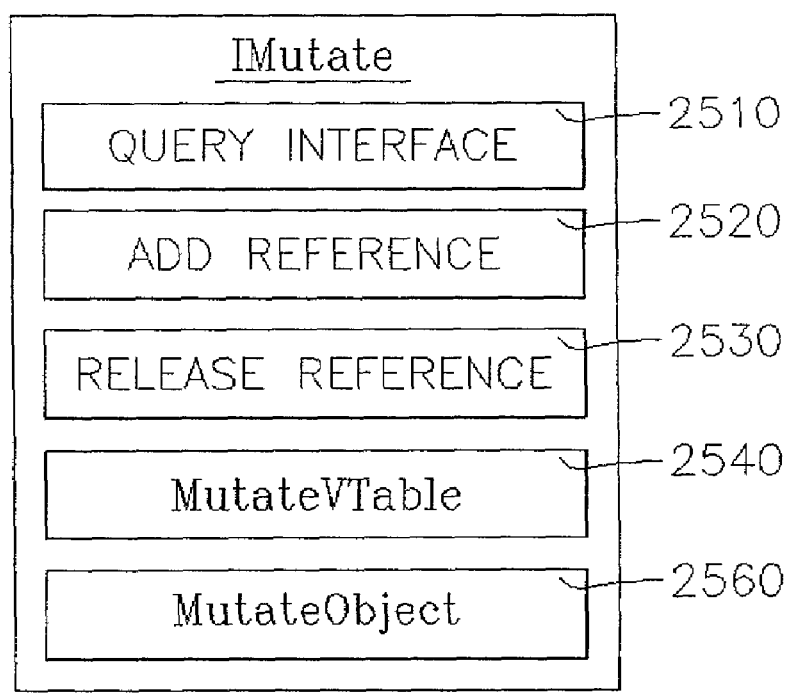
FIG. 25 illustrates the interface Imutate which provides object mutation in the operating system of FIG. 1B.

FIG. 25 illustrates the interface of the mutation object, IMutate, which includes the following methods: Query Interface 2510, Add Reference 2520, Release Reference 2530, MutateVTable 2540 and MutateObject 2560. The operation of the Query Interface, Add Reference and Release Reference interfaces 2510, 2520, 2530 have been described above in this specification.

Figure 26:
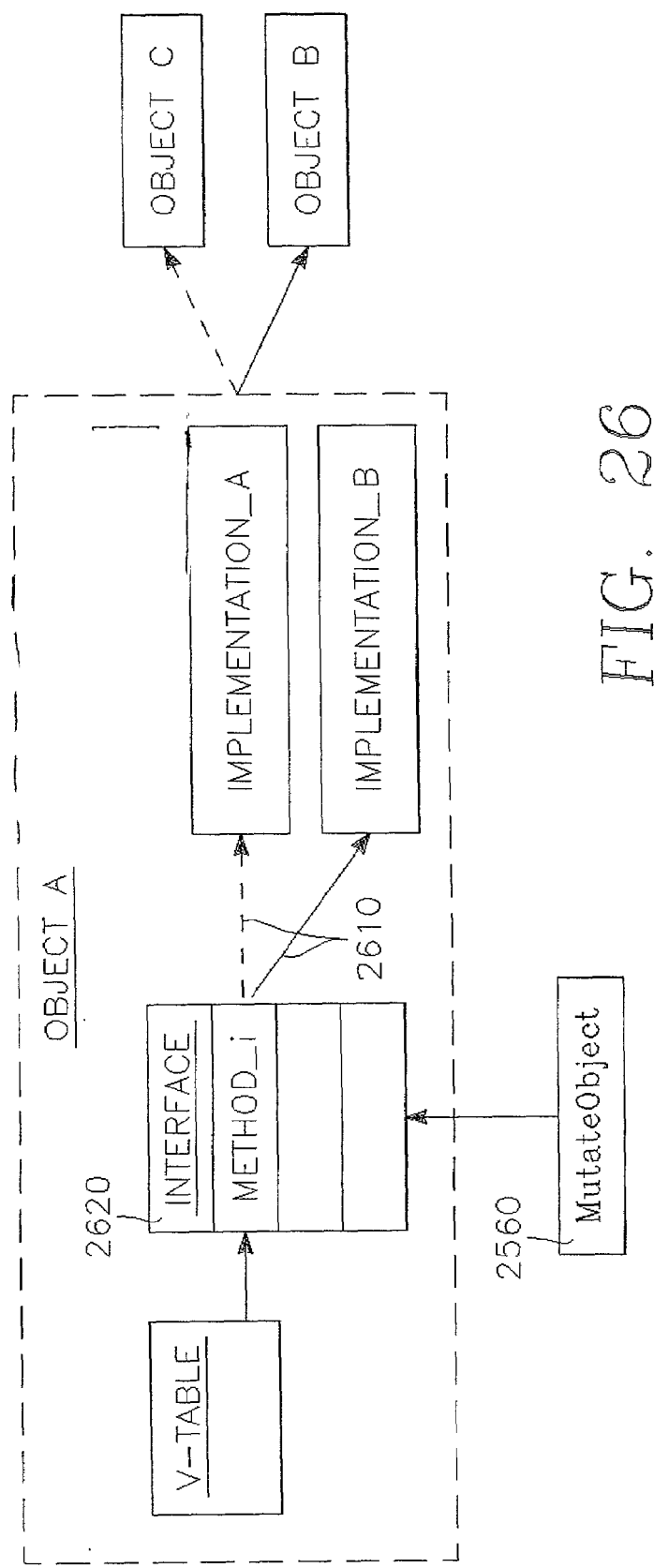
FIG. 26 illustrates one application of object mutation in the operating system of FIG. 1B.

The MutateObject method 2560 is a general method enabling the user to change any pointer or register in an object. The MutateVTable method 2540 is a special case, the method being directed specifically to changing the VTable pointer. One example of the general MutateObject method 2560 is illustrated in FIG. 26, in which the MutateObject method changes the interface pointer 2610 for method_i in the Object Interface 2620 from Implementation_A to Implementation_B.

Figure 27:
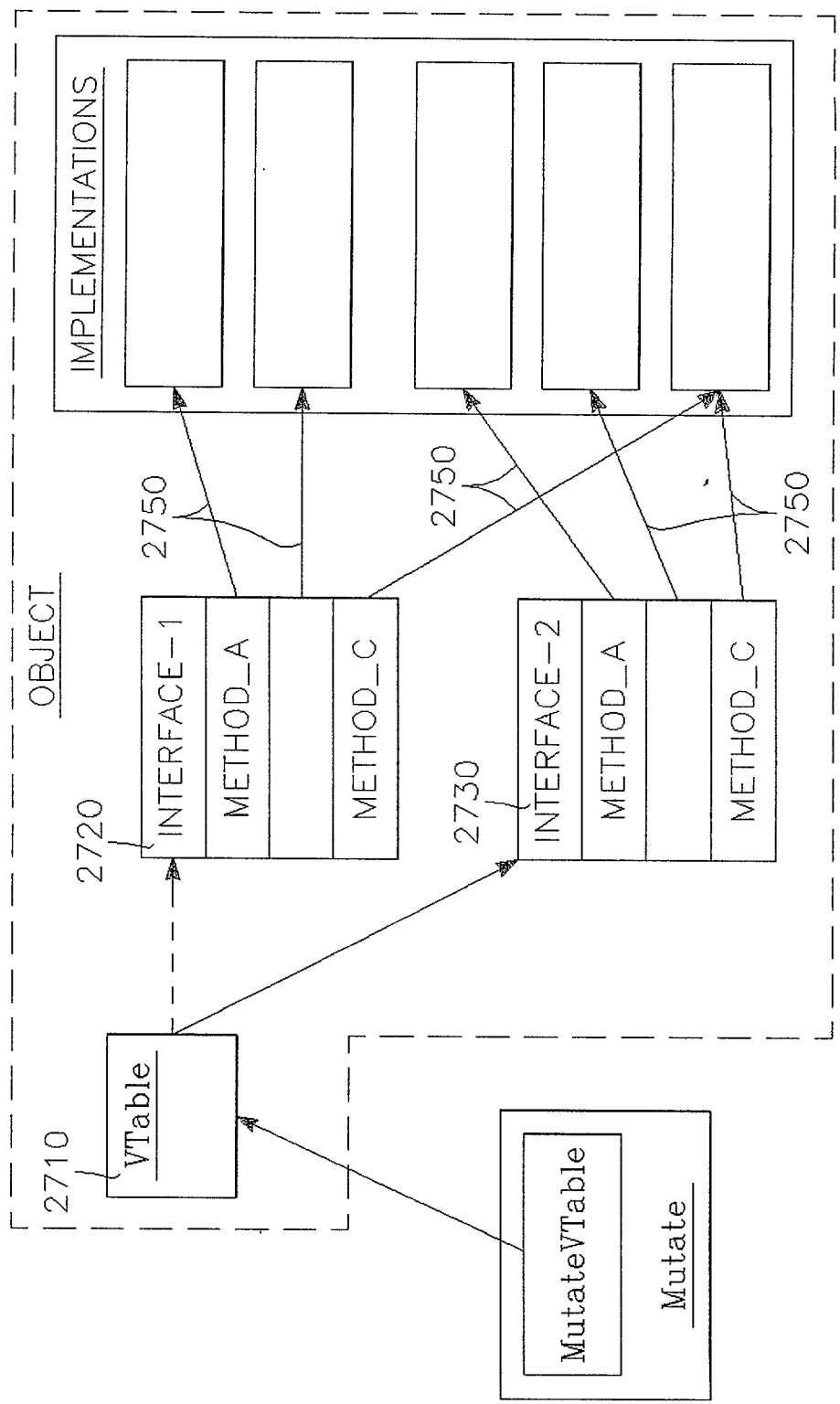
FIG. 27 illustrates another application of object mutation applied to a Vtable.

FIG. 27 illustrates an example of the operation of the MutateVTable method. In this example, the object being altered by the MutateObject method has a VTable 2710 which can point to one of two interfaces 2720, 2730. The two interfaces 2720, 2730 can list different methods or, if the same method is listed in both interfaces 2720, 2730, then their interface pointers 2750 for the corresponding method can point to different implementations, as in the case of Method_A , or to the same implementation, as in the case of Method_C.

The synchronization mechanisms suitable for implementing mutation can be divided into three groups:

Mutual exclusion: Mutation cannot happen while workers are executing methods of the object to be mutated. The implementation can be a read-write lock, disabling preemption on a uniprocessor, or a holding tank [Cowan96] with reference counting. Mutual exclusion is simple in that there is no worker state associated with the object when mutation is allowed to happen.

Transactional: Roll back the workers that are affected by mutation. Mutators and workers operate on an object transactionally and can be aborted when necessary.

Swizzling: Modify the state of the workers to reflect mutation. Instead of waiting for workers to exit the object or forcing them out, the third mechanisms just suspends them. The mutator then modifies the state of each worker to reflect the change in the object.

Figure 28:
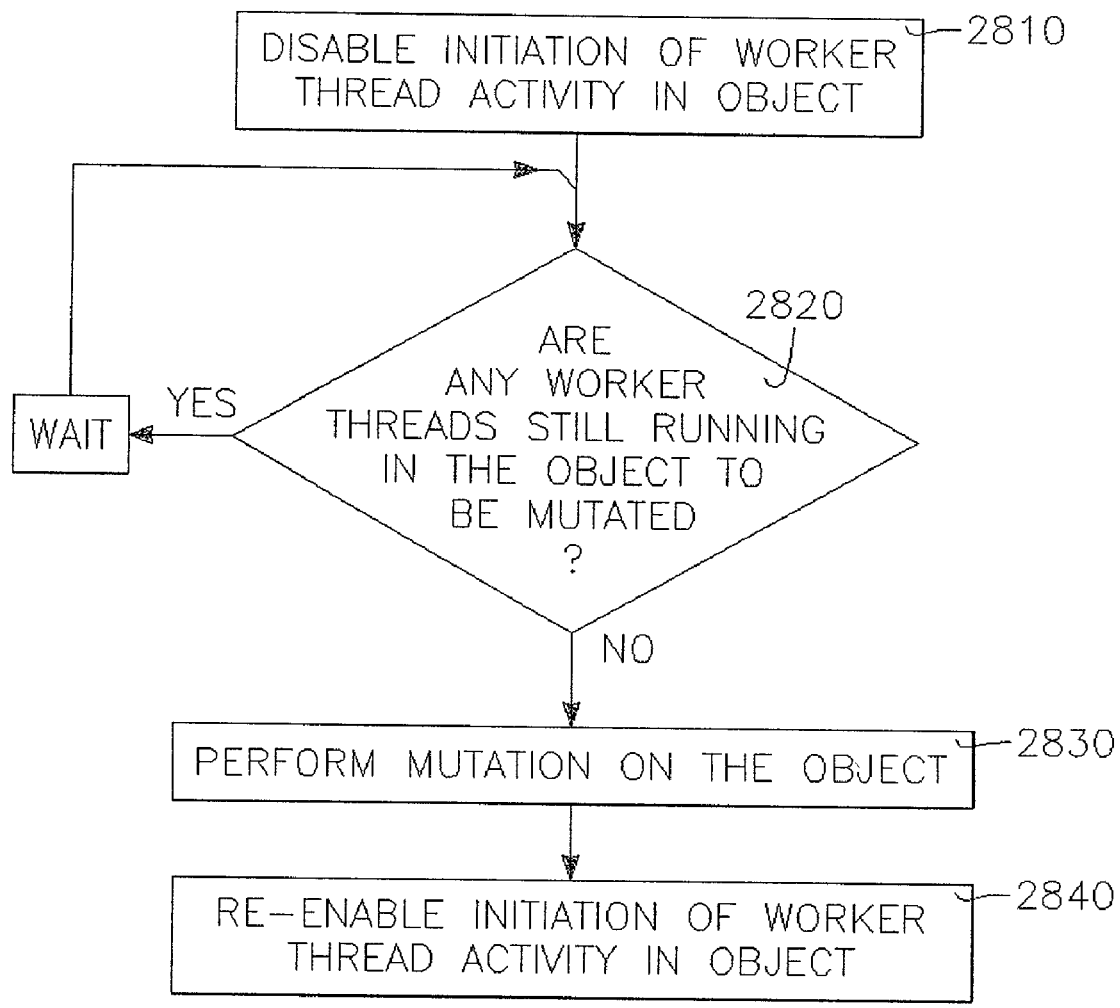
FIG. 28 illustrates synchronization of object mutation by mutual exclusion.

FIG. 28 illustrates how object mutation is synchronized by mutual exclusion, which is the simplest synchronization embodiment. When the Mutate Object is called, the first step is to prevent any threads from accessing the object or initiating new activity with the object (block 2810). Then a determination is made whether any threads or worker threads that were already running with or within the object are still running (block 2820). If so ("YES" branch of block 2820), then the object mutation process is postponed until such threads finish running with the object. If no worker threads are running ("NO" branch of block 2820), then the Mutate Object is allowed to mutate the object (block 2830). This step may be reached immediately or reached only after waiting. After the object has been mutated, threads again are permitted to access the object (block 2840).

One limitation of the synchronization by mutual exclusion is that there is a delay imposed while the system waits for all worker threads running with the object to finish. This delay can become unacceptable if one of those threads gets blocked before finishing by an event beyond its control.

Figure 29:
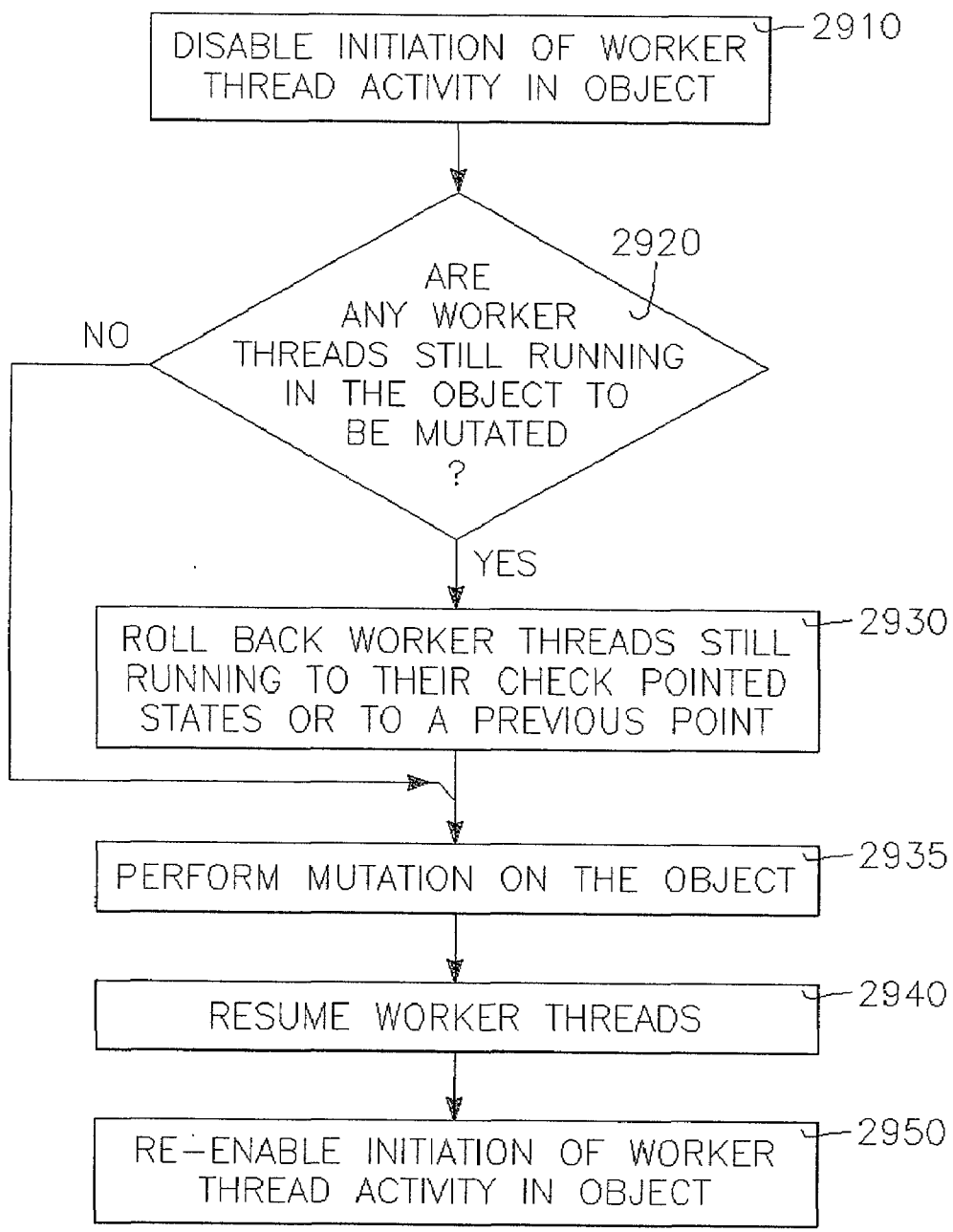
FIG. 29 illustrates synchronization of object mutation by transactional synchronization.

One way of ameliorating such delays is to use transactional synchronization. FIG. 29 illustrates how object mutation is synchronized by transactional synchronization. The first two steps of this method (FIG. 29, blocks 2910, 2920) are identical to that of FIG. 28 (blocks 2810, 2820). What is different is that if there are worker threads still running (YES branch of block 2920), instead of waiting, the worker threads still running are rolled back to their starting points (block 2930) and the object mutation is performed (block 2935). The threads are then reactivated (block 2940) and access by other threads to the object is re-enabled (block 2950).

Figure 30A:
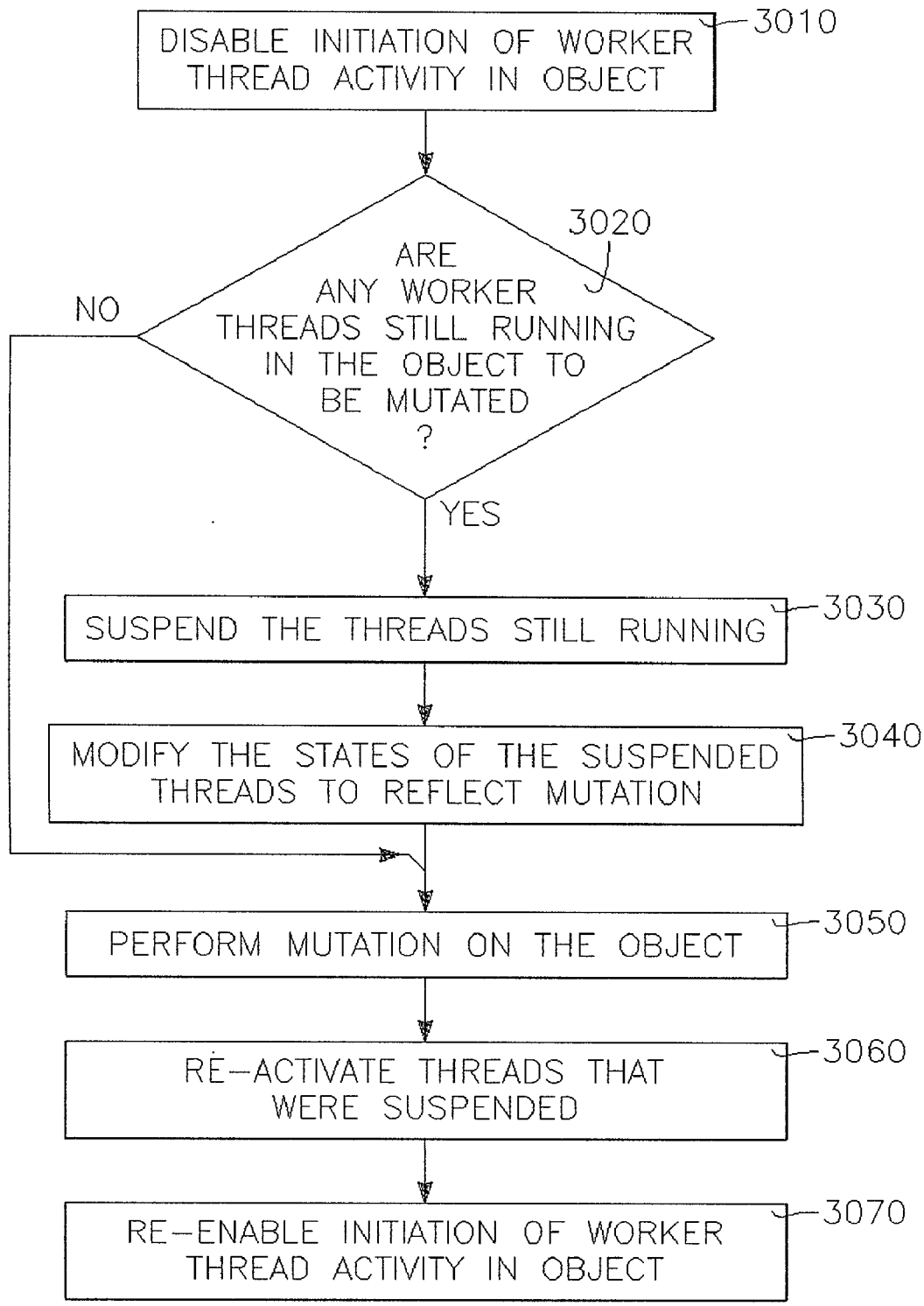
FIG. 30A illustrates the process of object mutation by swizzling in accordance with a preferred embodiment of the invention.

One limitation of transactional synchronization is that rolling back the threads entails a delay. Synchronization by swizzling ameliorates such a delay because it does not require rolling back any running threads. FIG. 30A illustrates how synchronization by swizzling operates. The first two steps (blocks 3010, 3120) are identical with the steps of blocks 2910 and 2920 of FIG. 29. What is different in FIG. 30A is that if there are threads still running ("YES" branch of block 3020), then the still-running threads are suspended temporarily (block 3030) and their states are modified to reflect the mutation of the object (block 3040). At about the same time, the object is mutated (3050). Then, the suspended threads are re-activated (block 3060) so that they continue their operations at the points at which they were suspended, except that their subsequent operations are carried out in the mutated version of the object. Access by other threads to the object is re-enabled at about this time (block 3070).

Preferably, swizzling is not attempted except at clean points in the implementation that have possible mappings, transition functions or return addresses. The definition of clean points is discussed in "Asymmetric Real Time Scheduling on a Multimedia Processor" by A. Forin, A. Raffman, J. Van Aken, Microsoft Research Technical Report MSR-TR-98-09, February 1998. Thus, it is preferable to pre-establish the locations of such clean points in an implementation and to pre-compute their transition functions. The computation of such transition functions is not within the scope of the present invention, and reference is made to the above-cited publication.

Figure 30B:
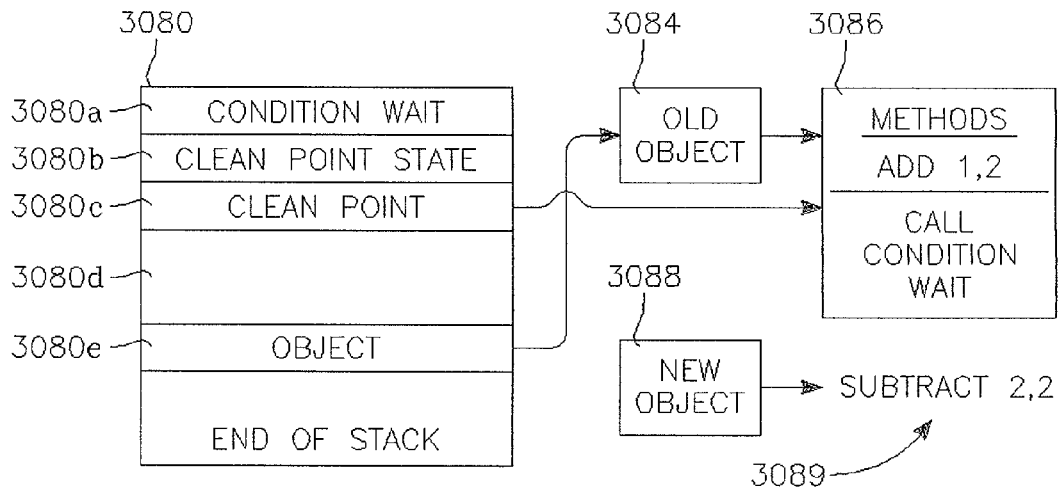
FIG. 30B illustrates the structure of a thread relative to external objects prior to swizzling.
Figure 30C:
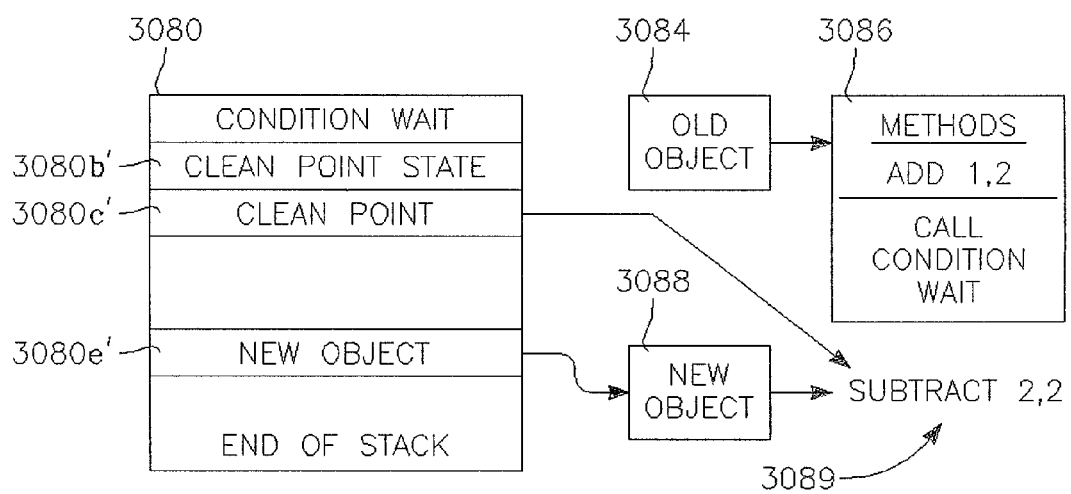
FIG. 30C illustrates the structure of the thread relative to the external objects corresponding to FIG. 30B after swizzling.

FIG. 30B illustrates one example of structure involved in the process of FIG. 30A as applied to a particular thread. The thread has a stack 3080. A stack pointer 3082 points to a Condition Wait function 3080a on the stack 3080 at which the thread happens to be blocked in the present example. The next item on the stack 3080 is a clean point state 3080b, followed by a clean point 3080c, followed by data or integers 3080d, which in turn is followed by a pointer 3080e to the "old" object 3084. The clean point 3080b points to a particular method 3086 of the object 3082. In this example, the method 3086 states "add 1,2" and "call condition wait", which is a call to the Condition Wait function 3080a. The goal of the mutation process in this example is to replace the "old" object 3084 a "new" object 3088. The process identifies the stack pointer 3082. Next, the process rolls back the stack 3080 to find the bottom of the stack, which rolls back the thread. The stack 3080 is changed in place to the configuration illustrated in FIG. 30C by substituting a new Clean Point State 3080b', a new Clean Point 3080c' and a new object pointer 3080e' for the old ones in the stack 3080. The new Clean Point 3080c' points to a particular method 3089 of the new object 3086 while the new object pointer 3080e points to the new object 3080 itself. The new method, for example, states "subtract 2,2".

One advantage of object mutation is that it enables significant changes to be made in the operating system in a manner that is transparent to the application or driver that is running. This advantage is apparent in considering various applications of object mutation.

Figure 31:
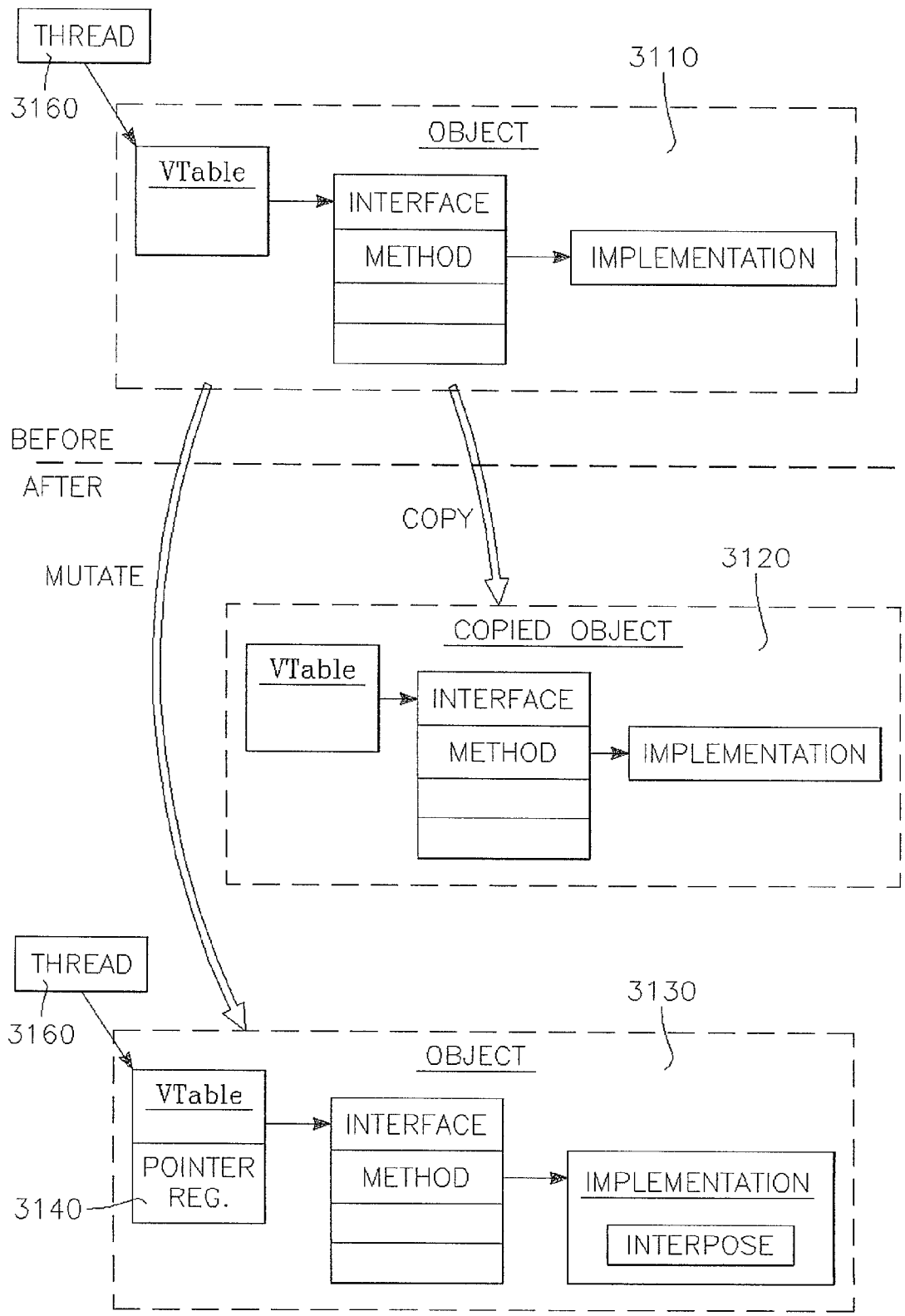
FIG. 31 illustrates an application of object mutation to achieve object interposition.

FIG. 31 illustrates an application of object mutation in carrying out object interposition. In the "BEFORE" portion of FIG. 31, an object 3110 is copied to produce a copied version 3120 of the object 3110 (in the "AFTER" portion of FIG. 31) and is mutated to produce a mutated object 3130 (also in the "AFTER" portion of FIG. 31). The copied object 3120 is preferably identical to the original object 3110. The mutated object 3130 is different in that the interface points to an implementation of an interpose method, while the pointer register 3140 of the object is changed to point to the copied object 3120.

The interpose method listed in the interface of the mutated object 3130 carries out the purpose of the interposition. For example, the purpose of the interposition may be to provide a filter between any external thread (e.g., the thread 3160) and the object 3120. The interposition method and interposition implementation carries out the function of such a filter, so that the mutated object 3130 is the filter object. For example, the interposition method may entail determining whether the thread 3160 intends to write to the object 3120, and, if so, to block any such write operation, so that the object 3120 is available to the external thread 3160 for read operations only.

Figure 32:
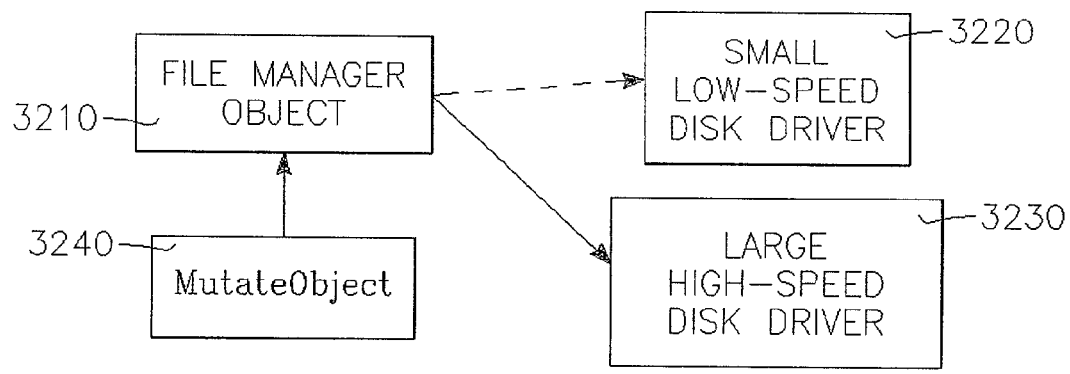
FIG. 32 illustrates an application of object mutation to carry out dynamic software upgrading.

FIG. 32 illustrates an application of object mutation in carrying out dynamic software upgrading. In the example illustrated in FIG. 32, a file manager object 3210 uses a disk driver to manage a disk drive memory, and the operating system has available two different versions 3220, 3230 of a disk driver. If the file manager object 3210 is using the low-speed disk driver 3220 and needs to upgrade to the high speed driver 3230, the MutateObject 3240 changes the object pointer of the file manager object 3210 from the low speed driver 3220 to the high speed driver 3230. Since no objects were exchanged or removed, this upgrade is transparent to the application that is running.

Figure 33:
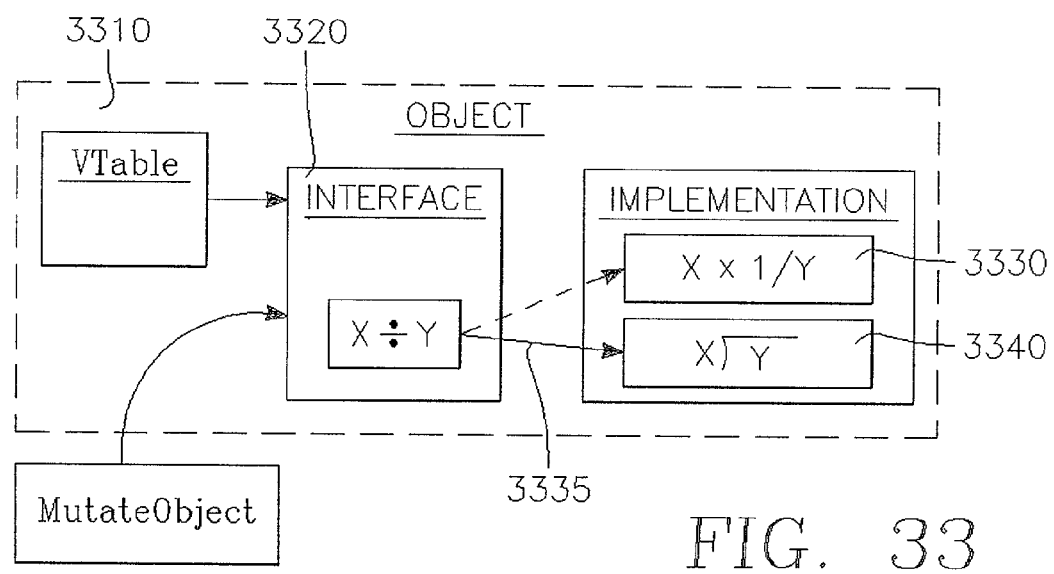
FIG. 33 illustrates an application of object mutation to carry out run-time code generation.

FIG. 33 illustrates an application of object mutation in carrying out run-time code generation. In the example of FIG. 33, an object 3310 provides, in its interface 3320, a method or algorithm of dividing one number, x, by another number, y. Two versions 3330, 3340 of the algorithm are available in the object. The simplest version 3330 involves multiplying the reciprocal of y by x. The more sophisticated version 3340 involves explicitly carrying out the division of x by y. This latter version is suitable for repeated divisions of different dividends by a common divisor which can change from time to time. In such a case, it is desirable to mutate the object by moving the interface pointer 3335 from the simple version 3330 to the sophisticated version 3340. As a result, a different object code is provided to carry out the division operation. This mutation is carried out dynamically as need at any point during run time. In the sophisticated version 3340 of the algorithm, the technique of retaining the same divisor (e.g., 2) over successive division operations is typical of a class of techniques known as "constant folding", while the technique of retaining the same type of operator (e.g., the division operator) over successive operations is typical of a class of techniques known as "inlining". The sophisticated version of the algorithm is applied as long as certain assumptions or parameters are true, namely that (1) each operation is a division of the operand and (2) the divisor is 2. Once these assumptions are no longer true, object mutation is applied to replace the current version of the algorithm (e.g, from the sophisticated version). For example, if the assumption that the divisor is 2 over successive division operations no longer applies, object mutation is invoked to return to the simpler version of the algorithm which makes no assumptions regarding the divisor.

Preferably, the implementations of an object contain already-compiled machine or object code for carrying out the corresponding method. However, in an alternative embodiment, the implementation is represented only by source code, to save space for example, and it is compiled by a compiler 3350 only as needed.

Figure 34:
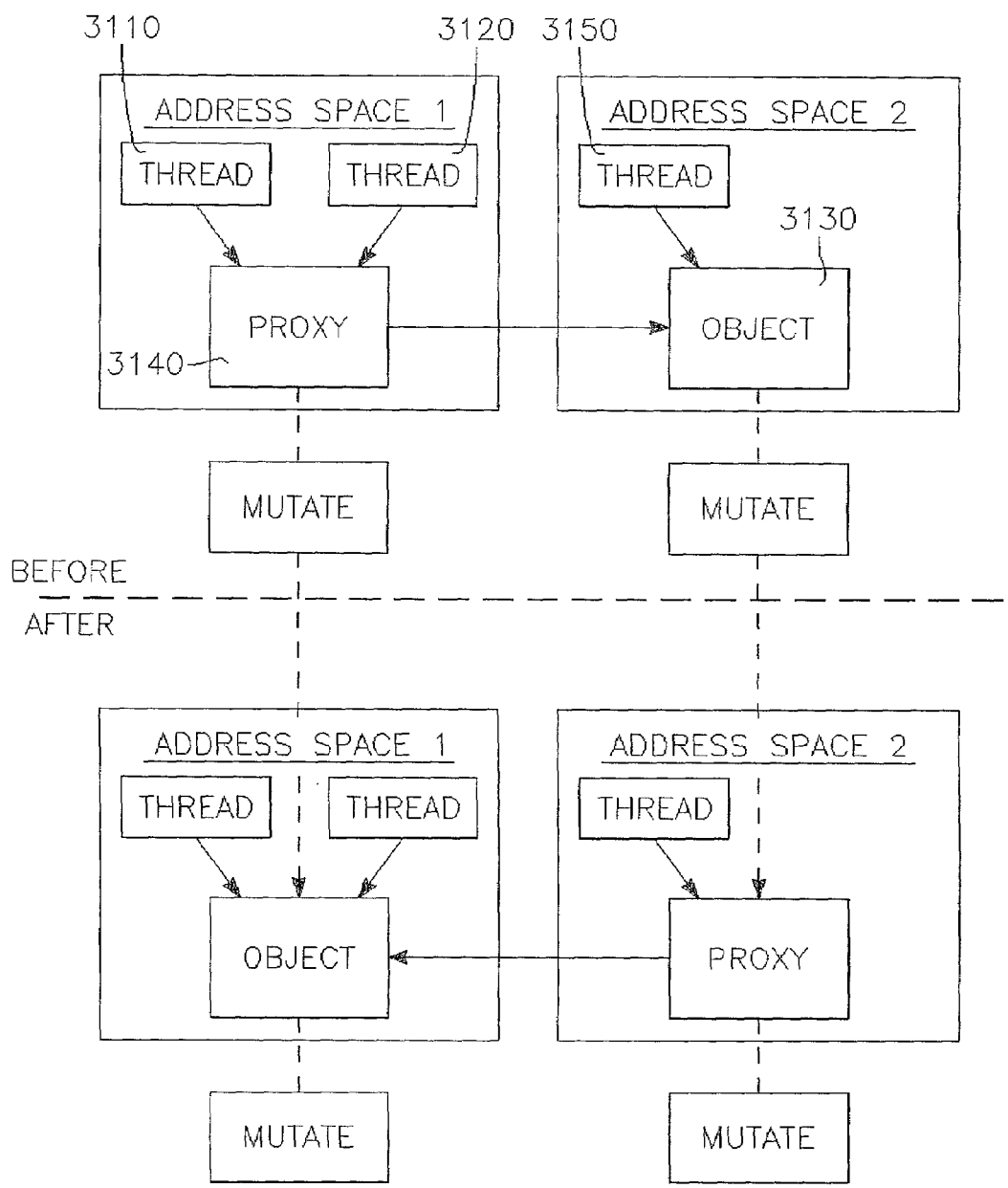
FIG. 34 illustrates how to achieve object mobility using object mutation.

FIG. 34 illustrates an application of object mutation in carrying out object mobility. If the object that is the target of a method is in a different machine or a different address space, and thus can not be called directly, a proxy is interposed for delegation. Instead of calling the actual object, the client will call the (local) proxy object. The proxy marshals the parameters into a message and sends it where the actual object is located. There the message is received and dispatched to a stub object. The stub unmarshals the parameters and calls the actual method. On the return path the stub similarly marshals any return values and sends them in a message back to the proxy that in turn unmarshals and returns.

Aside from taking longer to execute, the remote object call through a proxy looks exactly the same as a local call directly to the actual object. Not only is the implementation of the server transparent to the client, but the location as well.

In the "before" portion of FIG. 31, threads 3110 and 3120 in Address Space 1 access an object 3130 in Address Space 2 via a proxy object 3140 in Address Space 1. That is, the threads 3110, 3120 in Address Space 1 point to a proxy object 3140 in their own address space, and the proxy object 3140 points to an object in Address Space 2. A thread 3150 in Address Space 2 points directly to the object 3130 since both the object 3130 and the thread 3150 reside in the same address space.

Under certain conditions, such as frequent calls by threads in Address Space 1 to the object in Address Space 2, accessing the object 3130 through the proxy 3140 is relatively inefficient. This problem is solved by mutating the proxy 3140 into a clone of the object 3130 and mutating the object 3130 into a clone of the proxy 3140. This, in effect, "moves" the object from Address Space 2 into Address Space 1. As a result, calls to the object by the threads in Address Space 1 are faster because they do not pass through an intermediate proxy. Leaving a proxy in Address Space 2 from whence the object was "removed" is necessary so that the thread in Address Space 2 can find the object by pointing to the proxy in Address Space 2.

Figure 35:
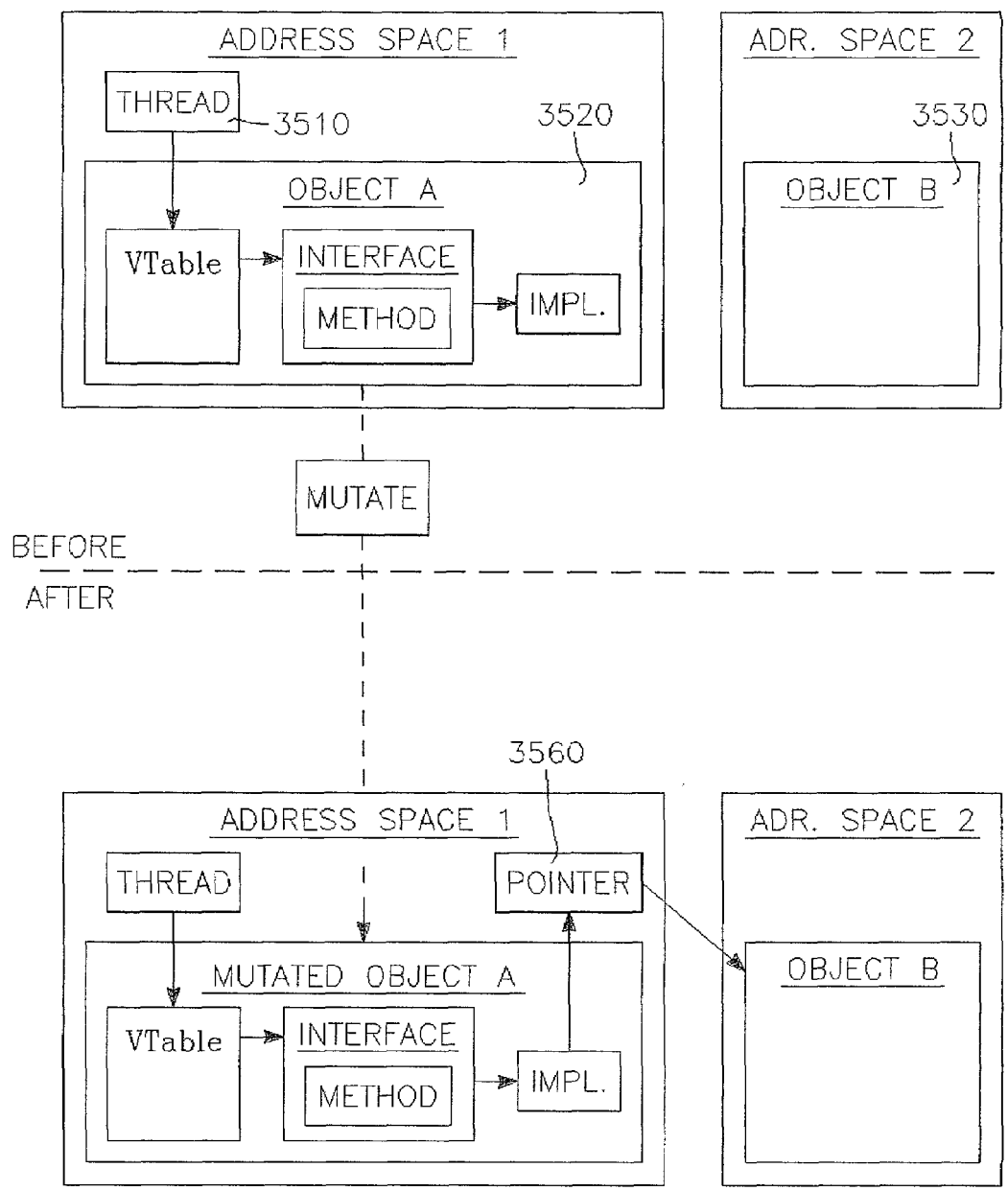
FIG. 35 illustrates how proxies may be used with object mutation to communicate across address spaces.

FIG. 35 illustrates how a thread 3510 in Address Space 1 calling upon an object 3520 in Address Space 1 ("BEFORE" portion of FIG. 35) can be diverted to an object 3530 in Address Space 2 by mutating the object 3520 into a proxy with a pointer to the object 3530 in Address Space 2. The object 3520 in Address Space 1 has a pointer register 3560 which, as a result of the object mutation, is loaded with the address of the object 3530 in Address Space 2. Address Space 1 and Address Space 2 may each reside in different machines, in which case the object 3530 in Address Space 2 must contain information identifying the other machine, as well as the memory location in the other machine.

Figure 36:
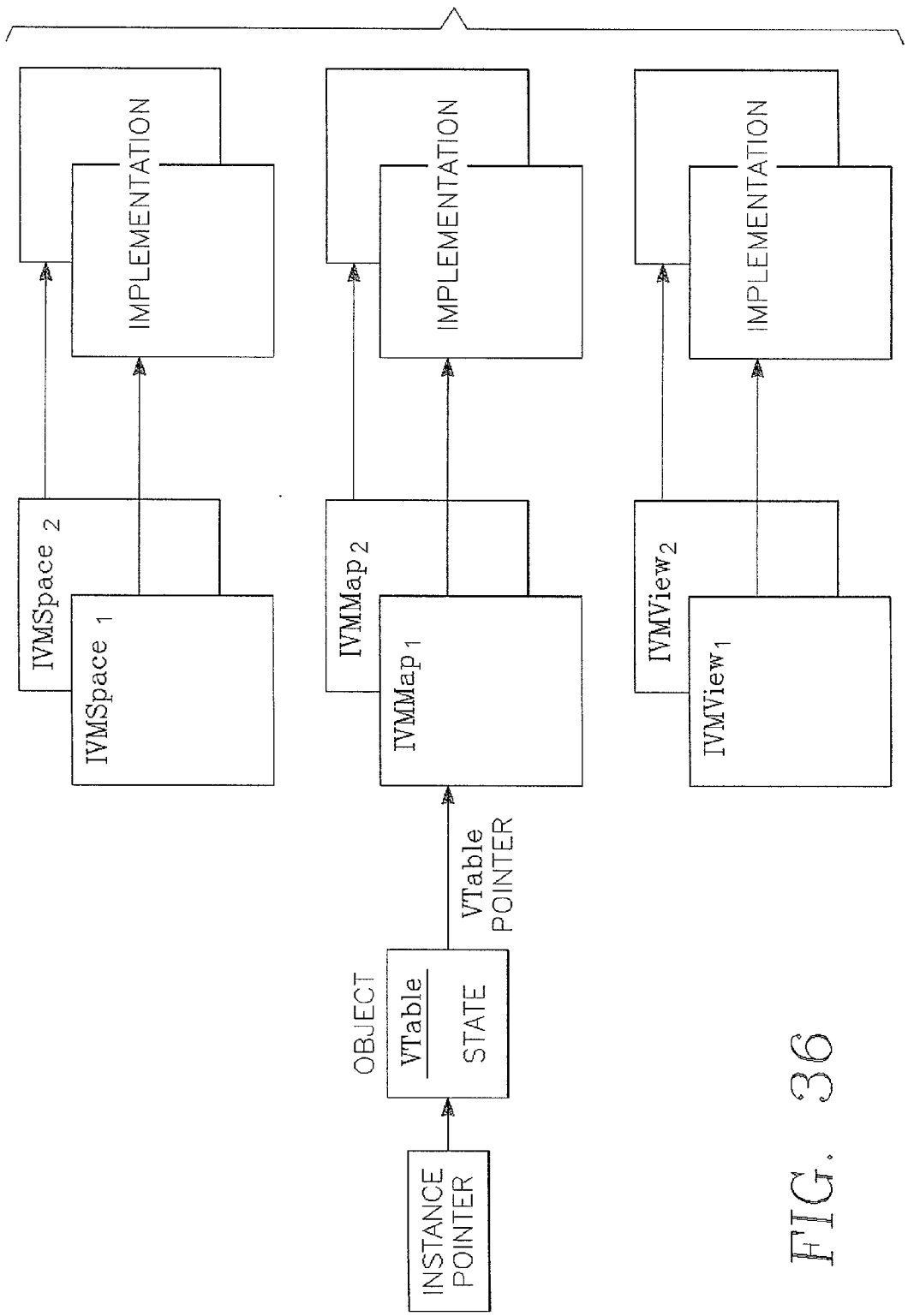
FIG. 36 illustrates a mutatable structure of the virtual memory manager.

FIG. 36 illustrates one example of a mutatable structure of the Virtual Memory Manager (VMM). For each method in the interface, namely IVMSpace, IVMMap and IVMView, there are two alternatives. For each of these alternative, there is a set of corresponding implementations. Each alternative points to the corresponding implementation. By mutating the VTable pointer (using MutateVTable), any one of the three methods may be changed between its two alternative versions. Moreover, by changing the interface pointers from the methods (using MutateObject), different implementations may be chosen for each method or for some methods or for one method only.

Programming Model with Dynamically Loadable Objects

Preferably, Namespace is a demand-loading object that supports the following new programming model. The main( ) entry point for an image is a constructor that returns the object. When an application tries to bind to a name that does not exist, the namespace invokes the loader, which looks for and instantiates a component with the given name. The loader then invokes the component's entry point, registers the resulting object in the namespace, and returns it to the application. When the application releases its last reference to the component the namespace can unload the component or choose to keep it cached.

In accordance with programming model of the invention, an application program or thread can access an object from any source, such as a local area network, a global network, disk or working memory, via the Namespace object. As will be shown in a working example described below, this places the loading of resources, such as plug-and-play device drivers, under the exclusive control of the application thread. With the programming model of the invention, the application thread includes calls to Namespace for each object on an as-needed basis. One advantage is that working memory space is not occupied by unneeded resources. Another advantage is that the time penalty required to load a resource, such as a device driver, is not incurred except when necessary. A further advantage is that application thread controls when to load such resources and can therefore be allowed to do so in an optimal manner designed by the programmer. In the prior art, the application thread or program did not control the loading of certain resources (such as device drivers).

Figure 37:
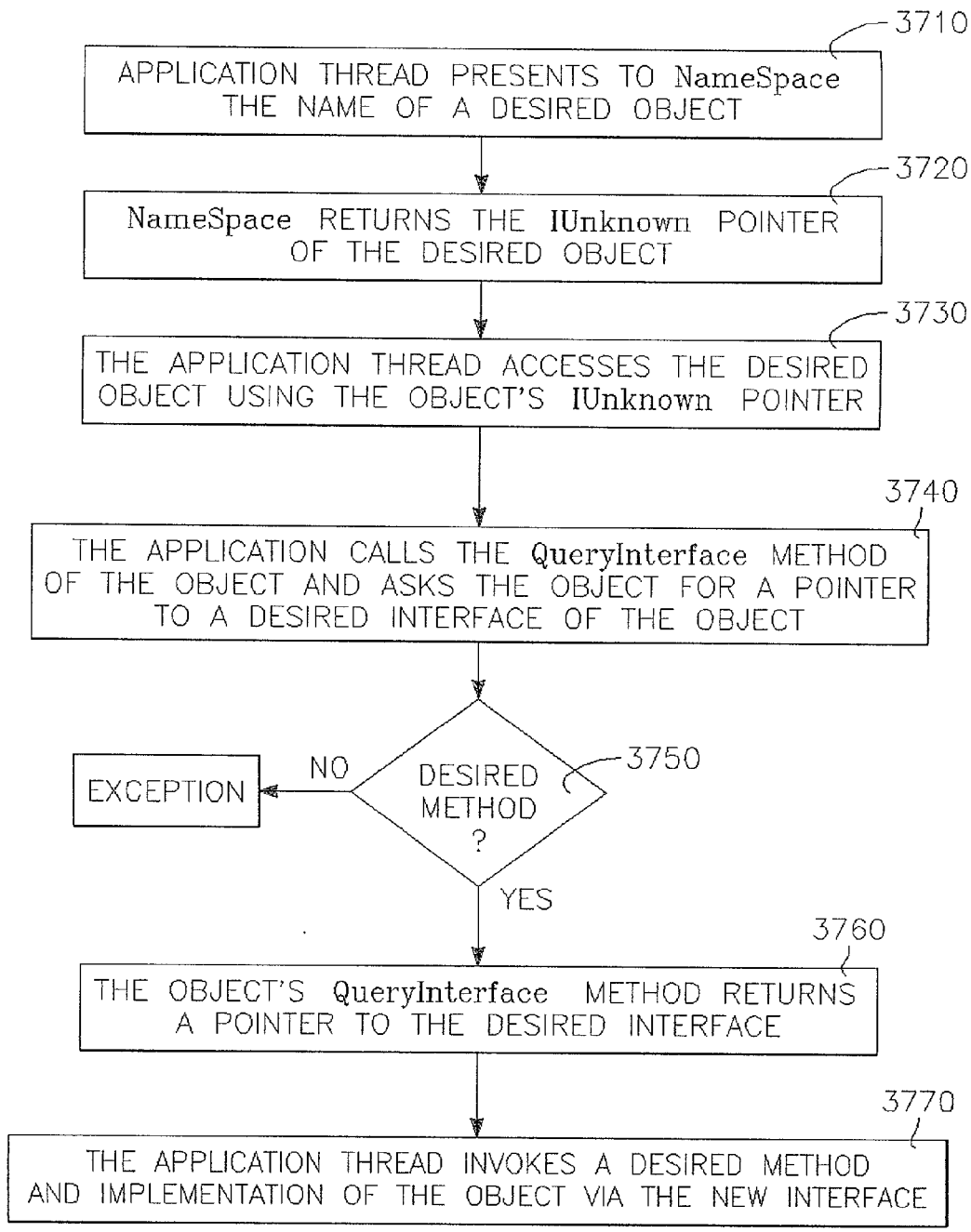
FIG. 37 illustrates a method embodying the programming model of the invention.

FIG. 37 illustrates a method in accordance with a preferred programming model of the invention. An application thread currently running finds that it needs a particular object at some point. The application thread presents to NameSpace the name of the desired object (block 3710 of FIG. 37). In response, NameSpace returns the IUnknown pointer of the desired object (block 3720). The application thread then accesses the desired object in memory using the object's IUnknown pointer to find the correct memory location (block 3730). The application thread may need the object because it needs to use a method provided by that object. In such a case, the next step is for the application thread to call the QueryInterface method of the object and specify the Interface corresponding to the desired method (block 3740). For example, the application thread may need to perform a copy method provided by the object, in which case the thread may ask for an ICopy interface. A determination is first made whether the object has the desired interface (block 3750). If not, an exception is taken (NO branch of block 3750). Otherwise, the object's QueryInterface method returns a pointer to the desired interface (block 3760). The application thread then invokes the corresponding interface and implementation via the pointer to the new interface (block 3770).

Figure 38:
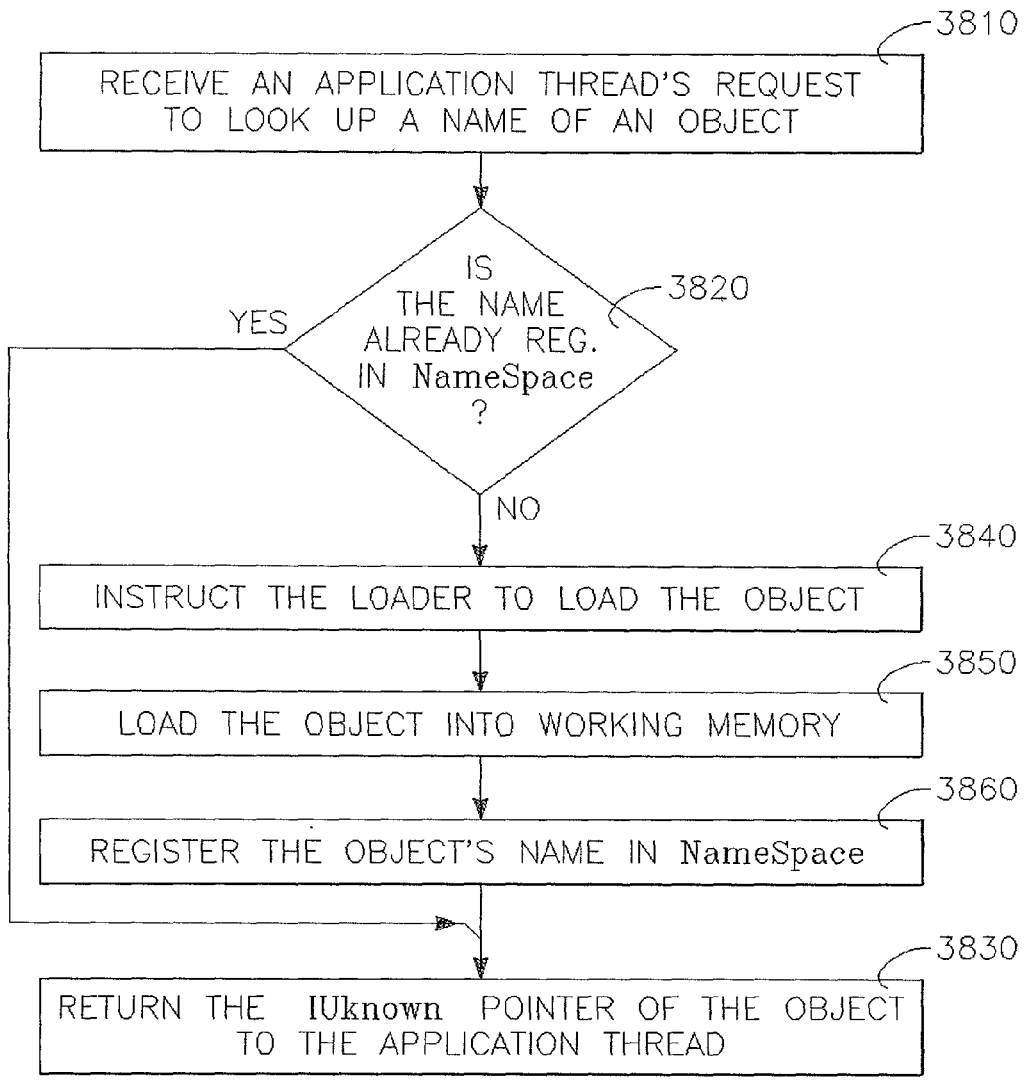
FIG. 38 illustrates operations carried out with the demand-loading NameSpace in accordance with the programming model of FIG. 37.

FIG. 38 illustrates operations carried out under control of NameSpace in support of the method illustrated in FIG. 37.

The steps illustrated in FIG. 38 are generally transparent to the application thread. First, NameSpace receives the application thread's request to look up the name of the desired object (block 3810). NameSpace determines whether that name is already registered in NameSpace (block 3820). If it is already registered, then the desired object is already present in working memory and an IUnknown pointer to the object is available (YES branch of block 3820). In this case, the next step is to return the IUnknown pointer to the application thread (block 3830). Otherwise (NO branch of block 3820), the desired object has never been loaded into working memory. In this case, NameSpace requests the Loader to load the object into working memory (block 3840). The Loader, in most cases, will find the desired object on disk. If it is not found on disk, the Loader may be allowed to search other sources for the object, such as memories accessible on a network (local or global) for example. The Loader loads the object into working memory (block 3850). NameSpace registers the object's name (block 3860) and returns an IUnknown pointer specifying the object's location in memory to the application thread (block 3830).

One feature of this method is that the application thread is allowed to find and use objects which exist in any accessible location, such as an unsaved document that exists only in working memory, for example. This provides programming flexibility on a scale not possible prior to this invention.

Figure 39:
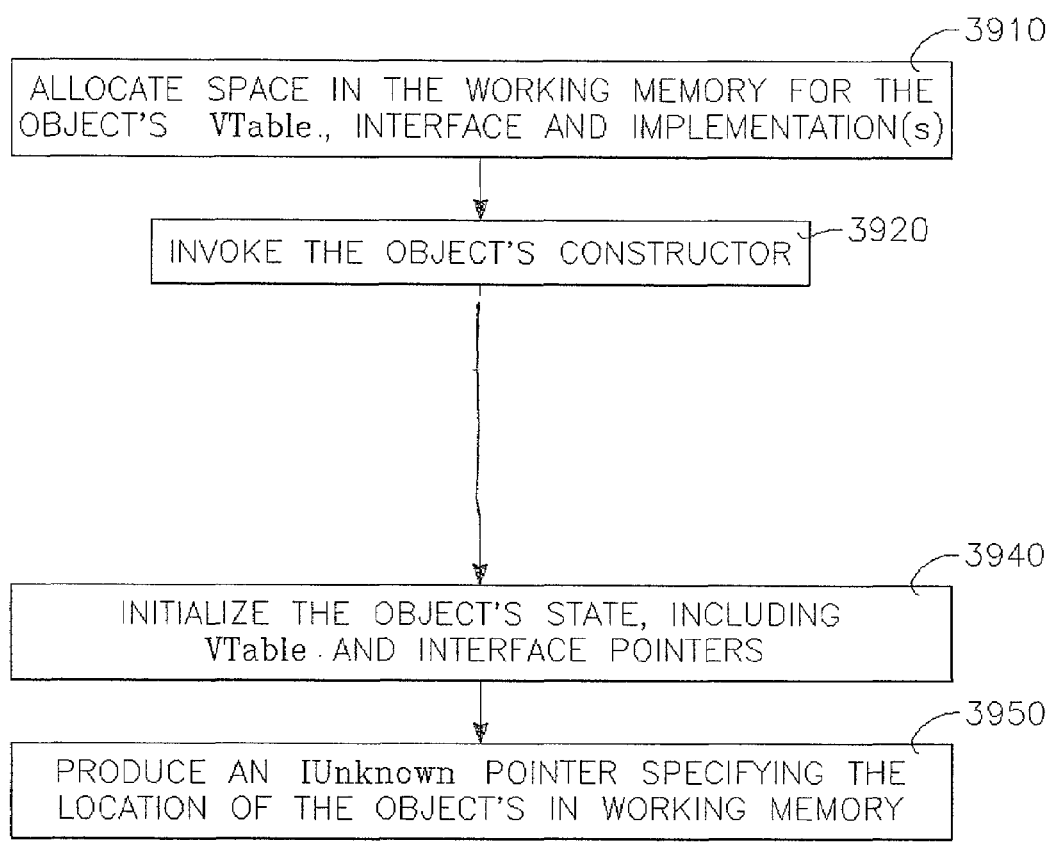
FIG. 39 illustrates the loading of an object in accordance with the programming model of FIG. 37.

FIG. 39 illustrates how a previously unused object stored outside of working memory (e.g., on disk) is loaded into working memory. It should be understood that the references made here to "working memory" include any other memory that may be used to supplement working memory in cases where actual working memory space is limited. For example, in some cases programs to be loaded into working memory are loaded instead into "cache" locations on the disk which are treated as part of the working memory.

Before the object is loaded into working memory, space must be allocated in the working memory for the object's image. The image will contain one or more VTables, Interfaces and Implementations (block 3910 of FIG. 39). The image will also specify an EntryPoint, which is the constructor of the object. Once the image is relocated and loaded in main memory, the constructor is invoked (block 3920). Such a constructor is automatically accomodated in the C++ programming language. In a preferred embodiment, the invention is carried out in C++. The constructor allocates dynamic memory to hold the new object's state. The object's state is initialized, including the object's VTable and Interface pointers (block 3940). An IUnknown pointer to the object is produced specifying the memory location of the object (block 3950). This is the pointer that NameSpace returns to the application thread in the operation illustrated in FIGS. 37 and 38.

Figure 40:
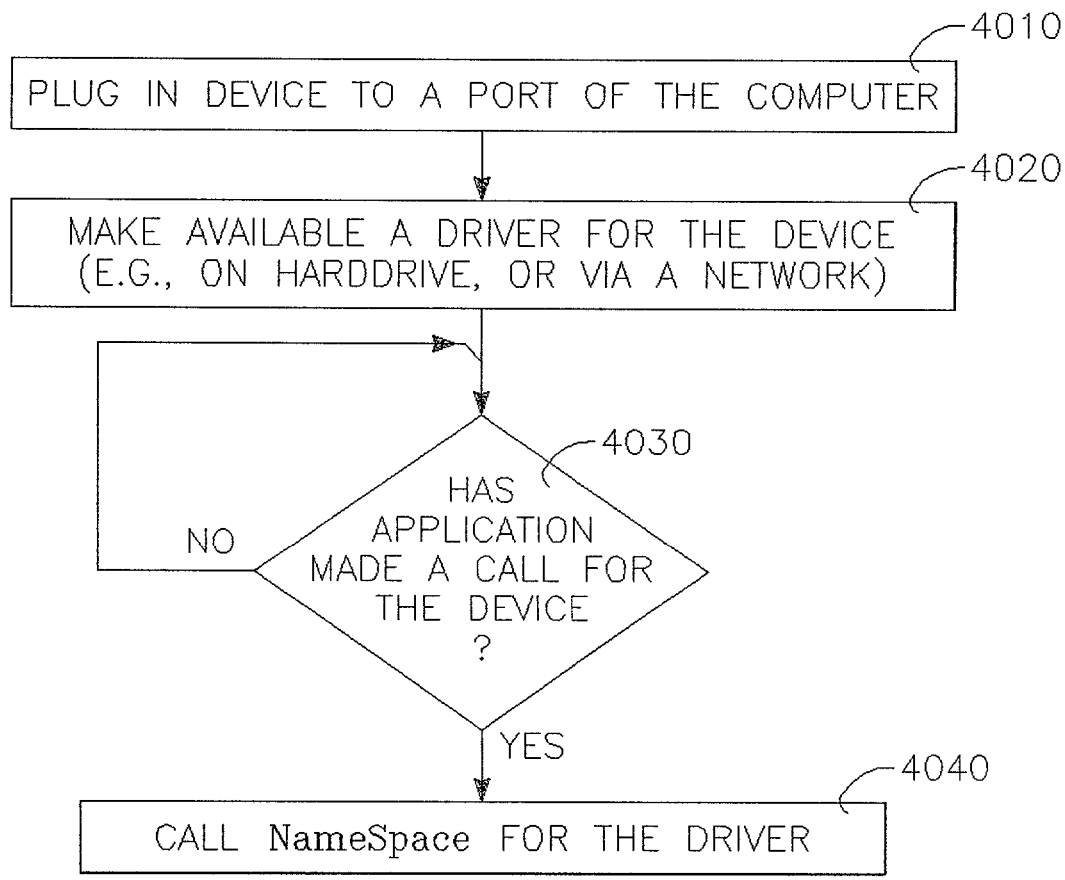
FIG. 40 illustrates an application of the programming model of FIG. 37 to plug-and-play technology.

FIG. 40 illustrates how the method of the programming model illustrated in FIG. 37 improves plug-and-play technology. When a device is plugged into a port of the computer (block 4010 of FIG. 40), it is conventional for the system to immediately load the driver for that device or to halt operations while it tells the user that a driver cannot be found. While the automatic nature of plug-and-play technology is convenient, such interruptions are time-consuming. Even if the driver is found and loaded automatically, system time is consumed in such an operation and delays operations being performed by the user. Such delays may be unnecessary, particularly if the user is not going to use the plugged-in device immediately. In the invention, such an automatic loading operation of a plug-and-play driver does not take place, at least in the preferred embodiment. The only requirement is that at some point before the plugged-in device is called for by an application, the driver for the device is made available either on the disk or on another accessible source such as a network (block 4020 of FIG. 40). Meanwhile, the system performs other tasks until an application makes a call for the plugged-in device (block 4030). Once an application calls for the device, the name of the device driver is handed to NameSpace (block 4040), and the process of FIG. 37 is carried out. The name may be handed to NameSpace by the application itself, particularly if the application was written for the programming model of FIG. 37. Otherwise, another utility may be provided to determine the name of the driver for the device, although this latter mode is not preferable.

Examples of objects that are accessed in accordance with the foregoing programming model include NameSpace, VirtualMemoryManager (VMM), InterProcessCommunication (IPC), VMSpaceVMViewsockets, normal applications such as word processors and spreadsheets, and the like, as well as objects not stored on disk, such as objects in other machines or available on a network, or files or documents in working memory that have not yet been saved.

Loader Optimizations

The present invention optimizes the loader to compile software to run on hardware other than that for which it was designed. In a conventional system, a compiler produces an image and a linker puts it together. The image defines where each piece of code or data is loaded in main memory. With dynamically linked libraries, an image defines what pieces in the library are desired for multiple images. But, some compilers (for example, in embedded systems) do not support dynamically linked (shared) libraries. Many embedded systems do not have loaders. So, the compilers for these systems only produce a single image. As will be described later in this specification, a loader embodying the invention is optimized for use in embedded systems by connecting multiple images in a more flexible way. In part, this entails linking with a shared library after link time. For this purpose, the invention preferably includes a program to manipulate the image produced by the compiler after link time.

When programs are compiled and linked, they are targeted for some particular platform. Optimization decisions are made with that target in mind. If the program is run on a different platform, the optimal decisions would be different. We describe here how those decisions can be delayed and the optimization choices changed after they have been made.

In embedded systems, a small memory footprint is crucial and virtual memory either unnecessary for many application or completely unavailable. On a virtual memory system with multiple address spaces, the optimization goal is to maximize sharing of memory. In a system where multiple address spaces is not the norm, there is no reason to incur the cost of supporting memory sharing. The present invention eliminates this cost in such a system.

It is desirable to be able to run optimally the same program on multiple platforms. One alternative is to use source or intermediate representations such as bytecode. But those require compilers to be around at run-time, implying large memory and many cycles to do a good job at compiling—or slow execution through badly optimized code or interpreters. Instead, the present invention handles completely compiled runnable binaries and adapts them to the platform requirements.

Shared Library without Compiler Support

New platforms are limited as to what the build tools can do, as provided by hardware vendors. It is desireable to be able to use those tools but still have components that import and export items. The present invention accomplishes this by modifying the executable images of those components, so that they can be bound at run time.

The present invention does this by first using the existing build tools up to a certain point (i.e., link time) and then post-processing them with a munger program (at post-link time) and a special loader (at load and run time).

In order to be able to run multiple programs at once in a system that does not provide multiple address spaces, the programs have to be placed at different addresses in the same space. When memory is allocated dynamically, a program might not land at a predetermined address. But the program was previously linked for a predetermined address. The invention solves this problem by relocating the program at run time using a run-time loader of the invention. Relocation is done by means of a relocation table that lists all the locations in the program that contain location dependent pointers. The run-time loader reads the pointers from the locations indicated by the relocation table, adjusts the pointer according to the manner in which the program got relocated and puts the adjusted value back into the program.

The relocation entries have a type (e.g., "call") that indicates how the locations should be interpreted. The present invention takes advantage of this feature and the existence of the relocation table by defining a new relocation type (e.g., "call-dll") for importing from another component. When the run-time loader goes through the relocation table and relocates other relocation entries as usual, it treats the import entries specially. It uses the contents (a number) to determine the component to import from, which export table within that component to import from, and which ordinal within that table to use. It then replaces the contents with the pointer to the value found within the export table indexed by the ordinal.

The invention is capable of implementing dynamically linked (shared) libraries in a system whose compiler does not support dynamically linked libraries. For this purpose, it is desirable to have a dangling reference left in an image compiled by such a compiler. This dangling reference enables a loader embodying the invention to support shared libraries without support from the compiler. In order to understand how the invention accomplishes all this, it is necessary, first, to understand the current state of the art for implementing shared libraries with full support from the compiler. This will now be explained.

Problem Solved by the Invention

Figure 41:
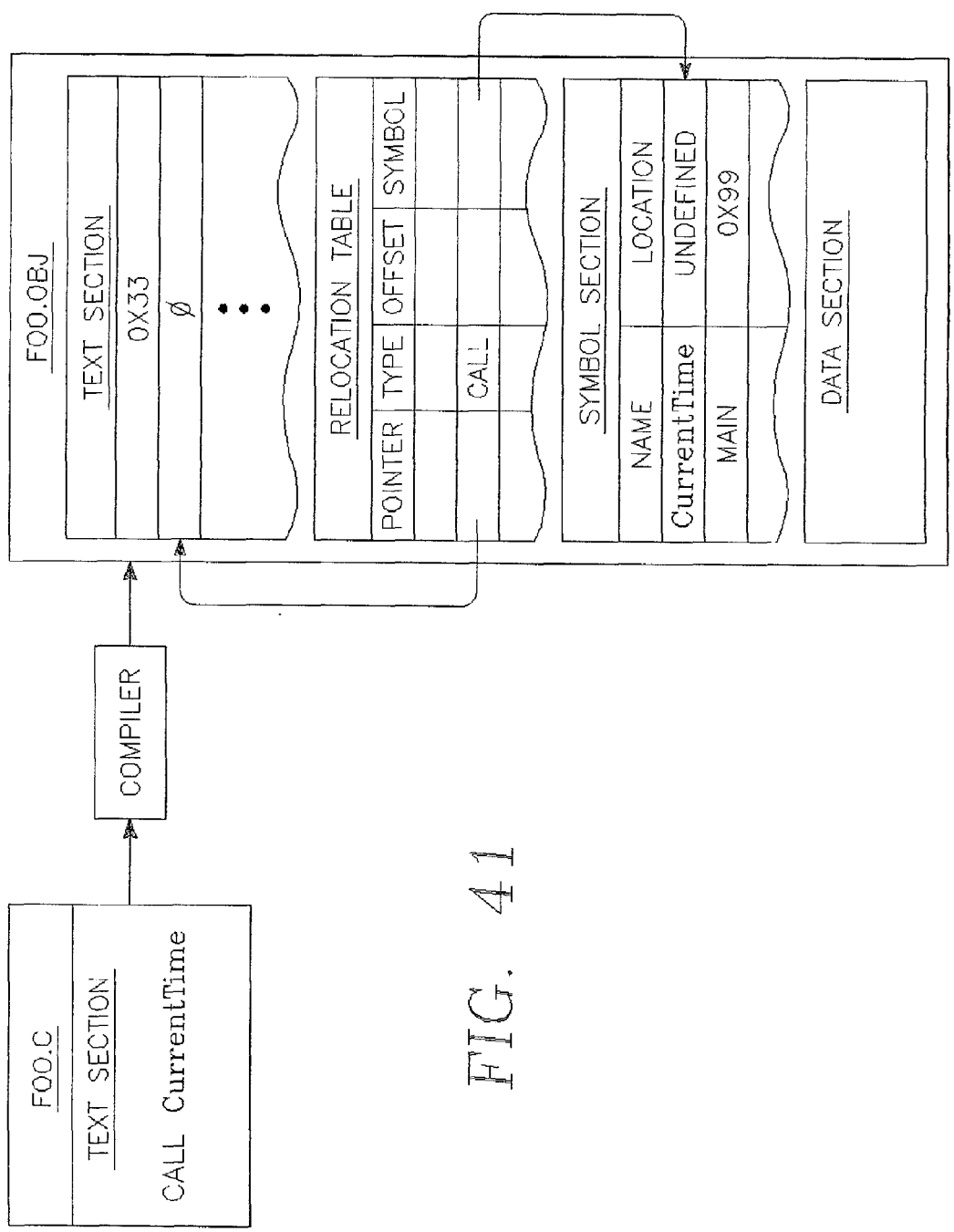
FIGS. 41 and 42 illustrate an example of a conventional process for linking an executable image.

FIG. 41 illustrates a tutorial example of an image containing an instruction in its text section to call the function CurrentTime( ). CurrentTime is a symbol. In the example of FIG. 41, an instruction invoking the function CurrentTime is represented in machine language as 0X33 ("call"), 0X99 (the four-byte address of CurrentTime). In a simple system, the compiler puts this address into the instructions in the text section of the image. In a more complex system in which the compiler can support a dynamically linked (shared) library, the compiler is capable of leaving a 0 in the text section instead of the address. In this case, which is illustrated in FIG. 41, the compiler puts a reminder or a "relocation" entry in the relocation section or table pointing to the 0 in the text section as the place to fix the value that comes from the symbol "CurrentTime". The relocation table is a reminder of what must change before being able to execute the image. A simple minded tool set would not be able to produce anything more than an object in which the text section has a defined address for "CurrentTime". Such a tool set at load time would want to get rid of the relocation table and find out what the implementation for CurrentTime is, which is someplace else in the image, and would want to put the address of that in the text section. The end of result would be a non-relocatable image. The present invention overcomes such problems.

Conventional Linking Process without DLL's

Figure 42:
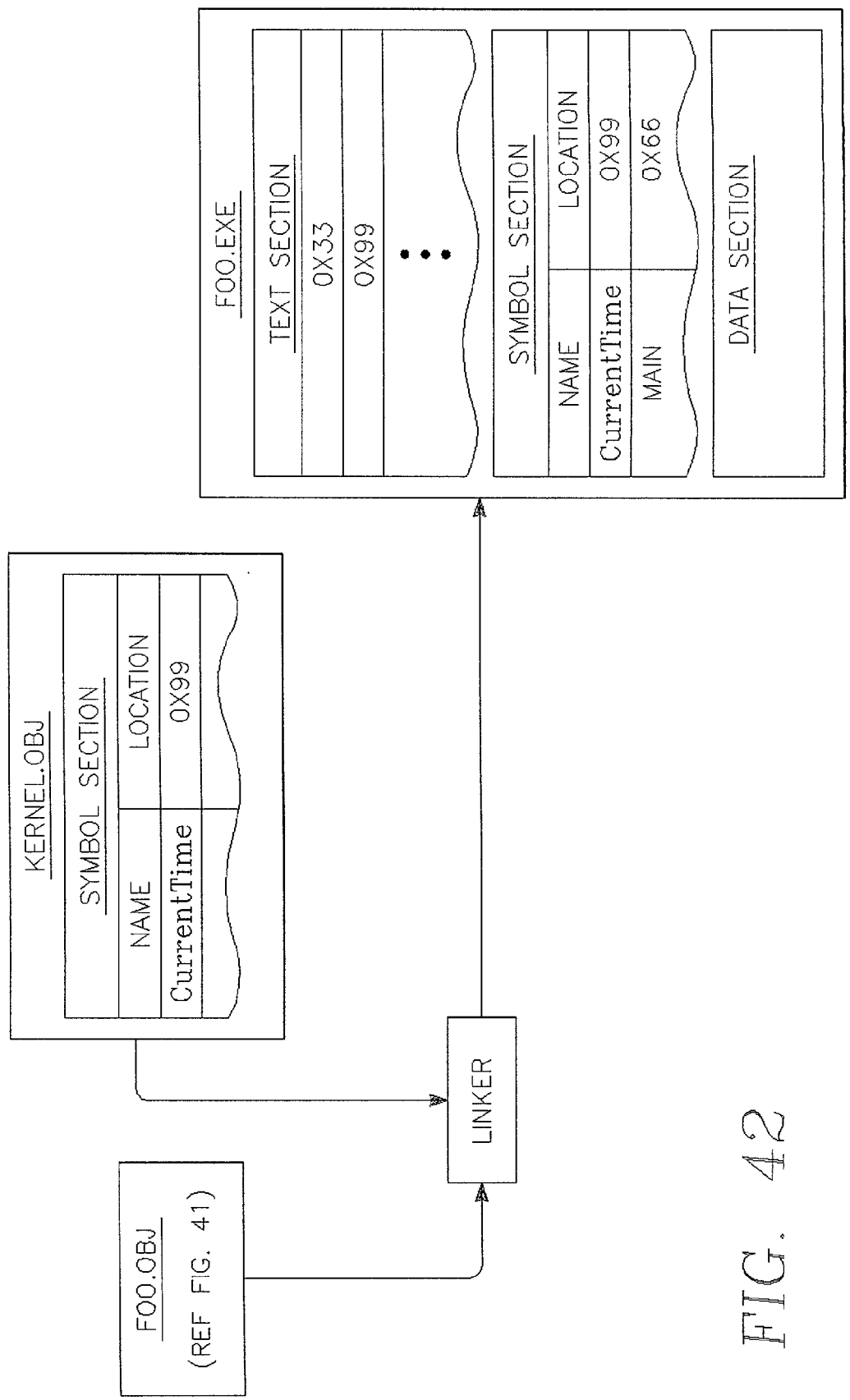

A conventional process of constructing an executable image from separate files is illustrated by an example shown in FIGS. 41 and 42. A C-language source file called FOO.C contains a statement T=CurrentTime( ). The compiler compiles this to make an object file FOO.OBJ having a text section containing instructions including "call" (0X33) and a zero (0) (instead of the address of the symbol "CurrentTime"). FOO.OBJ also has a relocation section or table and a symbol section. Since an implementation for CurrentTime has not been provided thus far, the compiler produces the symbol section of FOO.OBJ with a location "undefined" for the symbol CurrentTime, indicating that its location is to be determined later. The relocation table has a pointer to CurrentTime in the symbol table and to the 0 in the text section. This is pending work for the linker. In the present tutorial example, the symbol CurrentTime is defined in another file, namely an object file called KERNEL.OBJ. This definition includes, in this tutorial example, "0X99" as the address of the first instruction of CurrentTime. The linker puts together the different sections of FOO.OBJ and KERNEL.OBJ to produce a single file FOO.EXE, which is an executable image having no pending work for the linker. The new file FOO.EXE. has its own text section including the instructions "0X33" and "0X99". "0X33" is (in this example) the machine language for "call" and was taken from the text section of FOO.OBJ while "0X99", address of the first instruction in CurrentTime, was derived from the text section of KERNEL.OBJ. The linker, in linking the objects together, has changed the call for CurrentTime in the text section to 0X99, since that is where KERNEL.OBJ specifies the location of CurrentTime. Thus, the linker looks at all undefined symbols and finds their locations and definitions or instructions.

If the linker starts linking a file at address 0, the virtual memory system ensures that the addresses in the file are valid at execution time (across multiple images that is). But, if virtual memory is not available, the linker must relocate (rebase) the addresses in the file before execution time, because the memory range starting at address 0 will probably not be available, and in any event would only be available for one of the images. The list of these pointers is the relocation table and is created by the compiler at the time of creating the object file. Pointers can be in the text or data sections. The linker must load an object at a different location if, in absence of virtual memory, two different objects need to be loaded in the same location/address. In this case, one of the objects is displaced from location at which it was programmed to run. In this case it is necessary to find all the pointers in the file that must be changed.

The linker uses the relocation section to find unknown symbols, and, from the symbol sections of the objects, FOO.OBJ and KERNEL.OBJ, resolves the unknown symbols (e.g., 0) to known symbols (e.g., 0X99) in order to produce the executable image FOO.EXE. Once this is accomplished, there is no further need for the relocation section and it therefore is not present in the final version of FOO.EXE.

Conventional Linking Process With DLL's

Figure 43:
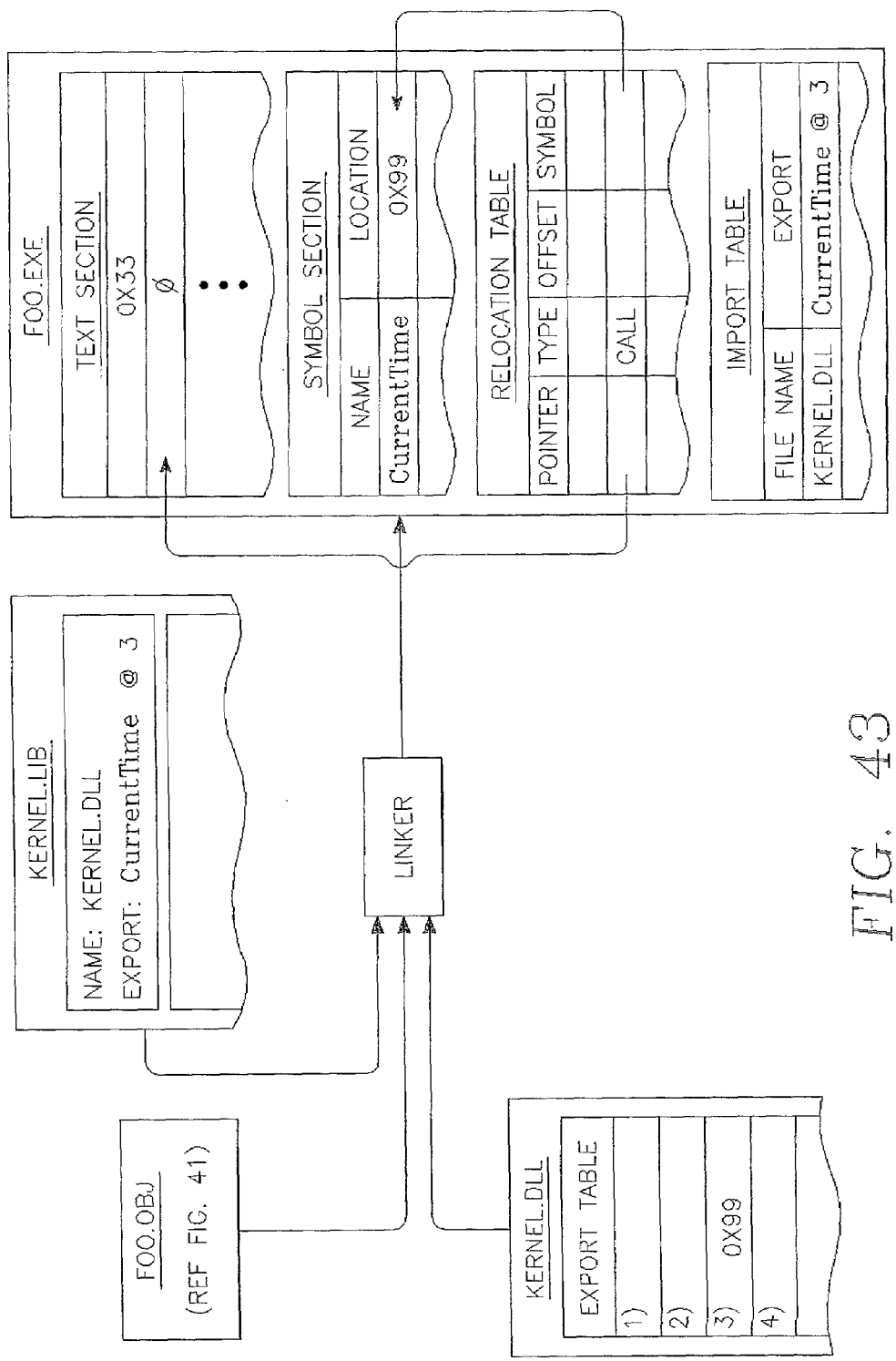
FIG. 43 illustrates an example of a conventional process for linking with shared libraries.

A conventional program that uses a shared library or DLL works by keeping certain symbols undefined in the final ("linked") image. Later, some other program defines the symbols. But, before that, the image is not executable. Binding is the process of resolving the symbols. Deferred (late) binding involves postponing the resolving of certain symbols so that the file remains non-executable. Such a process is illustrated in FIG. 43. Referring to FIG. 43, in implementing shared libraries, the linker is provided at link time with more refined information that, instead of "KERNEL.OBJ", refers to a file "KERNEL.LIB". The information in KERNEL.LIB, in the present example, indicates that the symbol "CurrentTime" is in the third entry of an export table of a shared library called KERNEL.DLL. The linker copies this information to an import table of FOO.EXE. The relocation table links this entry in the import table to the undefined (0) entry in the text section.

Conventionally, in using a dynamically linked library, some linking is done after link time. When the library is created, the symbol table (which is large) is thrown away and a list (an export table) is created of the items to be exported by the library (which is an abbreviated version of the symbol table). In the present example, CurrentTime is in the export table of KERNEL.DLL. The import table of FOO.EXE names KERNEL.DLL, so in this example the linker refers to KERNEL.DLL and imports CurrentTime from it. The ordinal (3) is the order of the item in the stack of the library, and the linker preferably uses this rather than the symbol name since it is shorter.

Late Binding without Shared Library Support

The present invention enables the loader to be optimized for an operating system having a compiler which does not provide import or export sections and therefore provides no shared library support (e.g., a non-Microsoft compiler). The invention accomplishes this, in part, by postponing at least some of the linking or binding. This requires that the compiler can produce an object file which is not executable. Since it is not known beforehand where the object file will ultimately be allocated (to what address), the compiler must leave something for the linker to adjust.

In the case of an external call which is undefined, one entry in the relocation table will have two pointers, one pointing to the location of the instruction that has to be relocated, "the offset", and the other pointing to the symbol that corresponds to that location. The entry also states the type of relocation. Thus, each entry in the relocation table has three elements: (1) the offset—"offset from the base of the file"; (2) the symbol, which is an index into this table of symbols; (3) the "type" of relocation (for example "call" or "data reference"), which indicates what type of instruction it is.

Symbols are either "defined" or "undefined". Linking, including the type of linking performed in the present invention by post-link time late binding, matches defined and undefined symbols in different object files, until all symbols are defined ("resolved"). This has to be completed before execution by a compiler. The present invention has a munger program to perform the post-link time ("late") binding—a "postlinker". The munger transforms to go from the nonexecutable object file (FOO.OBJ) to the executable image (FOO.EXE).

One difference between the object file FOO.OBJ and the executable image FOO.EXE is that the object file FOO.OBJ has a text section, data section, relocation section, but not an import table, while FOO.EXE has an import table. Combining all the required objects produces the executable image FOO.EXE. The result of an executable in the dll case is that all the symbols are resolved, split into sections, including relocation and symbol sections.

The invention is useful in those case where the compiler is of the type that doesn't produce such a file. Some linkers get rid of the relocation table and symbols, producing a file which can't be moved. It is best if the compiler can leave some symbols undefined. If the linker refuses to deal with undefined symbols, the invention can generate or take a fake object that has the same location defined as the desired symbols, so that the undefined symbols will refer to the same location.

The compiler is allowed to do the "eager" binding, and the post-link-time linker of the invention, the munger, will undo it later to accomodate late binding. There are four phases, compile time, link time, load time and run time. The post link-time linking of the present invention, late binding, preferably occurs at or before load time.

Figure 44:
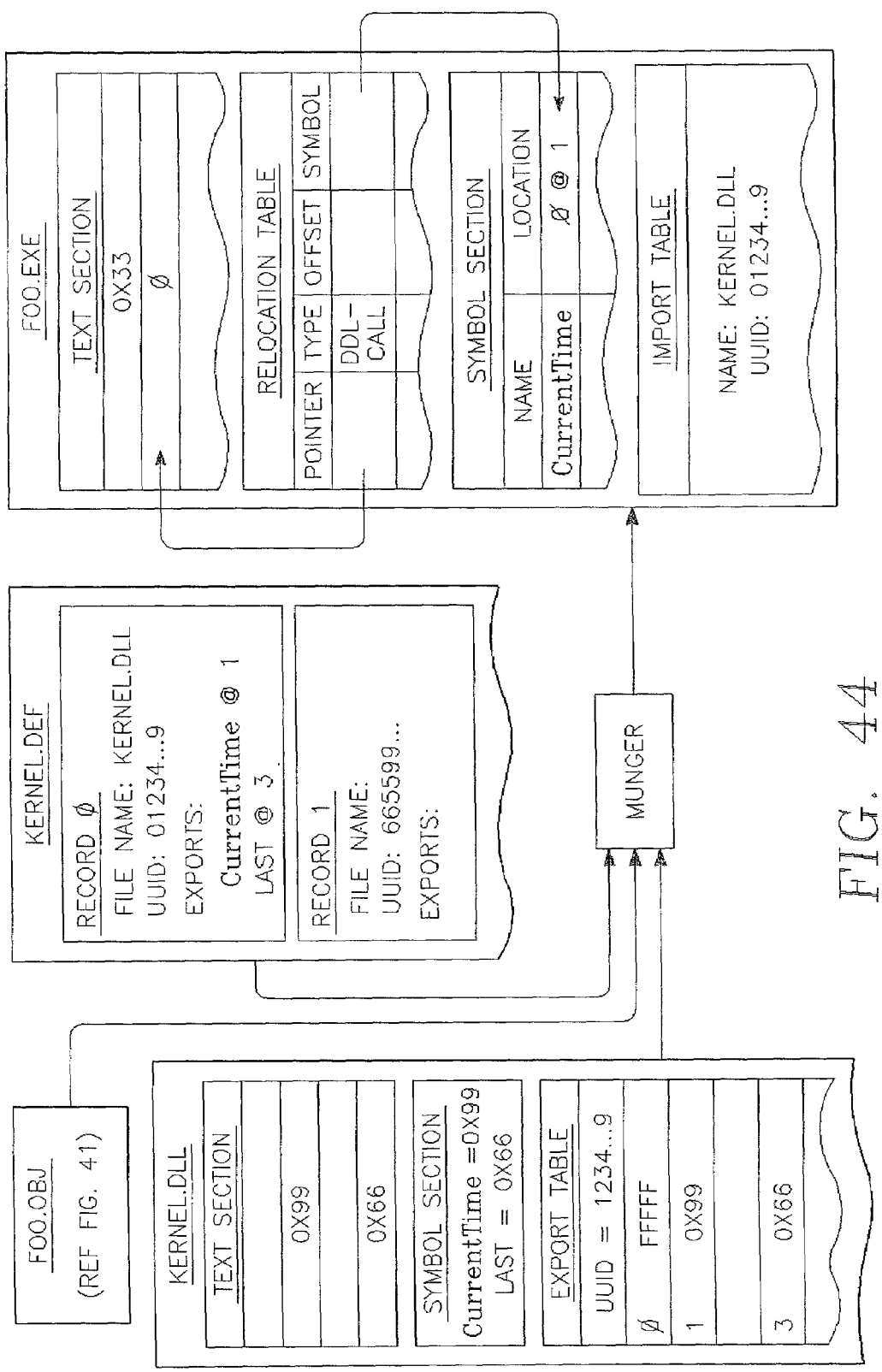
FIG. 44 illustrates a process in accordance with the present invention for linking an executable image using shared libraries.

Operation of the Post-Link Time Linker:

Referring now to FIG. 44, the munger refers to a text (ascii) file, e.g., KERNEL.DEF, which specifies the symbols to be imported from KERNEL.DLL. Files such as KERNEL.DEF have already been produced for programs running on existing machines as the precursors to the KERNEL.LIB files discussed earlier in this specification with reference to FIG. 43. KERNEL.DEF has a particular record ( record 0 ) specifing the name (KERNEL.DLL), and a unique ID (UUID), e.g., 0X123 . . . 9. (There is a conventional tool to generate the UUID.) The munger program uses KERNEL.DEF to access information to combine with FOO.OBJ to produce FOO.EXE with an import table, without requiring the compiler to support import tables, export tables or shared libraries. Record 0 of KERNEL.DEF lists exports from KERNEL.DLL (for example, CurrentTime @ 1, Last @ 3) not listed in FOO.OBJ that must be included as entries in an import table in FOO.EXE. In FIG. 44, record 0 of KERNEL.DEF contains the information that "export=CurrentTime @ 1". The munger program looks at KERNEL.DEF and sees "export=CurrentTime @ 1". The munger program sees in the relocation table of FOO.OBJ that FOO.OBJ calls for CurrentTime which is undefined in FOO.OBJ (or it may bound to a fake object and needs to be redefined). The munger program does the following for that relocation: The relocation was of the type "call", and the munger changes the type to "dll-call", which will be described below. The munger must keep the offset, but it doesn't need to keep the symbol as the symbol is not as useful in the preferred embodiment. This is because the preferred embodiment support linking by-ordinal, not linking by name and the symbol table is therefore superfluous by this point.

The relocation type "dll-call" is a relocation type of the present invention which captures two pieces of information, the ordinal and the index. The ordinal refers to a particular record in the export table of KERNEL.DLL, and in the present example the ordinal is 1. As a result, the relocation entry reads "dll call symbol 0 @ 1", where 0 is the index, which contains a reference to an entry in the import table. This entry in the import table contains the name of the dynamic library i.e., KERNEL.DLL and the UUID of the export table in KERNEL.DLL. The munger does not change any existing relocations, only those specified by KERNEL.DEF so the other symbols aren't shown in the drawing. KERNEL.DEF has a number of records, and record 0 names KERNEL.DLL and a UUID. The ordinal (1) references a particular entry in the export section of KERNEL.DLL, which will be described later in this specification. Other variations may be implemented depending upon the machine on which the system runs.

The UUID of records in KERNEL.DEF defines the specific export table present in KERNEL.DLL that is to be used by FOO.EXE. In the present invention, a dll such as KERNEL.DLL can have many different export tables; each one uniquely identified by its own UUID. Thus, the UUID enables a specific choice among multiple export tables in the dll. The text file KERNEL.DEF can be generated mathematically using existing tools or by hand by the programmer and has been produced for systems running on existing computers. Such existing files may be used to carry out the present invention.

The object file FOO.OBJ of FIG. 43 lacks an import table because the compiler that produced it did not support import or export tables (in the present example). For an embedded system with very minimal compiler support, the invention decreases the time to market because there is no need to reform such a compiler.

The foregoing describes how to produce import tables. How to create an export section for KERNEL.DLL will now be described. The generation from FOO.OBJ of FOO.EXE with an import table has been described, and now the generation from KERNEL.OBJ of KERNEL.DLL with an export table will now be described.

Figure 45:
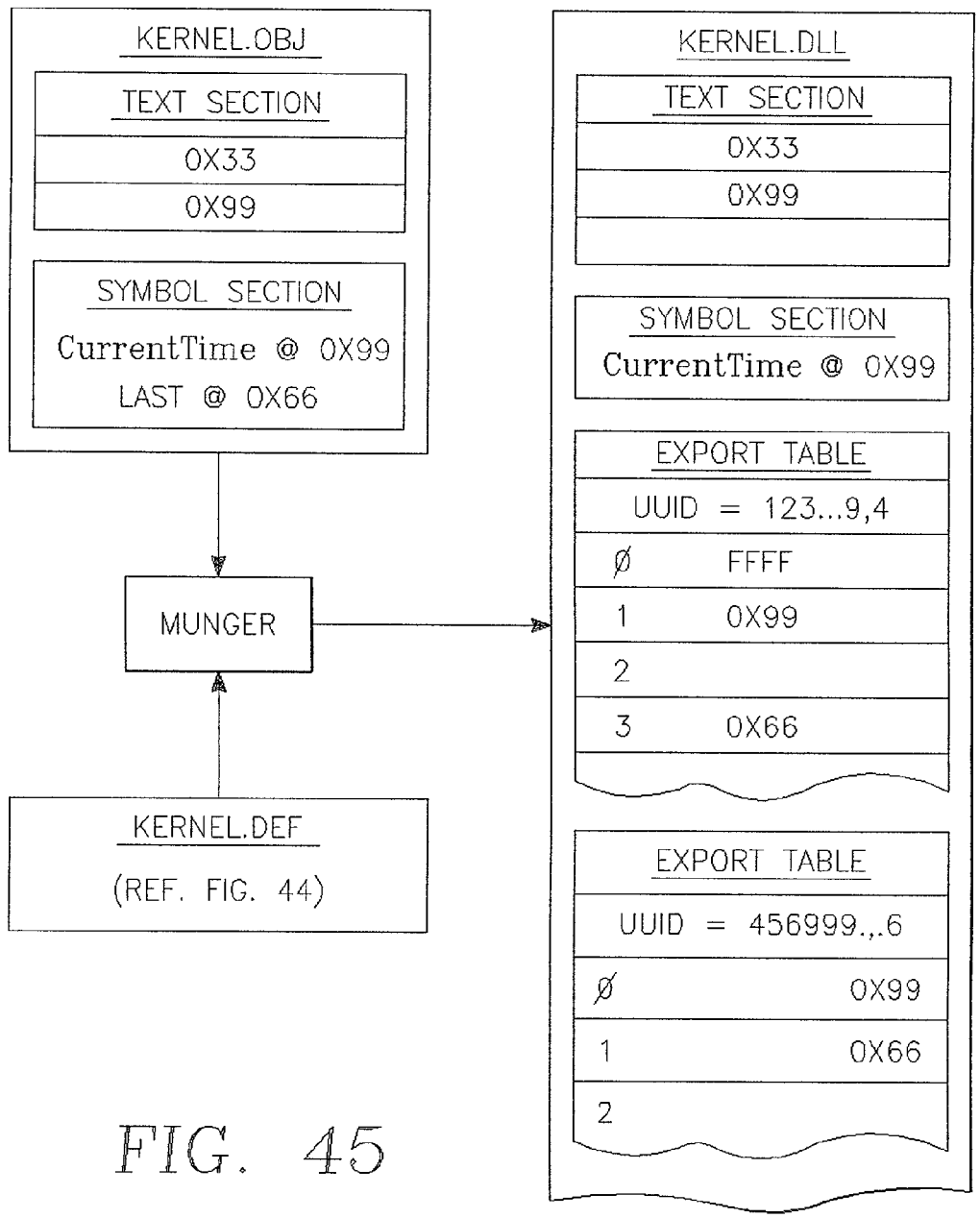
FIG. 45 illustrates a process in accordance with the present invention for forming a dynamically linked library.

Referring to FIG. 45, KERNEL.DLL must have an export table. The export table is the one that looks at both the ordinals and the names. Where the system compiler does not support import/export tables, the munger program constructs the export table as follows: It builds an array of ordinals. According to record 0 of KERNEL.DEF, the symbol "CurrentTime" has ordinal number 1 while the symbol "last" has ordinal number 3. The munger counts ordinal number 1 as the first export table entry and therefore writes the location ("X99") of CurrentTime in KERNEL.LIB as the second entry in the export table. In an alternative embodiment of the invention, the munger knows the location ("X99") of CurrentTime because it is stated in record 0 of KERNEL.DEF. In the preferred embodiment, however, the munger finds this location by inspecting KERNEL.DLL. The munger counts ordinal number 3 as the fourth export table entry and therefore writes the location ("X66") of the symbol "Last" as the fourth entry in the export table. The first and second export table entries are left undefined in this example. The munger must put the definition of the symbol "CurrentTime", namely X99, into the export table as the second entry (ordinal 1) because, otherwise, the tool will fail. The symbol section of KERNEL.DLL defines the name "CurrentTime" with a pointer to the appropriate location in the text section (i.e., X99), and the munger copies this pointer (X99) to the corresponding entry (ordinal 1) in the new export table.

What goes into the relocation section of any image such as FOO.EXE or KERNEL.DLL, is machine dependent. FIG. 45 illustrates the object KERNEL.OBJ and the new export section constructed by the munger. The munger combines the two together and thereby produces a new object, KERNEL.DLL which has a new export section, in which there are four entries: the first entry in the illustrated example is void ("ffff"), the next entry corresponds to ordinal 1 and is "X99" which is the defined symbol "CurrentTime", and a similar entry corresponding to ordinal 3 for the symbol "last". In resolving the unknown symbols and constructing the export table, the munger looked up the values of the exported symbols, and put them in the export section at the appropriate places (ordinals) as instructed by the definition file KERNEL.DEF.

Multiple Export Tables

Using the UUID permits the system to manage an array of multiples of export sections. In the multiple export tables illustrated in FIG. 45, the first entry is the UUID (123 . . 99) and a number 4 which equals the number of ordinals, and then the four entries. A second export section has a UUID (456 . . 999) and six as the number of ordinals. Thus, there can be different versions of the export table designated by different UUID's. Two versions of the dll within the same dll are provided by having two tables. This is done by giving the two versions of the dll two different UUID's. The loader at load time looks for the table with the correct UUID.

The KERNEL.DLL file resembles a COM object, analogous to performing a query interface at load time. The UUID is the interface to query for, while the export table is the V table. The loader can make the query interface available to applications, thus enabling binding at run-time. This extends prior art functionality (e.g. Windows GetProcAddress) through precise versioning and increased flexibility.

Short Cutting Jumps

In the prior art, indirectly jumping through the import section confines all of the address transformations required for sharing of memory in a virtual memory system to a single section (the import section). Such transformations allow a dll resource to land in different locations for different executables, which it typically does in virtual memory systems. In virtual memory systems, a single copy of a resource or code stored in one physical location may appear in different locations in the address spaces of different applications. The indirect jump enables each application to find the resource at the address which the application believes it to be, without having to change every call (to the DLL) that appears in the application image.

In the foregoing example of FIG. 45, the call for CurrentTime involves fetching the address to jump to from a specific entry in the import section, then jumping to that address. This is an indirect call. In an alternative implementation, the entries in the import section could be themselves instructions to jump to the DLL addresses. In this case the instructions in the image are direct calls, and the import section acts as a redirector of sorts. Both implementations obtain the same result: the call instruction in the executable image (direct or indirect that it might be) can be re-directed simply by changing the import section entries.

In order to increase memory sharing, those programs importing from shared libraries that are targeted for multiple address space systems do not themselves point directly to the items exported by the library. Instead they point indirectly through the import section. This way all the pointers pointing from one component to another are collected into a small area. Assuming the library lands in different locations in different address spaces, the program can still be shared. In a system where multiple address spaces is not the norm, such indirection is plainly overhead, both in space and in performance. The import section wastes memory and the indirect memory access wastes cycles.

This problem is solved in the present invention by providing a jump short-cutting feature in the loader. Jump short-cutting in accordance with the invention requires the loader to go through the relocation table and determine whether the contents of the location pointed to by the relocation entry points to the import section. If so, the loader finds the corresponding exported address in the exporting component. The loader looks at the machine instruction that uses the pointer, and modifies it to use a direct access to the exported address that was found.

For instance, on a typical 80386 or 80486 machine there is one machine instruction for an indirect jump and another for a direct jump, both followed by an address. In the present invention, the loader finds the address as it was pointed to by the relocation entry. It looks backward for the preceding machine language code that uses the address. If the code is an indirect jump, it is replaced by a direct jump, otherwise it is left as it is. The address is replaced by the address found by looking at the import section entry and resolving that with regards to the exporter. imilar implementations are done for other machine instructions and other processors.

The jump short-cutting of the present invention operates at or after load time in systems not requiring such indirect jumping by short-cutting to a direct call by removing the intermediate jump. If the image is shared, then an indirect jump (an extra jump) is necessary and this feature of the invention is not employed.

As described above, the loader goes through the relocation section and finds pointers that need changing. It looks at the export section to see where they go (which symbol they go to). If there is only a small amount of memory that can be shared, the jump short-cutting feature of the invention modifies the indirect jump instruction to a direct jump instruction. This entails changing pointers and instructions and eliminates the needs for an import section. By eliminating the import table/section, memory is saved. Thus, there are two advantages: memory is saved (by discarding the import section) and speed is increased (by eliminating the middle jump).

Figure 46A:
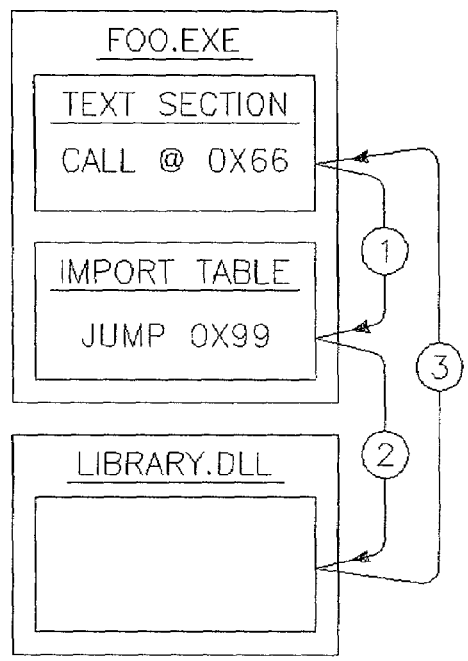
FIGS. 46A and 46B illustrate an example of a jump shortcutting process of the present invention.
Figure 46B:
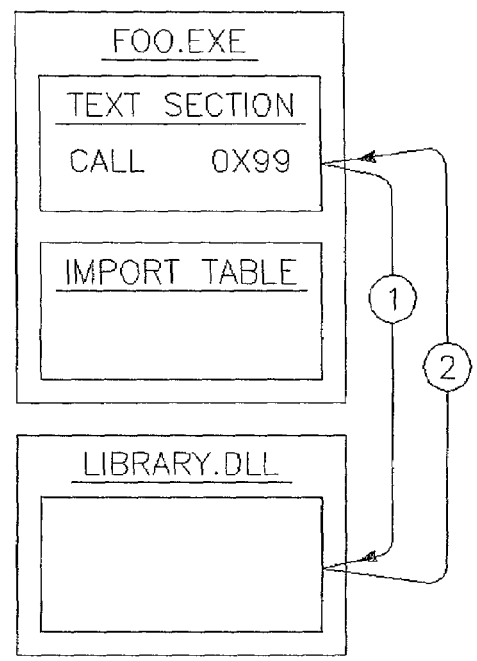
Figure 47A:
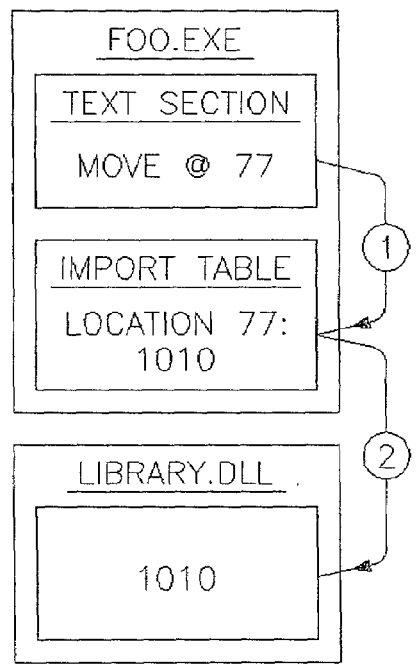
FIGS. 47A and 47B illustrate an example of a jump shortcutting process as applied to data references in accordance with the present invention.
Figure 47B:
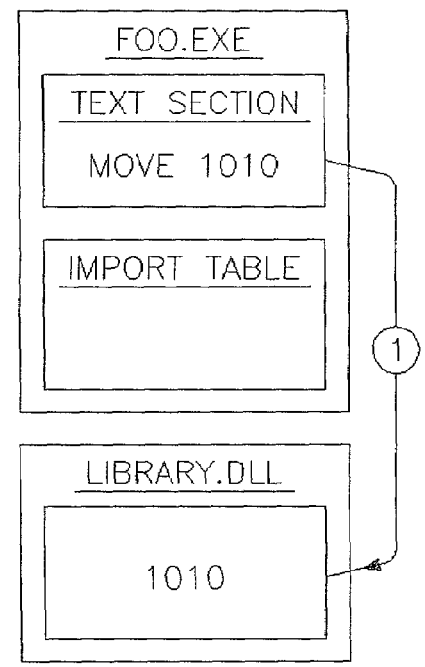

FIGS. 46A and B illustrate the jump short-cutting process as applied to instructions in the text section of an image. In FIG. 46A, the image FOO.EXE imports a symbol from the shared library file LIBRARY.DLL by first jumping from the call in the text section to a location (0X66) in the import table (JUMP 1) and then from 0X66 in the import section to 0X99 in LIBRARY.DLL (JUMP 2). The information retrieved is then returned to the text section (JUMP 3). Such indirect jumping, has already been described with reference to FIGS. 43–45. In the event FOO.EXE is to run on a system having no virtual memory, the linker bypasses the import table by changing the call in the text section to 0X99 and modifying the jump instruction to a direct jump instruction. The result is illustrated in FIG. 46B, showing the direct jumps from the text section of FOO.EXE to LIBRARY.DLL and back again. Jump short-cutting is also applicable to data references. In FIG. 47A, an executable, FOO.EXE, has in its text section an instruction to move, the destination being a location 77 in the import table of FOO.EXE. Location 77 has a pointer to the real destination, namely 1010 in a data section. As illustrated in FIG. 47B, by changing the move instruction to have as its destination 1010 in the data section and modifying the move instruction to a direct move, the import table is bypassed.

While the jump short-cutting feature of the invention is useful for fine tuning virtual memory applications for use in embedded systems having no virtual memory, it also may be used for systems with virtual memory in those cases in which the dll resource consistently "lands" in the same location for different executables.

Compaction

In order to increase memory sharing and variable protections in a system providing multiple address spaces, programs are often linked in a way where different sections (a program file contains headers, and a number of sections containing machine instructions, data, etc.) are aligned on page boundaries. In this way, two sections never share a page, instead there is padding between sections at the end of a section. On a system that does not utilize sharing between multiple address spaces and has no need to protect different sections differently, the paddings simply amount to memory wastage. On such a system, the post-link time loader of the present invention removes the alignments pads by relocating each section separately in memory in a consecutive fashion. In general the loader is free to place each section whereever it pleases, but the compaction is particularly useful because it can result in a significant memory saving when there are multiple components loaded into memory at once.

Figure 48:
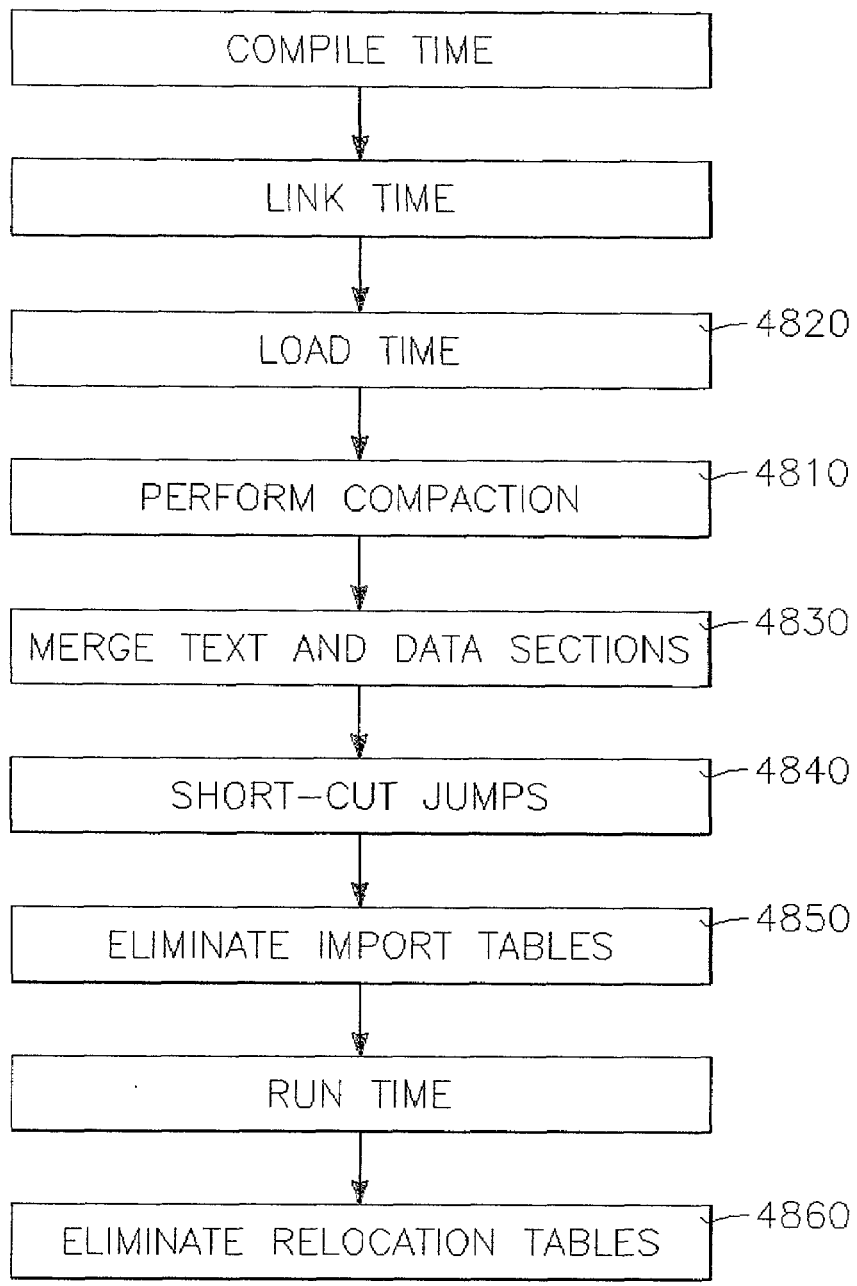
FIG. 48 illustrates an example of a post-link time compaction process of the present invention.

Conventionally, an empty space at the end of a page is filled with zeros so that sections are aligned on page boundaries by the zero-filled padding. Compaction is a process in which the zero-filled padding is removed. Referring to a preferred embodiment illustrated in FIG. 48, after load time (block 4810 of FIG. 48), compaction is performed (block 4810 of FIG. 48). Compaction performed at or after load time is so thorough that the text and data sections may be merged (block 4830). A prior art linker performs compaction at link time. One embodiment of the invention also includes jump short-cutting (block 4840). Jump short-cutting eliminates the import section (block 4850) while compaction eliminates padding between images.

Since the invention performs compaction at load time, it uses a relocation table to adjust pointers to reflect changed locations. Prior art (Win 98 and NT) does this at link time, not load time, and as a result cannot compact text and data sections together, so that compaction was incomplete. The indirect jump eliminated at load time in the present invention permits elimination of the import section. Since the relocation table disappears at run time by resolution of all the undefined symbols (block 4860), and since text and data sections are merged by removing padding between them, the load-time compaction process of the invention leaves only a single section at run time, a significant advantage.

Synthesizing Code for Virtual Memory

The invention is capable of handing the reverse situation in which a program not originally written to exploit sharing of memory (via the virtual memory system) is to be loaded into a system that has virtual memory capability. The invention handles this by synthesizing at or before load time new code for the program to fully utilize the virtual memory capability of the platform on which it is loaded.

Imports that were optimized for direct access can be converted to indirect access at run-time. This is done by generating the otherwise unnecessary import section on the fly, filling it with pointers to the exporting entries, and modifying the jump instruction code from direct to indirect. For jumps and calls it is also possible to make jumps and calls directly, but into the generated import section instead of directly to the final target. In this case the import section contains code that jumps into the final destination. This is the reverse of the jump short-cutting process.

The reverse of the load-time compaction process of the invention may be performed at run time as a load-time code synthesis where memory sharing is desired. Such a load-time code synthesis would be useful where the executable was linked for non-virtual memory use and therefore lacks padding to align its section along page boundaries and lacks an import table and indirect jumping. Such load-time code synthesis would be useful to make a text section shareable (if virtual memory is provided) by providing an indirect jump and an import section that did not exist before. The post-link time linker determines from the relocation table whether to jump directly or indirectly.

Figure 49:
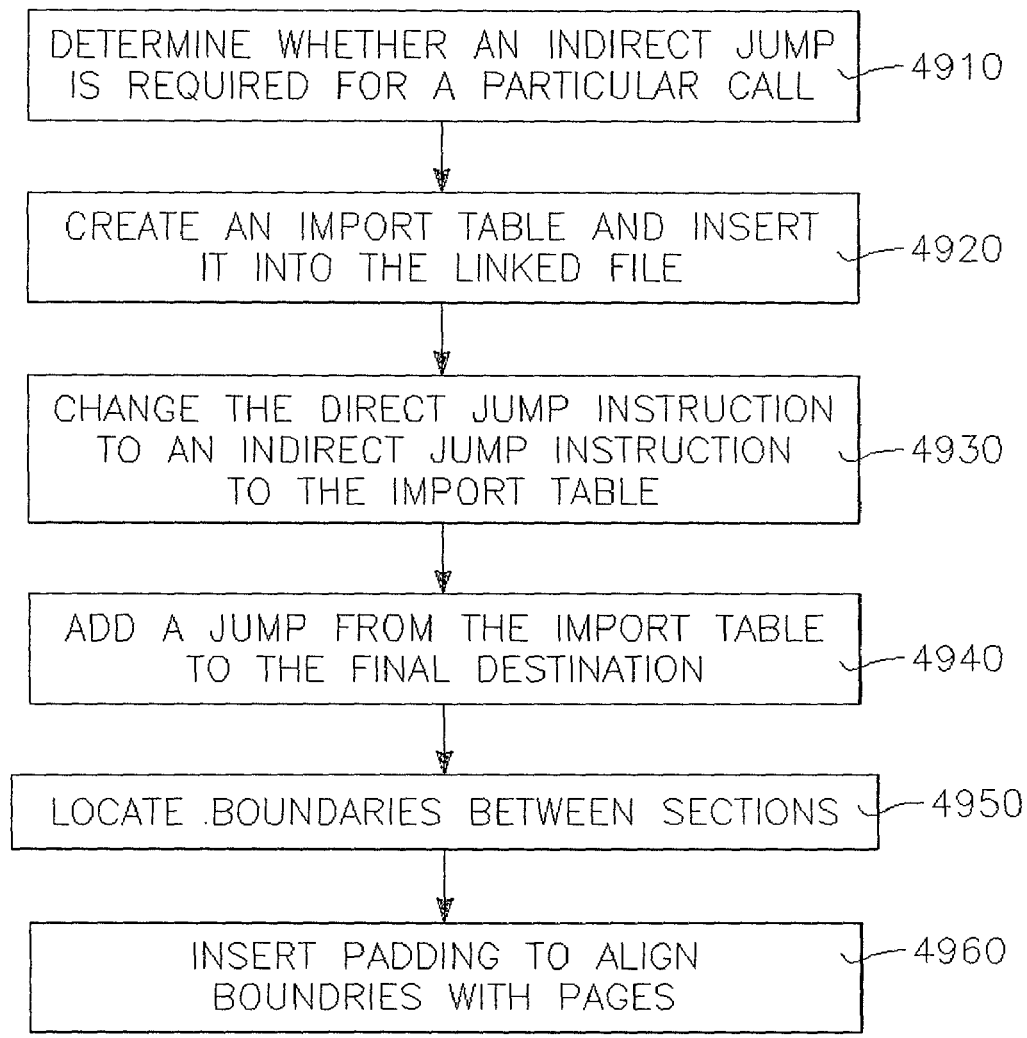
FIG. 49 illustrates a load time code synthesis process for virtual memory in accordance with the present invention.

Such load-time code synthesis is illustrated in FIG. 49. At load time, the post-link time munger determines from the relocation table of the linked file whether an indirect jump is required for a particular call (block 4910 of FIG. 49). If so, it adds an import table to the linked file (block 4920), changes the direct jump to an indirect jump to the import table (block 4930) and adds a jump (block 4940) from the import table to the final destination (e.g., an export table in a shared library file). The post-link time linker further locates the boundaries (block 4950) between sucessive sections of the linked file (e.g., the boundary between the text and symbol sections) and inserts padding at the end of each section so as to bring these boundaries in alignment with the page boundaries of the memory (block 4960).

In one aspect of the invention, at link time selected code is taken out of an image and inserted into a separate dynamically linked library file. The code thus taken out of the image is now accessible to other images via the separate dll file containing that code. For example, in order to reverse the process illustated in FIG. 44 in which three files (FOO.OBJ, KERNEL.DLL. and KERNEL.DEF) are synthesized into a single image (FOO.EXE), the code synthesis feature of the invention starts with the single image (e.g., FOO.EXE) and extracts code therein to form a separate dll file (e.g., KERNEL.DLL), a separate object file (FOO.OBJ) and so on.

```
        ILoadableIPC *This);

UINT ( MCT *Release )(
        ILoadableIPC *This);

SCODE ( MCT *TrapHandler )(
        ILoadableIPC *This,
            PCXTINFO pThreadState
            );

} ILoadableIPCVtbl;

#if defined(__cplusplus) && !defined(CINTERFACE)

interface ILoadableIPC : public IUnknown
    {
    public:
     virtual SCODE MCT TrapHandler(
            PCXTINFO pThreadState
            ) = 0;

};

else  /* __cplusplus */  /* C style interface */ interface ILoadableIPC
    {
     CONST_VTBL struct ILoadableIPCVtbl *lpVtbl;
    };

endif  /* __cplusplus */ /* C style interface */ if defined(__cplusplus)
}
```

```
#endif /* __cplusplus */
```

APPENDIX B:

The following is a header file for the mutation (Imutate) feature of MMLite. This is the interface to the object mutation algorithm. The mutator thread invokes one of the two methods MutateObject or MutateVtable. The first is the general case, the second is a special case where the object state does not need to actually change. There might be other special cases, such as mutating a single method. The general case covers them all, it just might be less efficient. This interface is registered in the namespace by the component that implements the mutation algorithm(s). This is a loadable component.

```
#if defined(__cplusplus)
extern "C" {
endif /* __cplusplus */ typedef BOOL (MCT *TRANSITION_FUNCTION)(
        IUnknown *pObj
    );

typedef interface IMutate IMutate;

typedef UINT MUTATE_FLAGS;
#define MUTATE_AS_APPLICABLE (0x0)
#define MUTATE_BY_MUTEX (0x1)
#define MUTATE_BY_ABORT (0x2)
#define MUTATE_BY_SWIZZLING (0x3)
#define MUTATE_BY_STOMPING (0x4)

typedef struct IMutateVtbl {
```

APPENDIX A:

The following is a header file for the interprocess communication (IPC) feature of MMLite. This is the interface for the loadable IPC. IPC.EXE registers an object that obeys this interface in the namespace, at the time IPC.EXE is loaded (on demand). The method of interest is the TrapHandler() one, which is passed a pointer (pThreadState) to the machine-level register state of the thread. The method must infer from the state what is the operation the application intends to perform. For instance, some of the operations that must be implemented by IPC.EXE are:
- creation and destruction of endpoints
- linking of endpoints (export/import)
- remote method invocation.

We do not specify these, they are specific of the particular style of IPC. For example, there might be a special value in one of the machine registers that indicates what operation is desired.

```
#if defined(__cplusplus)
extern "C" {
endif /* __cplusplus */ typedef interface ILoadableIPC ILoadableIPC;

typedef struct ILoadableIPCVtbl {
      SCODE ( MCT *QueryInterface )(
          ILoadableIPC *This,
          /* [in] */ REFIID Iid,
          /* [out] */ void **ppObject);

UINT ( MCT *AddRef )(
```

```c
    SCODE ( MCT *QueryInterface )(
        IMutate *This,
        /* [in] */ REFIID Iid,
        /* [out] */ void **ppObject);

UINT ( MCT *AddRef )(
        IMutate *This);

UINT ( MCT *Release )(
        IMutate *This);

SCODE ( MCT *MutateVtable )(
        IMutate *This,
        IUnknown *pWho,
            struct IUnknownVtbl *pNewVtable,
            MUTATE_FLAGS dwFlags);

SCODE ( MCT *MutateObject )(
        IMutate *This,
        IUnknown *pWho,
            TRANSITION_FUNCTION pTransition,
            MUTATE_FLAGS dwFlags);

} IMutateVtbl;

#if defined(__cplusplus) && !defined(CINTERFACE)

interface IMutate : public IUnknown
    {
    public:
     virtual SCODE MCT MutateVtable(
        IUnknown *pWho,
            struct IUnknownVtbl *pNewVtable,
            MUTATE_FLAGS dwFlags) = 0;
```

```
    virtual SCODE MCT MutateObject(
        IUnknown *pWho,
            TRANSITION_FUNCTION pTransition,
            MUTATE_FLAGS dwFlags) = 0;

};

else  /* __cplusplus */  /* C style interface */ interface IMutate
    {
     CONST_VTBL struct IMutateVtbl *lpVtbl;
    };

endif  /* __cplusplus */ /* C style interface */ if defined(__cplusplus)
}
endif /* __cplusplus */
```

Appendix C:

The following is a header file of the virtual memory manager of MMLite. These are the 3 interfaces to the loadable virtual memory (VM). [The IVmMapping interface is referred to above as VMMap.] The fourth interface (VMFactory) is the one that is actually registered in the namespace; it contains the constructors for objects of the other 3 types.

```
#ifndef _MMVM_H_
```

```c
define _MMVM_H_ typedef struct IUnknown *PIUNKNOWN;
typedef struct IFile *PIFILE;
typedef struct IVmView *PIVMVIEW;
typedef struct IVmSpace *PIVMSPACE;
typedef struct IVmMapping *PIVMMAPPING;

/* Basic types */
typedef UINT64 VM_OFFSET;
typedef UINT64 VM_SIZE;
typedef UINT32 VM_FLAGS;

/* Other necessary types */
typedef struct _IPAGELIST *PIPAGELIST;

/* VM_FLAGS bit definitions */
#define VM_PROT_READ        1
#define VM_PROT_WRITE       2
#define VM_PROT_EXECUTE     4
#define VM_COPYONWRITE      8
#define VM_WIRE             0x10    /* Lock memory in core */
#define VM_NOCACHE          0x20    /* Turn off hardware cache, for i/o etc. */
#define VM_SHARE            0x40    /* Recursion: Share mem w underlying VMSpace */
#define VM_PAGE_PRESENT     0x1000  /* The page is in core */
#define VM_PAGE_DIRTY       0x2000  /* The page has been written and is writable */
#define VM_PAGE_BUSY        0x4000  /* Undergoing transition and is unaccessible */
#define VM_PAGE_WAITING     0x8000  /* somebody is waiting for the busy page */
```

```
#define VM_PAGE_VTLB    0x10000    /* page has been looked
up since VTLB_Flush */
#define VM_PAGE_MARK    0x20000    /* page has been touched
(for pseudo-LRU) */ define VM_FLAGS_MASK    0x7f    /* Flags settable in vs-
>Protect. */

/* ----------------- Mapping -------------------------- */
/* A mapping object is used for providing backing storage
for an
 * address space.  A mapping object can map a file or
another address
 * space (or whatever you can think of).
 *
 * A mapping object has an offset into the backing store
object it maps,
 * a size, and a maximum protection.
 *
 * Data
 */
struct VmMappingVtbl {
    SCODE (*QueryInterface)(PIVMMAPPING This, REFIID Iid,
void **ppObject);
    UINT (*AddRef)(PIVMMAPPING This);
    UINT (*Release)(PIVMMAPPING This);

/* Get pages from backing store. */
    SCODE (*Read)(PIVMMAPPING This, VM_OFFSET Offset,
VM_SIZE Size,
        PIPAGELIST *PageList);

/* Write pages out into backing store */
```

```
    SCODE (*Write)(PIVMMAPPING This, VM_OFFSET Offset,
VM_SIZE Size,
            BOOL Consume, PIPAGELIST PageList);

/* Like read but shares pages instead of copying them
(lookup func). */
    SCODE (*Share)(PIVMMAPPING This, VM_OFFSET Offset,
VM_SIZE Size,
            VM_FLAGS Access, PIPAGELIST *pPageList);

/* Check protection of area in order to do checks at
vm_prot time.
     * Returns lowest possible access combination
(intersection).
     */
    SCODE (*QueryAccess)(PIVMMAPPING This, VM_OFFSET Offset,
VM_SIZE Size,
            VM_FLAGS *pAccess);

SCODE (*GetSize)(PIVMMAPPING This, VM_SIZE *pSize);

/* Create a new mapping from this mapping with limited
access */
    SCODE (*Clone)(PIVMMAPPING This, VM_OFFSET Offset,
VM_SIZE Size,
            VM_FLAGS Access, PIVMMAPPING *pNewMapping);
};

struct IVmMapping {
    CONST_VTBL struct VmMappingVtbl *v;
};

extern const IID IID_IVmMapping;
```

```
/* ------------------ Adress Space -------------------------
- */
struct VMSpaceVtbl {
    SCODE (*QueryInterface)(PIVMSPACE This, REFIID Iid, void
**ppObject);
    UINT (*AddRef)(PIVMSPACE This);
    UINT (*Release)(PIVMSPACE This);

SCODE (*Reserve)(PIVMSPACE This, VM_OFFSET Offset,
VM_SIZE Size);

/* Delete mappings on range.  Also unreserve if flag set
*/
    SCODE (*Delete)(PIVMSPACE This, VM_OFFSET Offset,
VM_SIZE Size,
            BOOL Unreserve);

/* Map backing store into address space.  CopyMapping is
used only
     * with VM_WRITECOPY.  The flags are ored with those
already in place,
     * thus it is ok to vs->Protect before mapping (XXX Is
this useful?).
     */
    SCODE (*Map)(PIVMSPACE This, VM_OFFSET Offset, VM_SIZE
Size,
            PIVMMAPPING Mapping, PIVMMAPPING CopyMapping,
VM_FLAGS Flags);

/* Set protection or other permanent attributes */
    /* Recurse removes atomicity and affects only certain
attributes:
     * namely VM_WIRE, VM_NOCACHE.
```

```
 * Treat Attributes as mask to be set (Set=TRUE) or
unset (Set=FALSE).
 */
    SCODE (*Protect)(PIVMSPACE This, VM_OFFSET Offset,
VM_SIZE Size,
            VM_FLAGS Attributes, BOOL Set, BOOL Recurse);

/* Set non-permanent attributes */
#define VM_CACHE_CLEAN    1    /* write out dirty pages */
#define VM_CACHE_FLUSH    2    /* throw away pages after
cleaning them */
#define VM_CACHE_DISCARD  3    /* throw away all pages w/o
cleaning */
#define VM_CACHE_READ     4    /* emulate read fault */
#define VM_CACHE_WRITE    5    /* emulate write fault */
#define VM_CACHE_COPY     6    /* realize copy on writes */
#define VM_CACHE_UNMARK   7    /* Pseudo-LRU: mark pages
unused */
#define VM_CACHE_SWEEP    8    /* Pseudo-LRU: throw away
untouched pages */
                               /* SWEEP is same as FLUSH
for unmarked pages */
    SCODE (*CacheControl)(PIVMSPACE This, VM_OFFSET Offset,
VM_SIZE Size,
            UINT Action, BOOL Recurse);

/* vm_regions: Return info from region at or beyond
offset */
    /* Besides This and pOffset the arguments may be NULL */
    SCODE (*QueryVM)(PIVMSPACE This, VM_OFFSET
*pOffset/*in/out*/,
            VM_SIZE *pSize, VM_FLAGS *pFlags,
            PIVMMAPPING *pMapping, PIVMMAPPING
*pCopyMapping);
```

```
    /* Create New; move regs from This into New; map New
into This w/ Flags.
     * If Flags indicate COW then copies are paged to
CopyMapping.
     */
    SCODE (*CreateShadow)(PIVMSPACE This, VM_OFFSET Offset,
VM_SIZE Size,
                PIVMMAPPING CopyMapping, VM_FLAGS Flags,
                PIVMSPACE *pNew);
};

struct IVmSpace {
    CONST_VTBL struct VMSpaceVtbl *v;
};

extern const IID IID_IVmSpace;

/* ------------------ VMView interface --------------------
----- */
#if defined(__cplusplus) && !defined(CINTERFACE)
#else
typedef struct IVmView *PIVMVIEW;
typedef struct IVmMapping *PIVMMAPPING;

struct VMViewVtbl {
    SCODE (*QueryInterface)(PIVMVIEW This, REFIID Iid, void
**ppObject);
    UINT (*AddRef)(PIVMVIEW This);
    UINT (*Release)(PIVMVIEW This);

/* SwitchTo is called from context switch path */
    SCODE (*SwitchTo)(PIVMVIEW This);
    /* Fault is called at pagefault time */
```

```c
    SCODE (*Fault)(PIVMVIEW This, ADDRESS FaultAddr, UINT Access);
    SCODE (*SetMapping)(PIVMVIEW This, PIVMMAPPING Mapping);
    SCODE (*GetMapping)(PIVMVIEW This, PIVMMAPPING *pMapping);
};

struct IVmView {
    CONST_VTBL struct VMViewVtbl *v;
};
endif /* __cplusplus */ extern const IID IID_IVmView;

/* ------------------- VM constructor interface ------------------------------ */
#if defined(__cplusplus) && !defined(CINTERFACE)
#else
typedef struct IVmFactory *PIVMFACTORY;

struct VmFactoryVtbl {
    SCODE (*QueryInterface)(PIVMFACTORY This, REFIID Iid, void **ppObject);
    UINT (*AddRef)(PIVMFACTORY This);
    UINT (*Release)(PIVMFACTORY This);

SCODE (*CreateVmView)(PIVMFACTORY This, PIVMVIEW *pVV);
    SCODE (*CreateVmSpace)(PIVMFACTORY This, PIVMSPACE *pVS);
    SCODE (*CreateVmMappingFromFile)(PIVMFACTORY This, PIFILE File, PIVMMAPPING *pNewMapping);
    SCODE (*CreateVmMappingFromZero)(PIVMFACTORY This, PIVMMAPPING *pNewMapping);
```

```
    SCODE (*CreateDefault)(PIVMFACTORY This, ADDRESS Where,
VM_SIZE Size, PIVMVIEW *pVV);
};

struct IVmFactory {
    CONST_VTBL struct VmFactoryVtbl *v;
};
endif /* __cplusplus */ extern const IID IID_IVmFactory;

endif /* __MMVM_H_ */
```

APPENDIX D:

The following is a header file for the basic features of MMLite. This file contains all the basic interfaces and services of the MMLite "kernel", including the NameSpace. The NameSpace is the one that implements the on-demand loading programming paradigm. The Register() method is used to add objects to the namespace and the
Bind() method is used to look them up. The IHeap is the interface that applications use to request memory allocations (with or without VM). There are also other functions that are not defined as part of a specific interface. Among these, AddDevice() is the one used to install the VM and IPC trap handlers.

As for additional interfaces, the VM manager uses the IVTLB interface. The primitives defined in mmbase.h (for Mutex_* and Condition_*, and for constraints) are sufficient in the general case.

```
#ifndef _MMBASE_H_
#define _MMBASE_H_

/************ Constraint ***************/
#define CRITICAL    ( 1 )       /* size is 4 */
#define NONCRITICAL ( 0 )       /* size is 4 */
typedef /* [transmit] */ INT CRITICALITY;       /* size is 4 */ if defined(__cplusplus)
/* work-around VC++ bug that produces warning 4705 */
typedef struct _TIME_CONSTRAINT {
    inline _TIME_CONSTRAINT() {};
    inline ~_TIME_CONSTRAINT() {};
    TIME        Start;
    TIME        Estimate;
    TIME        Deadline;
    CRITICALITY Criticality;
} TIME_CONSTRAINT, *PTIME_CONSTRAINT;
```

```
#else
typedef struct  _TIME_CONSTRAINT      /* size is 28 */
    {
    TIME Start;
    TIME Estimate;
    TIME Deadline;
    CRITICALITY Criticality;
    }   TIME_CONSTRAINT;

/* size is 4 */
typedef struct _TIME_CONSTRAINT *PTIME_CONSTRAINT;
#endif /* __cplusplus */

/*********** Mutex **************/
#if defined(__cplusplus)
/* work-around VC++ bug that produces warning 4705 */
typedef struct _MUTEX {
    inline _MUTEX() {};
    inline ~_MUTEX() {};
    UINT _mutex_state[MUTEX_STATE_SIZE];
} MUTEX, *PMUTEX;
#else
typedef struct _MUTEX {      /* size is 4 */
    UINT _mutex_state[ 1 ];
} MUTEX;

typedef struct _MUTEX *PMUTEX;        /* size is 4 */
#endif /* __cplusplus */

/*********** Condition **************/
#if defined(__cplusplus)
/* work-around VC++ bug that produces warning 4705 */
typedef struct _CONDITION {
    inline _CONDITION() {};
```

```
    inline ~_CONDITION() {};
    UINT _cond_state[CONDITION_STATE_SIZE];
} CONDITION, *PCONDITION;
#else
typedef struct _CONDITION {        /* size is 8 */
    UINT _cond_state[ 2 ];
} CONDITION;

typedef struct _CONDITION *PCONDITION;    /* size is 8 */
endif /* __cplusplus */ typedef interface IProcess IProcess;
typedef interface IThread IThread;

/****** namesp.h ******/ if defined(__cplusplus)
extern "C" {
endif /* __cplusplus */
typedef interface INameSpace INameSpace;

typedef UINT NAME_SPACE_FLAGS;
#define NAME_SPACE_READ      ( 0x1 )
#define NAME_SPACE_WRITE     ( 0x2 )
#define NAME_SPACE_CREATE    ( 0x10 )
#define NAME_SPACE_FAILIFEXIST  ( 0x20 )
#define NAME_SPACE_EXTENSION    ( 0x800 )

typedef struct INameSpaceVtbl {
      SCODE ( MCT *QueryInterface )(
          INameSpace *This,
          /* [in] */ REFIID Iid,
          /* [out] */ void **ppObject);
```

```
UINT ( MCT *AddRef )(
    INameSpace *This);

UINT ( MCT *Release )(
    INameSpace *This);

SCODE ( MCT *Register )(
    INameSpace *This,
    CTSTR pName,
    IUnknown *pObj,
    NAME_SPACE_FLAGS Flags,
    INameSpace *pServerNameSpace);

SCODE ( MCT *Unregister )(
    INameSpace *This,
    CTSTR pName);

SCODE ( MCT *Bind )(
    INameSpace *This,
    CTSTR pName,
    NAME_SPACE_FLAGS Flags,
    /* [out] */ IUnknown **ppUnk);

SCODE ( MCT *FindFirst )(
    INameSpace *This,
    CTSTR pPrefix,
    /* [size_is][out] */ TSTR pBuffer,
    /* [in] */ UINT BufSize,
    /* [out] */ UINT *pStrLen);

SCODE ( MCT *FindNext )(
    INameSpace *This,
    CTSTR pPrefix,
```

```
        CTSTR pPrevious,
        /* [size_is][out] */ TSTR pBuffer,
        /* [in] */ UINT BufSize,
        /* [out] */ UINT *pStrLen);

SCODE ( MCT *GetCapabilities )(
        INameSpace *This,
        CTSTR pName,
        /* [out] */ NAME_SPACE_FLAGS *pFlags);

} INameSpaceVtbl;

if defined(__cplusplus) && !defined(CINTERFACE)

interface INameSpace : public IUnknown
    {
    public:
     virtual SCODE MCT Register(
         CTSTR pName,
         IUnknown *pObj,
         NAME_SPACE_FLAGS Flags,
         INameSpace *pServerNameSpace) = 0;

virtual SCODE MCT Unregister(
         CTSTR pName) = 0;

virtual SCODE MCT Bind(
         CTSTR pName,
         NAME_SPACE_FLAGS Flags,
         /* [out] */ IUnknown **ppUnk) = 0;

virtual SCODE MCT FindFirst(
         CTSTR pPrefix,
         /* [size_is][out] */ TSTR pBuffer,
```

```c
        /* [in] */ UINT BufSize,
        /* [out] */ UINT *pStrLen) = 0;

virtual SCODE MCT FindNext(
        CTSTR pPrefix,
        CTSTR pPrevious,
        /* [size_is][out] */ TSTR pBuffer,
        /* [in] */ UINT BufSize,
        /* [out] */ UINT *pStrLen) = 0;

virtual SCODE MCT GetCapabilities(
        CTSTR pName,
        /* [out] */ NAME_SPACE_FLAGS *pFlags) = 0;

};

else  /* __cplusplus */  /* C style interface */ interface INameSpace
    {
      CONST_VTBL struct INameSpaceVtbl *lpVtbl;
    };

endif /* __cplusplus */ /* C style interface */ if defined(__cplusplus)
}
endif /* __cplusplus */
/****** heap.h ******/ if defined(__cplusplus)
extern "C"{
endif /* __cplusplus */
```

```
typedef interface IHeap IHeap;
#define HEAP_NO_SERIALIZE    ( 0x1 )
#define HEAP_NO_COPY (0x4)
#define HEAP_ZERO_MEMORY     ( 0x8 )
#define HEAP_REALLOC_IN_PLACE_ONLY   ( 0x10 )
#define HEAP_CACHE_ALIGN ( 0x100 )

typedef struct IHeapVtbl {
    SCODE ( MCT *QueryInterface )(
        IHeap *This,
        /* [in] */ REFIID Iid,
        /* [out] */ void **ppObject);

UINT ( MCT *AddRef )(
        IHeap *This);

UINT ( MCT *Release )(
        IHeap *This);

PTR ( MCT *Alloc )(
        IHeap *This,
        UINT Flags,
        UINT Size,
        UINT Alignment);

PTR ( MCT *ReAlloc )(
        IHeap *This,
        UINT Flags,
        PTR pMem,
        UINT NewSize,
        UINT Alignment);

BOOL ( MCT *Free )(
        IHeap *This,
```

```
        UINT Flags,
        PTR pMem);

ADDR_SIZE ( MCT *Size )(
        IHeap *This,
        UINT Flags,
        PTR pMem);

BOOL ( MCT *Validate )(
        IHeap *This,
        UINT Flags,
        PTR pMem);

PTR ( MCT *Extract )(
        IHeap *This,
        UINT Flags,
        PTR pMem,
        UINT Size);

SCODE ( MCT *Status )(
        IHeap *This,
        ADDR_SIZE *pReserve,
        ADDR_SIZE *pCommit,
        ADDR_SIZE *pUsed,
        ADDR_SIZE *pMaxUsed);

} IHeapVtbl;

#if defined(__cplusplus) && !defined(CINTERFACE)
interface IHeap : public IUnknown {
  public:
    virtual PTR MCT Alloc(
        UINT Flags,
        UINT Size,
```

```
        UINT Alignment) = 0;

virtual PTR MCT ReAlloc(
        UINT Flags,
        PTR pMem,
        UINT NewSize,
        UINT Alignment) = 0;

virtual BOOL MCT Free(
        UINT Flags,
        PTR pMem) = 0;

virtual ADDR_SIZE MCT Size(
        UINT Flags,
        PTR pMem) = 0;

virtual BOOL MCT Validate(
        UINT Flags,
        PTR pMem) = 0;

virtual PTR MCT Extract(
        UINT Flags,
        PTR pMem,
        UINT Size) = 0;

virtual SCODE MCT Status(
        ADDR_SIZE *pReserve,
        ADDR_SIZE *pCommit,
        ADDR_SIZE *pUsed,
        ADDR_SIZE *pMaxUsed) = 0;

};
else   /* C style interface */
interface IHeap {
```

```
    CONST_VTBL struct IHeapVtbl *lpVtbl;
};
endif  /* __cplusplus */ /* C style interface */
if defined(__cplusplus)
}
endif /* __cplusplus */
/******* module.h *******/
#if defined(__cplusplus)
extern "C"{
endif /* __cplusplus */ typedef interface IModule IModule;
typedef struct IModuleVtbl {
    SCODE ( MCT *QueryInterface )(
        IModule *This,
        /* [in] */ REFIID Iid,
        /* [out] */ void **ppObject);

UINT ( MCT *AddRef )(
        IModule *This);

UINT ( MCT *Release )(
        IModule *This);

SCODE ( MCT *GetFunctionAddress )(
        IModule *This,
        CTSTR Name,
        UINT Ordinal,
        /* [out] */ ADDRESS *pAddress);

SCODE ( MCT *GetName )(
        IModule *This,
        /* [size_is][out] */ TSTR Buffer,
        /* [in] */ UINT BufSize);
```

```c
SCODE ( MCT *GetArgs )(
    IModule *This,
    /* [size_is][out] */ TSTR Buffer,
    /* [in] */ UINT BufSize);

SCODE ( MCT *GetLocation )(
    IModule *This,
    /* [out] */ ADDRESS *pAddress,
    /* [out] */ UINT *pSize);

SCODE ( MCT *GetEntryPoint )(
    IModule *This,
    /* [out] */ ADDRESS *pEntry);

} IModuleVtbl;
#if defined(__cplusplus) && !defined(CINTERFACE)
    interface IModule : public IUnknown
    {
    public:

virtual SCODE MCT GetFunctionAddress(
        CTSTR Name,
        UINT Ordinal,
        /* [out] */ ADDRESS *pAddress) = 0;

virtual SCODE MCT GetName(
        /* [size_is][out] */ TSTR Buffer,
        /* [in] */ UINT BufSize) = 0;

virtual SCODE MCT GetArgs(
        /* [size_is][out] */ TSTR Buffer,
        /* [in] */ UINT BufSize) = 0;
```

```
    virtual SCODE MCT GetLocation(
        /* [out] */ ADDRESS *pAddress,
        /* [out] */ UINT *pSize) = 0;

virtual SCODE MCT GetEntryPoint(
        /* [out] */ ADDRESS *pEntry) = 0;

};

else   /* C style interface */
    interface IModule
    {
     CONST_VTBL struct IModuleVtbl *lpVtbl;
    };
#endif   /* __cplusplus */ /* C style interface */
#if defined(__cplusplus)
}
endif /* __cplusplus */

/***** proces.h *****/ if defined(__cplusplus)
extern "C"{
endif /* __cplusplus */
typedef interface IProcess IProcess;
typedef /* [transmit] */ void *THREAD_ARGUMENT;

#if 0
typedef /* [transmit] */ void ( __stdcall *THREAD_FUNCTION
)(
    THREAD_ARGUMENT arg);
#else
/* Include THREAD_LINKAGE linkage specification in C/C++
declaration */
```

```
typedef void (THREAD_LINKAGE *THREAD_FUNCTION
)(THREAD_ARGUMENT arg);
endif typedef struct _MACHINE_INFO {
    UINT32  MachineId;
    UINT32  OEMId;
    UINT    TotalPhysicalMemory;
    UINT    AvailablePhysicalMemory;
    UINT    Reserved[12];
} MACHINE_INFO;

typedef UINT MACHINE_INFO_FLAVOR;
#define MACHINE_KIND_GENERIC ( 0x01 )
typedef struct IProcessVtbl {
    SCODE ( MCT *QueryInterface )(
        IProcess *This,
        /* [in] */ REFIID Iid,
        /* [out] */ void **ppObject);

UINT ( MCT *AddRef )(
        IProcess *This);

UINT ( MCT *Release )(
        IProcess *This);

SCODE ( MCT *CreateThread )(
        IProcess *This,
        THREAD_FUNCTION pStart,
        THREAD_ARGUMENT Arg,
        ADDR_SIZE StackSize,
        void *Reserved,
        /* [out] */ IThread **ppNewThread);
```

```
SCODE ( MCT *LoadImage )(
    IProcess *This,
    CTSTR pImage,
    CTSTR pArgs,
    /* [out] */ IModule **ppIModule);

SCODE ( MCT *Init )(
    IProcess *This,
    ADDR_SIZE StackSize,
    void *compat);

SCODE ( MCT *MachineInfo )(
    IProcess *This,
    MACHINE_INFO_FLAVOR Kind,
    /* [out] */ MACHINE_INFO *pInfo);

} IProcessVtbl;

#if defined(__cplusplus) && !defined(CINTERFACE)

interface IProcess : public IUnknown
{
public:
 virtual SCODE MCT CreateThread(
     THREAD_FUNCTION pStart,
     THREAD_ARGUMENT Arg,
     ADDR_SIZE StackSize,
     void *Reserved,
     /* [out] */ IThread **ppNewThread) = 0;

virtual SCODE MCT LoadImage(
     CTSTR pImage,
     CTSTR pArgs,
     /* [out] */ IModule **ppIModule) = 0;
```

```
    virtual SCODE MCT Init(
        ADDR_SIZE StackSize,
        void *compat) = 0;

virtual SCODE MCT MachineInfo(
        MACHINE_INFO_FLAVOR Kind,
        /* [out] */ MACHINE_INFO *pInfo) = 0;

};

else   /* C style interface */ interface IProcess
    {
     CONST_VTBL struct IProcessVtbl *lpVtbl;
    };

#endif   /* __cplusplus */ /* C style interface */
#if defined(__cplusplus)
}
endif /* __cplusplus */
/******* thread.h *******/
#if defined(__cplusplus)
extern "C"{
endif /* __cplusplus */
typedef interface IThread IThread;
typedef struct IThreadVtbl {
    SCODE ( MCT *QueryInterface )(
        IThread *This,
        /* [in] */ REFIID Iid,
        /* [out] */ void **ppObject);

UINT ( MCT *AddRef )(
```

```
        IThread *This);

UINT ( MCT *Release )(
        IThread *This);

SCODE ( MCT *GetProcess )(
        IThread *This,
        /* [out] */ IProcess **ppIProcess);

} IThreadVtbl;

#if defined(__cplusplus) && !defined(CINTERFACE)

interface IThread : public IUnknown
    {
    public:
     virtual SCODE MCT GetProcess(
         /* [out] */ IProcess **ppIProcess) = 0;

};

else   /* C style interface */ interface IThread
    {
     CONST_VTBL struct IThreadVtbl *lpVtbl;
    };

endif /* __cplusplus */ /* C style interface */
if defined(__cplusplus)
}
endif /* __cplusplus */

EXTERN_C ADDRESS RTLCALLTYPE GetPC(void);
```

```
/*
 * Current object
 */

EXTERN_C PITHREAD RTLCALLTYPE CurrentThread(void);
EXTERN_C PIPROCESS RTLCALLTYPE CurrentProcess(void);
EXTERN_C PINAMESPACE RTLCALLTYPE CurrentNameSpace(void);
EXTERN_C PIHEAP RTLCALLTYPE ProcessHeap(void); /* same as
CurrentHeap */
EXTERN_C TSTR RTLCALLTYPE ProcessImage(void);
EXTERN_C TSTR RTLCALLTYPE ProcessArgs(void);
EXTERN_C PIVMVIEW RTLCALLTYPE CurrentVmView(void);

/* Atomic
 */
OSRTL(BOOL) AtomicCmpAndSwap(PUINT pTarget, UINT OldVal,
UINT NewVal);
OSRTL(UINT) AtomicAdd(PUINT pTarget, UINT Cnt);
OSRTL(UINT) AtomicSub(PUINT pTarget, UINT Cnt);
OSRTL(UINT) AtomicDec(PUINT pTarget);
OSRTL(UINT) AtomicInc(PUINT pTarget);
OSRTL(UINT) AtomicSwap(PUINT pTarget, UINT NewVal);
OSRTL(void) AtomicLIFOInsert(PTR * RESTRICT pHead, PTR
RESTRICT Item);
OSRTL(PTR) AtomicLIFORemove(PTR *pHead);

/* Mutex
 */
OSRTL(void) Mutex_Init(PMUTEX pmx);
OSRTL(void) Mutex_Destroy(PMUTEX pmx);
OSRTL(void) Mutex_Lock(PMUTEX pmx);
OSRTL(void) Mutex_Unlock(PMUTEX pmx);
OSRTL(BOOL) Mutex_TryLock(PMUTEX pmx);
```

```
OSRTL(BOOL) Mutex_Locked(const MUTEX *pmx);

/* Condition
 */
OSRTL(void)  Condition_Init(PCONDITION pcnd);
OSRTL(void)  Condition_Destroy(PCONDITION pcnd);
OSRTL(void)  Condition_Signal(PCONDITION pcnd);
OSRTL(BOOL)  Condition_InterruptSignal(PCONDITION pcnd);
OSRTL(void)  Condition_Broadcast(PCONDITION pcnd);
OSRTL(void)  Condition_Wait(PCONDITION pcnd, PMUTEX pmx);
OSRTL(SCODE) Condition_TimedWait(PCONDITION pcnd, PMUTEX
pmx, TIME tout);
OSRTL(SCODE) Condition_WaitAndBeginConstraint(PCONDITION
pcnd, PMUTEX pmx, BOOL endprev, PTIME_CONSTRAINT pcval,
PTIME pttaken);
OSRTL(SCODE)
Condition_TimedWaitAndBeginConstraint(PCONDITION pcnd,
PMUTEX pmx, TIME until, BOOL endprev, PTIME_CONSTRAINT
pcval, PTIME pttaken);

/* Constraint
 */
OSRTL(SCODE) BeginConstraint(BOOL endprev, PTIME_CONSTRAINT
pcval, PTIME pttaken);
OSRTL(SCODE) EndConstraint(PTIME pttaken);

/* Module
 */
OSRTL(SCODE) GetModuleNext(PIMODULE Previous, PIMODULE
*ppIModule);
OSRTL(SCODE) GetModuleContainsAddr(ADDRESS Addr, PIMODULE
*ppIModule);
#define GetCurrentModule(_ppIModule_)
GetModuleContainsAddr(GetPC(), _ppIModule_)
```

```c
/* Compare two UUIDs.  Returns TRUE if they are same, FALSE
otherwise.
 */
OSRTL(BOOL) UuidCmp(const UUID *pUuid1, const UUID *pUuid2);
#define IidCmp(pIid1,pIid2)
UuidCmp((PUUID)pIid1,(PUUID)pIid2)
#define IpidCmp(pIpid1,pIpid2)
UuidCmp((PUUID)pIpid1,(PUUID)pIpid2)

/* Various constructors.
 */
OSRTL(PIHEAP) HeapCreate(ADDRESS Mem, UINT InitSize, UINT
MaxSize, UINT Flags);
OSRTL(IHeap*) CreateHeap(UINT Flags, ADDR_SIZE InitialSize,
ADDR_SIZE MaxSize);

/* Others
 */
EXTERN_C SCODE WINAPI GetLastError(void);
EXTERN_C void WINAPI SetLastError(SCODE Error);

OSRTL(SCODE) AddDevice( PTR Device, PTR Isr, UINT Arg0, UINT
Arg1, UINT Arg2);
#define RemoveDevice(_dev_,_irq_)
AddDevice(_dev_,NULL,0,_irq_,0)
OSRTL(SCODE) SleepUntil(TIME Until);
OSRTL(void)  Delay(UINT MicroSeconds);
OSRTL(SCODE) GenericQueryInterface(IUnknown *pThis, REFIID
IidQuery, void **ppObject, REFIID IidInterface);
EXTERN_C void CRTAPI WaitFor(IUnknown *pUnk);

OSRTL(void) ThreadExit(void);
```

OSRTL(TIME) CurrentTime(void);

EXTERN_C int CRTAPI memcmp(const void *, const void *, unsigned);
EXTERN_C void * CRTAPI memcpy(void *, const void *, unsigned);
EXTERN_C void * CRTAPI memset(void *, int, unsigned);
EXTERN_C void * CRTAPI memmove(void *, const void *, unsigned);

EXTERN_C size_t CRTAPI strlen(const char *);
EXTERN_C int CRTAPI strcmp(const char *, const char *);
EXTERN_C char *CRTAPI strcpy(char *, const char *);
EXTERN_C char *CRTAPI strcat(char *, const char *);

endif /* _MMBASE_H_ */

APPENDIX E:

The following is a file for reading the foregoing header files of Appendices A-D.

Explanations are provided with the code.
------------
if defined(__cplusplus)
extern "C" {
endif /* __cplusplus */
This file is common to two programming languages, C and C++. Ignore
this clause.

typedef interface ILoadableIPC ILoadableIPC;
Announce that we will define an ILoadableIPC interface, later on.

```
typedef struct ILoadableIPCVtbl {
This is the VTable definition for our interface, it is
only used in
the C language.  But it
is exposed to C++ users as well, in case they need it.

SCODE ( MCT *QueryInterface ) (
ILoadableIPC *This,
/* [in] */ REFIID Iid,
/* [out] */ void **ppObject);
This is the standard QueryInterface method, as required
by the base
IUnknown interface.

UINT ( MCT *AddRef ) (
ILoadableIPC *This);
Ditto for AddRef()

UINT ( MCT *Release ) (
ILoadableIPC *This);
..and for Release().

SCODE ( MCT *TrapHandler ) (
ILoadableIPC *This,
PCXTINFO pThreadState
);
We are done with the IUnknown, this method is now
specific to our
interface definition.

} ILoadableIPCVtbl;
End of the VTable definition.
```

```
#if defined(__cplusplus) && !defined(CINTERFACE)
The following defines the ILoadableIPC interface for
users of the
C++ language
interface ILoadableIPC : public IUnknown
In C++ we just say that we "derive" from the IUnknown and
the
compiler will define
the basic methods for us, automatically.
{
public:
virtual SCODE MCT TrapHandler(
PCXTINFO pThreadState
) = 0;
We just define our specific method.  Infact, this portion
between
#if and #else is
the only one that is strictly needed for a C++ uses.
Most of the
stuff in here is for
the benefit of the C programmer.
};

else   /* __cplusplus /  / C style interface */ interface ILoadableIPC
{
CONST_VTBL struct ILoadableIPCVtbl *lpVtbl;
For the C language we define an interface as something
that just
contains the VTable pointer
to the object's method.  The object's state will actually
follow in
``` memory the lpVtbl pointer.
};

endif   /* __cplusplus / / C style interface */ if defined(__cplusplus)
}
endif /* __cplusplus */

What is claimed is:

1. A method of providing a dynamically configurable operating system on a computer having a working memory, comprising:
   providing demand-loadable operating system components initially stored outside of said working memory, each operating system component having an entry point comprising a constructor for an object, and
   providing a Namespace in said working memory which provides in said working memory access to ones of said operating system components as they become needed by applications running in said computer, said Namespace managing demand-loading and unloading of said operating system components in said working memory.

2. The method of claim 1 wherein said demand-loadable components are initially provided in one of:
   (a) a memory within said computer;
   (b) a location external of said computer.

3. The method of claim 1 further comprising providing applications in said working memory which rely on said Namespace to furnish access to ones of said operating system components in said working memory as they become needed by ones of said applications.

4. The method of claim 3 wherein each operating system component comprises an object, and wherein the step of providing each demand-loadable component comprises:
   providing an IUnknown interface in the object having the following methods:
   (a) add reference for incrementing a count of the number of applications requiring the object;
   (b) release reference for decrementing a count of the number of applications requiring the object;
   wherein said Namespace is responsive to said count in said managing of said demand-loading and unloading.

5. The method of claim 3 wherein each operating system component comprises an object, and wherein the step of providing a demand-loadable operating system component comprises:
   providing an IUnknown interface in the object having a QueryInterface method of providing access to the methods of the object to an application invoking QueryInterface.

6. The method of claim 3 wherein said object is a COM object.

7. A method of operating a computer having a working memory wherein applications and objects may be loaded during run time, comprising:
   providing a Namespace in said computer;
   running an application in said computer;
   said application calling a demand-loadable object by causing the name of said object to be presented to said Namespace, wherein said object is an operating system component;
   in response to being presented with the name of said object, said Namespace returning to said application an IUnknown pointer of said object;
   upon return of said IUnknown pointer of said object, said application using said IUnknown pointer to call a QueryInterface method of said object and request a pointer to a desired interface;
   said QueryInterface method returning said desired interface, whereby said application can invoke a desired method through said interface.

8. The method of claim 7, wherein said computer comprises a loader, and wherein said Namespace, responds to being presented with the name of said object in that said Namespace:
   determines whether the name of said object is currently registered in said Namespace, and, if so, carries out the step of returning said pointer;
   if said name is not currently registered, causes said loader to load said object into said working memory and registers said name in said Namespace, and then carries out the step of returning said pointer.

9. The method of claim 8 wherein said object has a constructor and an entry point, and wherein the loading of said object comprises:
   said loader invoking said constructor;
   said constructor finding said entry point of said object and calling an executable at said entry point;
   said executable causing space in said working memory to be allocated for a VTable, an Interface and an Implementation of said object and producing a pointer to said memory space, said pointer comprising said IUnknown pointer.

10. The method of claim 9 further comprising:
    loading said VTable, Interface and Implementation in the space in said working memory allocated therefore;
    initializing the state of said object including said VTable and interface pointers.

11. A computer having a working memory and access to a storage memory, said computer comprising:
    an application capable of being loaded in to said working memory and running in said computer;
    at least one object initially stored in said no-nworking memory, said object comprising an operating system component;
    a Namespace in said working memory;
    said application being programmed to cause said one object to be identified to said Namespace whenever said application finds a need for said object during the running of said application;
    said Namespace being programmed to:
    (a) respond to said application identifying said one object by determining whether said one object is currently registered in Namespace, and if it is not registered, then,
    (b) causing said one object to be loaded from said storage memory to said working memory and,
    (c) registering said one object in said Namespace,
    (d) upon said object being registered in said Namespace, returning to said application a pointer to said object.

12. The computer of claim 11 wherein said object comprises a VTable, plural interfaces and corresponding methods thereof, and plural implementations, one of said interfaces comprising an IUnknown interface including a QueryInterface method, and wherein said application finds a need for said one object because said application needs a particular one said interfaces of said one object, wherein:
    said pointer to said object returned by said Namespace comprises an IUnknown pointer to said IUnknown interface of said one object;
    said application is programmed to use said IUnknown pointer to access said IUnknown interface of said one object and to invoke the QueryInterface method thereof to access said particular one interface.

13. The computer of claim 12 wherein said computer further comprises a loader in said working memory capable of loading objects from said storage memory to said working memory, said Namespace causing said one object to be loaded by causing said loader to load said one object.

14. The computer of claim 13 wherein said object has a constructor and an entry point, and wherein said loader is programmed such that said loader:
invokes said constructor;
said constructor is programmed to find said entry point of said object and call an executable at said entry point;
said executable is programmed to cause space in said working memory to be allocated for a VTable, an Interface and an Implementation of said object and producing a pointer to said memory space, said pointer comprising said IUnknown pointer.

15. The computer of claim 14 wherein:
said loader is further programmed to load said VTable, Interface and Implementation in the space in said working memory allocated therefore;
said loader is programmed to initialize the state of said object including said VTable and interface pointers.

16. A computer having a working memory and access to a storage memory, said storage memory holding at least one object, said computer comprising:
an application in said working memory, said application needing to access to said one object at a particular time during the running of said application, said object comprising an operating system component, and said application being programmed to cause a request for said one object to issue contemporaneously with said particular time;
a Namespace which is programmed to respond to a request from said application for said one object by loading said one object from said storage memory into said working memory and then providing said application with a pointer to said one object.

17. The computer of claim 16 wherein:
said application is programmed to notify said Namespace whenever it no longer needs access to said one object;
said Namespace is further programmed to permit said one object to be unloaded from said working memory when no longer needed.

18. The computer of claim 16 wherein:
said application is programmed to notify said one object it no longer needs access to it, whereby said object notifies said Namespace said object is no longer needed;
said Namespace is further programmed to permit said one object to be unloaded from said working memory when no longer needed.

19. The computer of claim 16 wherein said Namespace permits said one object to remain in working memory after being no longer needed by said application in order to permit other applications to access said one object.

20. A system residing in a working memory of a computer and in a storage memory, said system comprising:
demand-loadable operating system components initially stored in said storage memory, each operating system component having an entry point comprising a constructor for an object, and
a Namespace in said working memory which provides in said working memory access to ones of said operating system components as they become needed by applications running in said computer, said Namespace managing demand-loading and unloading of said operating system components in said working memory.

21. The system of claim 20 wherein said storage memory comprises one of:
(a) a memory within said computer;
(b) a memory external of said computer.
(c) the output of another software component such as a compiler.

22. The system of claim 20 further comprising applications in said working memory which rely on said Namespace to furnish access to ones of said operating system components in said working memory as they become needed by ones of said applications.

23. The system of claim 22 wherein each operating system component operating system comprises an object, and the system further comprises:
an IUnknown interface in the object having the following methods:
(a) add reference for incrementing a count of the number of applications requiring the object;
(b) release reference for decrementing a count of the number of applications requiring the object;
wherein said Namespace is responsive to said count in said managing of said demand-loading and unloading.

24. The system of claim 23 further comprising: an IUnknown interface in the object having a QueryInterface method of providing access to the methods of the object to an application invoking QueryInterface.

25. The system of claim 22 wherein said object is a COM object.

26. The system of claim 23 further comprising a loader in said working memory, and wherein said Namespace is responsive to being presented with the name of one of said objects by:
returning a pointer to said object if said object is registered in said Namespace and returning to said application a pointer to said object;
if said name is not currently registered, causing said loader to load said object into said working memory.

27. The system of claim 26 wherein said object has a constructor invoked by said loader, an entry point and an working memory space-allocating executable called by said constructor at said entry point.

28. The system of claim 27 wherein said object comprises a VTable, an Interface and an Implementation in locations in said working memory allocated by said executable.

29. A method of operating a computer having a working memory wherein applications and objects may be loaded during run time, comprising:
providing a Namespace in the computer;
providing a kernel resident in the working memory at run time;
providing a loadable interprocess communication manager resident at link time outside of the working memory and dynamically loadable into the working memory at run time, the interprocess communication manager having an IUnknown pointer, a QueryInterface method and plural interfaces;
running an application in the computer;
the application presents to the Namespace the name of the interprocess communication manager;
in response to the Namespace being presented by the application with the name of the interprocess communication manager, the Namespace returning to the application the IUnknown pointer of the interprocess communication manager;
upon return of the IUnknown pointer, the application using the IUnknown pointer to call the QueryInterface method of the interprocess communication manager, and requesting through the QueryInterface method a pointer to a desired interface of the interprocess communication manager;

the QueryInterface method returning the desired interface, whereby the application can invoke a desired method through the interface.

30. The method of claim 29, wherein the computer comprises a loader in the working memory, and wherein the Namespace, prior to providing the IUnknown pointer, performs the steps of:

determining whether the interprocess communication manager is currently registered in the Namespace;

if the interprocess communication manager is not currently registered, causing the loader to load the interprocess communication manager into the working memory and registering the interprocess communication manager in the Namespace.

31. A method of operating a computer having a working memory wherein applications and objects may be loaded during run time, the method comprising:

providing a Namespace in the computer;

providing a kernel resident in the working memory at run time;

providing a loadable virtual memory manager resident at link time outside of the memory and dynamically loadable into the working memory at run time upon demand of one of the application programs, the virtual memory manager having an IUnknown pointer, a QueryInterface method and plural interfaces;

running an application in said computer;

said application presenting the name of the virtual memory manager to the Namespace;

in response to the Namespace being presented by the application with the name of the virtual memory manager, the Namespace returning to the application the IUnknown pointer of the virtual memory manager;

upon return of the IUnknown pointer, the application using the IUnknown pointer to call the QueryInterface method of the virtual memory manager and to request through the QueryInterface method a pointer to a desired one of the plural interfaces of the virtual memory manager;

the QueryInterface method returning the desired interface, whereby the application can invoke a desired method through the interface.

32. The method of claim 31, wherein the computer comprises a loader in the working memory, and wherein the Namespace, prior to providing the IUnknown pointer, performs the steps of:

determining whether the name of the virtual memory manager is currently registered in the Namespace;

if the name is not currently registered, causing the loader to load the virtual memory manager into the working memory and registering the virtual memory manager in the Namespace.

33. The method of claim 31 wherein the plural interfaces of the virtual memory manager comprise:

virtual memory space interface (VMSpace);

virtual memory map interface (VMMap);

virtual memory view interface (VMView).

* * * * *